United States Patent [19]
Shimatani et al.

[11] Patent Number: 4,815,099
[45] Date of Patent: Mar. 21, 1989

[54] DATA CIRCUIT-TERMINATING EQUIPMENT

[75] Inventors: Toshimichi Shimatani, Fuchuu; Yoshihiro Kawata, Tokorozawa; Masayuki Kawashima, Hachiouji; Hideharu Omori, Hino, all of Japan

[73] Assignee: Iwatsu Electric Co., Ltd., Tokyo, Japan

[21] Appl. No.: 200,112

[22] Filed: May 27, 1988

[30] Foreign Application Priority Data

Jul. 30, 1987 [JP] Japan .................................. 62-19117
Oct. 3, 1987 [JP] Japan .................................. 62-250398

[51] Int. Cl.$^4$ .............................................. H04J 3/22
[52] U.S. Cl. ........................................ 375/7; 370/84; 375/121
[58] Field of Search ................. 370/79, 84, 108, 110.1; 375/7, 37, 58, 118, 121, 122; 358/133, 138

[56] References Cited

U.S. PATENT DOCUMENTS

| | | | |
|---|---|---|---|
| 4,392,234 | 7/1983 | Maruta .................................... | 370/84 |
| 4,471,480 | 9/1984 | Haussmann ........................... | 370/84 |
| 4,641,303 | 2/1987 | Vogl ....................................... | 370/84 |
| 4,694,470 | 9/1987 | Shimatani et al. ................... | 375/121 |

*Primary Examiner*—Benedict V. Safourek
*Attorney, Agent, or Firm*—Oblon, Fisher, Spivak, McClelland & Maier

[57] ABSTRACT

There is disclosed a data circuit-terminating equipment (DCE) which connects an asynchronous data terminal equipment (DTE) with a PCM trnsmission line having various speeds. Further the DCE can satisfy recomendations of the V25 bis of CCITT. The DCE includes a PLL obtaining a clock from the line, a timing generator generating timings for circuits, a mapping circuit mapping to make data from the DTE match into the line speed, a sending register converting transmission speed of the mapping circuit output to send to the line at the instructed period, a receiving register receiving data from the line to deliver data with the required speed during the required period for the DTE, and a demapping circuit receiving the receiving register output to demap and send to the DTE. In the DCE satisfying the recommendations, the demapping circuit ANDs a clear-to-send signal and bits indicating the synchronized state to send the clear-to-send signal, and a short line shorting the clear-to-send signal and a carrier detect signal is employed.

20 Claims, 60 Drawing Sheets

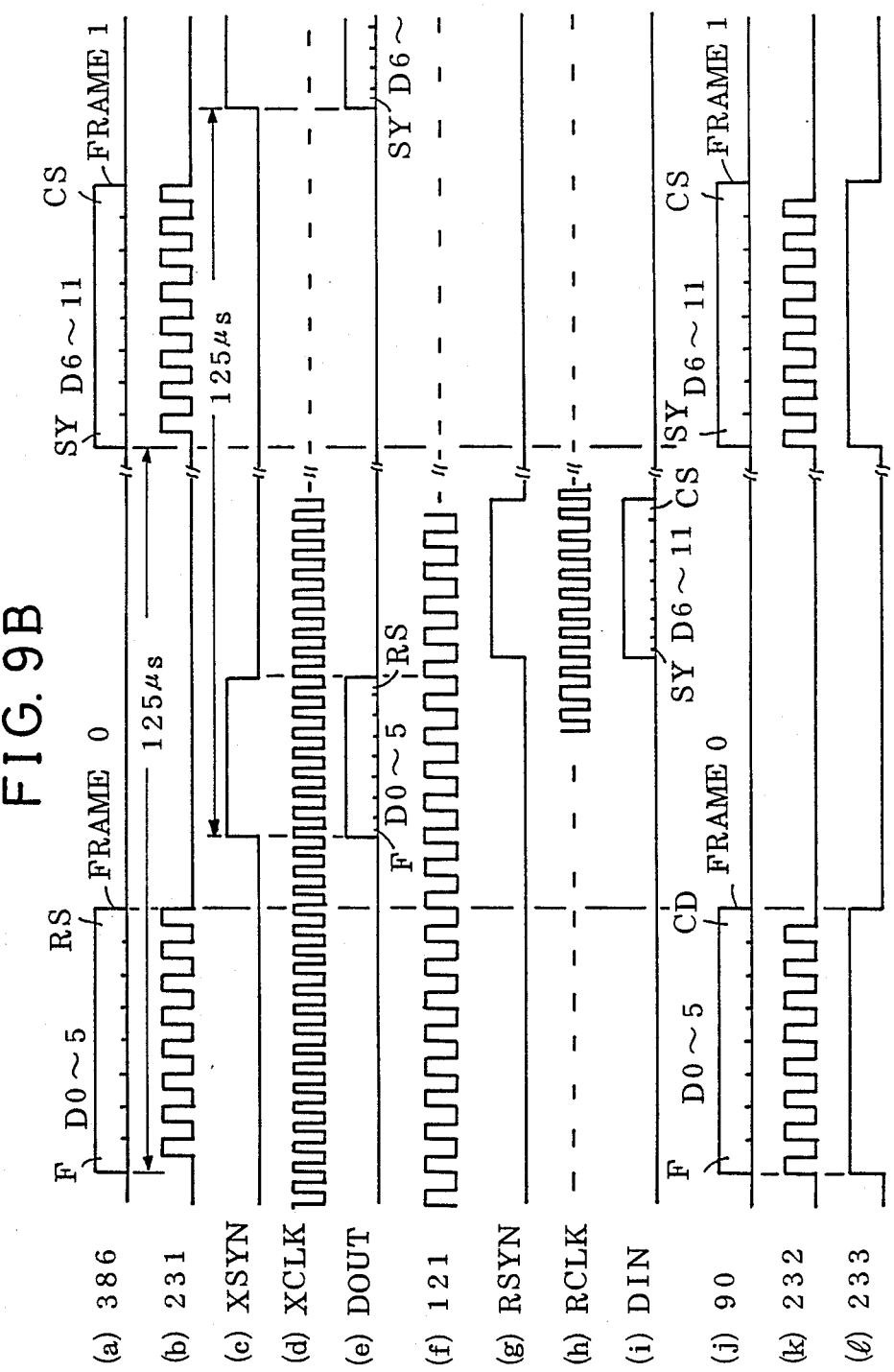

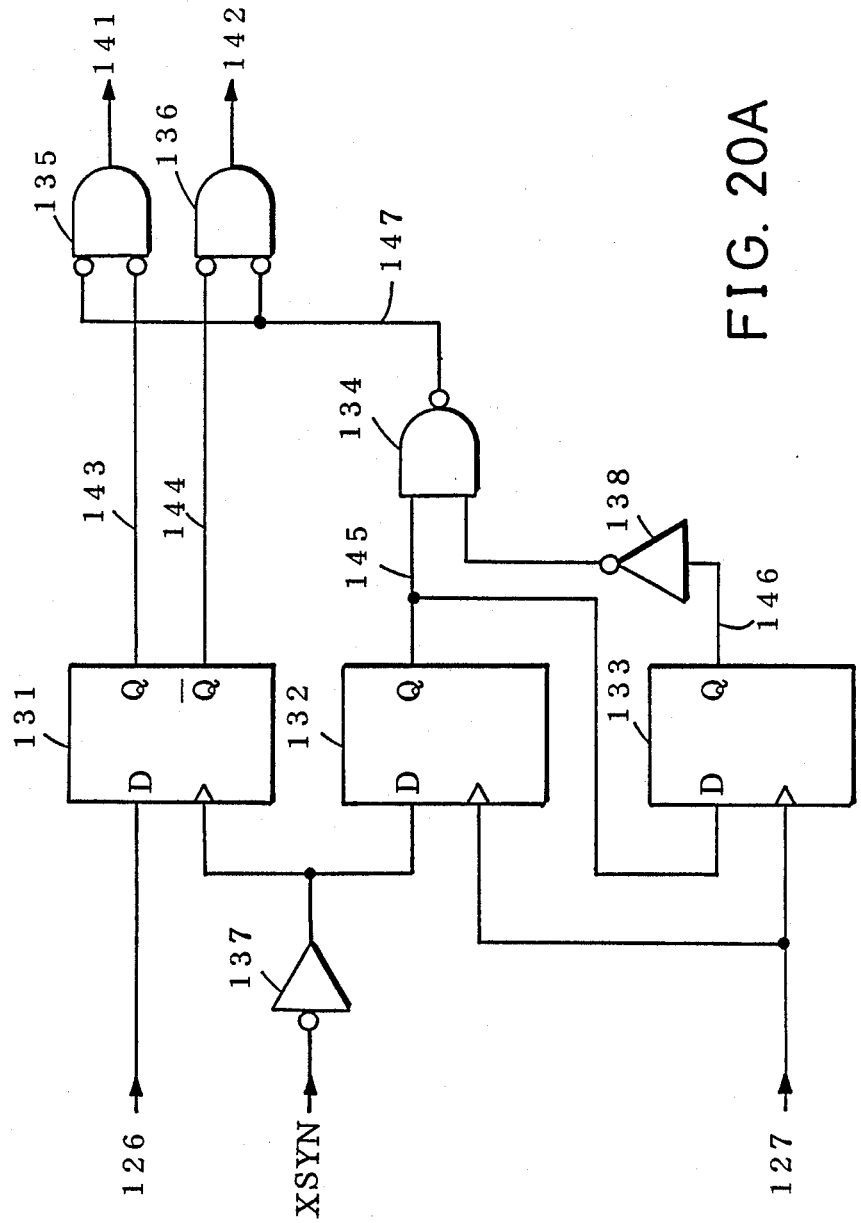

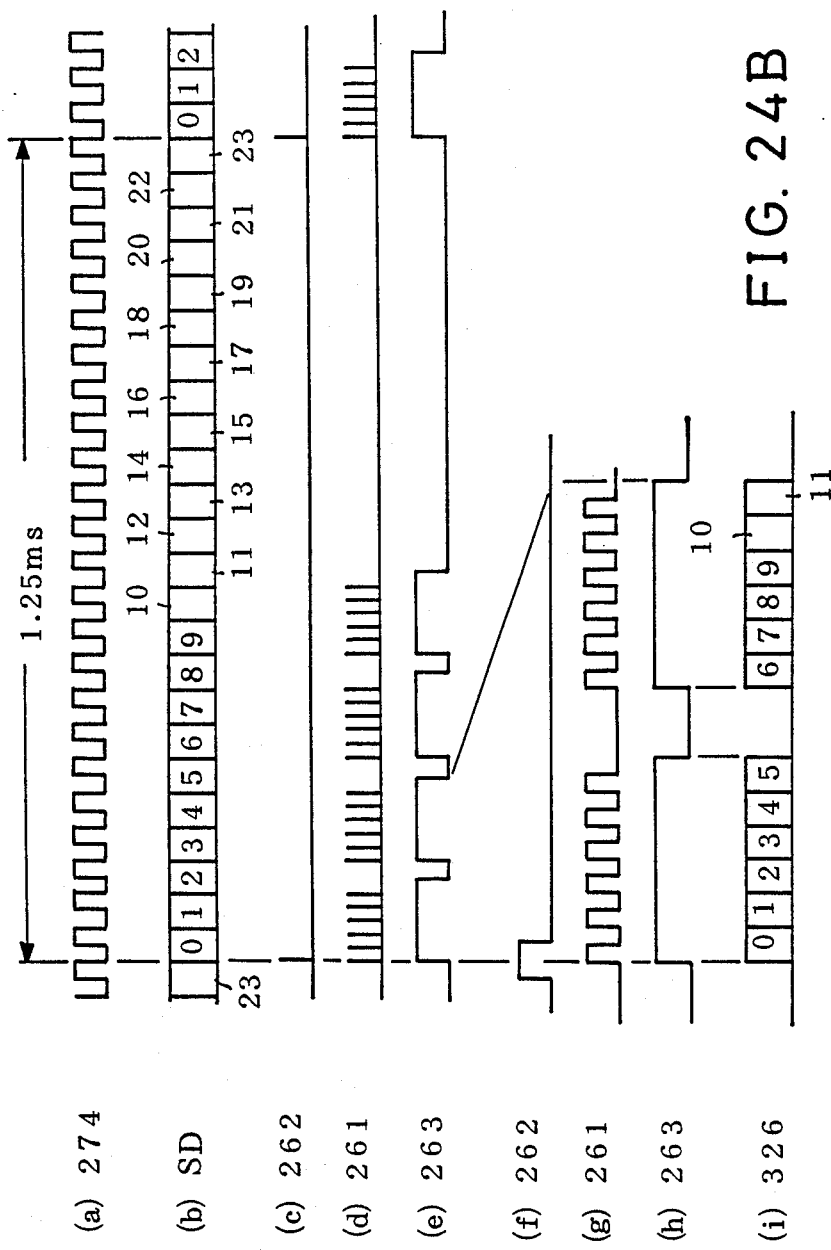

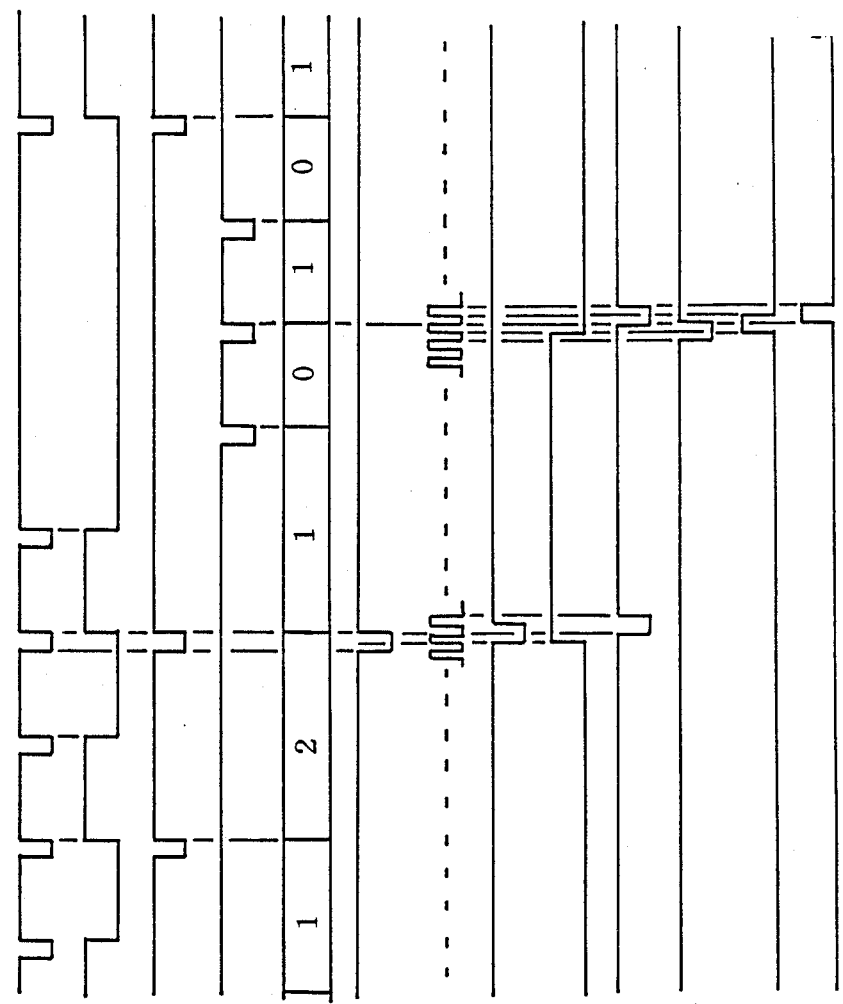

DATA CIRCUIT-TERMINATING EQUIPMENT

BACKGROUND OF THE INVENTION

1. Field of the Invention

The present invention relates to a data circuit-terminating equipment for terminating a data transmission line.

The invention is particularly concerned with a data circuit-terminating equipment for connecting various asynchronous data terminal equipments with a PCM transmission line.

2. Description of the Prior Art

The prior art relating to a conventional data circuit-terminating equipment for various synchronous data terminal equipments is disclosed in U.S. Pat. No. 4,694,470 which will be described.

With reference to FIGS. 1 and 2, the principle of the prior art will first be described in detail.

FIG. 1 is a diagram showing the principles established to accommodate a terminal equipment having a speed of 19.2 Kbps in an electronic exchange with a 64 Kbps transmission line. Flag synchronizing bits (F bits) at a bit "0" position of a frame "0" is to notify the frame position to a receiving party by transmitting a flag pattern "1010". The receiving party can easily recognize the frame position by detecting the flag pattern. To accommodate the 19.2 Kbps terminal equipment in the 64 Kbps transmission line, it is necessary only to accommodate data D0 to D23 of 24 bits in specified bit positions every 10 multi frames, as shown in FIG. 1. Incidentally, blank fields are not used.

FIG. 2 shows the principles established to accommodate a 9.6 Kbps terminal equipment. If data D0 to D11 of 12 bits which is one-half that in the case of 19.2 Kbps in FIG. 1 can be accommodated, a transmission speed conversion is possible. In this instance, however, in order to accommodate data of different transmission speeds in the same circuit, the same data is inserted twice in succession, as depicted in FIG. 2, thereby to accommodate data of a transmission speed different from 19.2 Kbps. In a similar manner, data of 4.8 Kbps and data of 2.4 Kbps can be accommodated by inserting the same data four times and eight times in succession, respectively.

A description will be given, with reference to FIG. 3, of the principle of a synchronization establishing bit (a SY bit) at the bit 0 position of the frame 1. In FIG. 3, reference characters $L_1$ and $L_2$ indicate lines which are transmitting and receiving lines, respectively, as viewed from the party of equipment (A), but receiving and transmitting lines, as viewed from the party of equipment (B). The following description will be given, with the above lines as viewed from the party (A).

The line interface equipment (data circuit-terminating equipment) DCEa on the party (A) detects the F bit on the receiving line $L_2$ and, upon establishment of synchronization, puts the SY bit into its ON state and provides it on the transmitting line $L_1$. The equipment DCEb on the party (B) similarly provides the ON state of the SY bit on the receiving line $L_2$ when synchronization of the transmitting line $L_1$ is established by the F bit. Thus the equipment DCEa on the party (A) can detect the synchronized state of the transmitting line $L_1$ by monitoring the SY bit on the receiving line $L_2$. This is also true for the equipment DCEb on the party (B). Control line information defined by JIS-C6361 is accommodated in bits 7 of frames 0 to 3. In FIGS. 1 and 2, signals above oblique lines are control signals to be provided on the transmitting line $L_1$ and signals below the oblique lines are control signals to be received from the receiving line $L_2$.

In FIG. 2, RS indicates a request-to-send signal for requesting transmission, CD a carrier detect signal, CS and CS' clear-to-send signals, ER an equipment ready signal, DR a data set ready signal and CI' call indicator signal.

Each equipment DTEa and DTEb includes an address sending circuit respectively to send out an address. A modem MDM has an address receiving circuit which receives an address and sends out a defined signal to a line or an equipment connected with the modem MDM in which the line or the equipment is not shown in FIG. 3. The address is received or transmitted between the address sending and receiving circuits.

FIG. 4 shows a method for accommodating control signals between terminal equipments, and FIGS. 5A and 5B a method for accommodating control signals between a terminal equipment and a modem.

In FIG. 4, since terminal equipments (A) and (B) are interfaces of the same input/output relationship, sending data SD sent from the terminal equipment (A) is received as receiving data RD at the terminal equipment (B). Likewise, the other lines are connected as shown. Transmission lines are shown to be connected to have a one-to-one correspondence to each other for the sake of clarity, but since data is accommodated in such formats as depicted in FIGS. 1 and 2, the transmission lines are concentrated to the two transmitting and receiving lines $L_1$ and $L_2$, as shown in FIG. 3. As is evident from the principles described previously in conjunction with FIGS. 1 and 2, since the control signals are sampled only once every 10 frames, for example, even if the terminal equipment (A) turns ON the RS (request-to-send) signal, the carrier detect signal CD in the terminal equipment (B) is delayed by 1.25 ms at most in turning ON. Accordingly, the terminal equipment (B) cannot receive the receiving data RD from the terminal equipment (A) if it arrives before the carrier detect signal CD turns ON.

To avoid this, the carrier detect signal CD is held in the on state during data reception, by determining the value of the request-to-send signal in terms of the logic OR of its previous and current sampled values and by determining the state of data transmission over the transmission line, as shown below in Table 1.

TABLE 1

| Previous state | Current state | Transmission state |
| --- | --- | --- |
| OFF | OFF | OFF |
| OFF | ON | ON |
| ON | OFF | ON |
| ON | ON | ON |

FIG. 6 shows the relationship between the request-to-send signal RS and the send data SD. The request-to-send signal RS and the data SD bear such a relation that data D is valid while the request-to-send signal RS is in the ON state. Sampling it in units of 10 multi frames (1.25 ms), RS sample pulses (RSP) are obtained. However, by delaying the data D by 1.25 ms and providing it as the send data SD on the transmission line and making the state decision of Table 1 to determine the value of the request-to-send signal RS, the relationship between the request-to-send signal RS and the data D becomes as shown, assuring the above-said relationship.

The delay of data for 1.25 ms can be accomplished by providing 24-stage (24-BIT) registers, as shown in FIG. 7, and by selecting timings, load pulses to be 1.25 ms for shifting the data from the register REGa to the register REGb. The reason for the provision of 24 stages of registers is to insert 24 bits in the afore-mentioned 10 multi frames.

FIG. 5A shows the connection of a terminal equipment and a modem. FIG. 5B shows a time chart illustrating signals 7 at various portions of FIG. 5A. Unlike in FIG. 4, the send data SD is connected to the sending data SD of the modem in a manner to have a one-to-one correspondence to each other. The other control signals are also connected to have a one-to-one correspondence to each other, as shown. Furthermore, the signals SC and CI, which are output from the modem, can easily be implemented by the connection to CS' and CI'.

A calling sequence between a terminal equipment (A) and a modem will be described refering to FIG. 5B.

When the terminal equipment (A) calls, the equipment ready signal ER of (a) and the request-to-send signal RS of (b) are turned from "0s" to "1s" to be transmitted to the modem. Receiving the signals ER and RS, the modem confirms that a data terminal equipment connected to the modem by a line can receive signals from the data terminal equipment (A) by checking the state of the line. Then the modem turns on a clear-to-send signal CS' from a "0" to a "1" as shown in (c). The SY bit has shown a "1" and so the clear-to-send signal CS of (d) is turned on from a "0" to a "1".

Receiving the CS signal of a "1", the data terminal equipment (A) sends out the sending data SD of (e). An address is transmitted as the first data of the sending data SD.

The line interface equipments (data circuit-terminating equipments) shown in FIGS. 3, 4 and 5A transmits data from a synchronous data terminal equipment and various control signals to a transmission line by multframe as shown in FIGS. 1 or 2 at a fixed rate of 64 kilobits per second.

On the other hand, various data terminal equipments have been available recently. Some of those data terminal equipments operate by their own clock independently of the timing of the transmission line. There has accordingly been a great increase in the demand to asynchronously transmit data from asynchronous data terminal equipments on the PCM transmission line. However, there is a problem that such an asynchronous data terminal equipment can not be connected with the PCM transmission line having various transmission rates.

There is another problem to be solved. The recommendations of the V25 bis of CCITT was enforced in 1984. The line interface equipments (data circuit-terminating equipments) as shown in FIGS. 4 and 5A can not transmit an address as one of data to be transmitted to satisfy the recommendations. Referring to FIG. 5A, such a problem will be described.

It is defined in the recommendations of the V25 bis of CCITT that the clear-to-send signal CS must be turned from a "0" to a "1" in spite of the state of the request-to-send signal RS when the clear-to-send signal CS' becomes from a "0" to a "1". And it is further defined that the request-to-send signal RS being a "1" is not needed when the equipment ready signal ER is transmitted. The data terminal equipment (A) must therefore turn the request-to-send signal RS from a "0" to a "1" after receiving the clear-to-send signal CS turned to a "1".

In FIG. 5A, an AND gate in the line interface equipment (A) can however not send out the clear-to-send signal CS of a "1" in spite of "1s" of the SY bit and the clear-to-send signal CS' when the request-to-send signal RS shows a "0" and so the clear-to-send signal CS of a "0" is received by the data terminal equipment (A) which can not turn the request-to-send signal RS from a "0" to a "1". Therefore the communication can not be started.

SUMMARY OF THE INVENTION

An object of the present invention is to provide an improved data circuit-terminating equipment for connecting an asynchronous data terminal equipment with a PCM (pulse code modulation) transmission line.

Another object of the invention is to provide a novel data circuit-terminating equipment which can process an address as one of data to be transmitted.

A further object of the present invention is to provide a data circuit-terminating equipment for connecting various asynchronous data terminal equipments with a PCM transmission line which can transmit data at various speeds.

Another important object of this invention is to provide a data circuit-terminating equipment to satisfy recommendations of the V25 bits of CCITT (The International Telegraph and Telephone Consultative Committee) wherein the recommendations relate to a integrated services digital network (ISDN).

Other objects, advantages and features of the present invention will become apparent to those having ordinary skill in the art upon a reading of the following description when taken in conjunction with the accompanying drawings.

BRIEF DESCRIPTION OF THE DRAWINGS

The principle, construction and operation of the present invention will be clearly understood from the following detailed description taken in conjunction with the accompanying drawings, in which

FIG. 9B is a time chart illustrating waveforms at various portions in the block diagram of FIG. 9A;

FIG. 20A is a circuit diagram illustrating an embodiment of a phase comparator 130 included in the PLL circuit 100 of FIG. 18;

FIG. 24B is a time chart illustrating waveforms at various portions in the circuit diagram of FIG. 24A;

FIG. 33B is a time chart illustrating waveforms at various portions in the circuit diagram of FIG. 33A;

FIG. 37A is a circuit diagram illustrating an embodiment of an CD receiving circuit 570 of FIG. 29A;

FIG. 37B is a time chart illustrating waveforms at various portions in the circuit diagram of FIG. 37A;

FIG. 38 is a circuit diagram illustrating an embodiment of a CS receiving circuit 580 of FIG. 29A; and FIG. 39 is a circuit diagram illustrating an embodiment of a DR receiving circuit 590 of FIG. 29A.

DESCRIPTION OF THE PREFERRED EMBODIMENTS

Like numerals and characters represent like elements throughout the figures of the drawings.

Figure 8A:
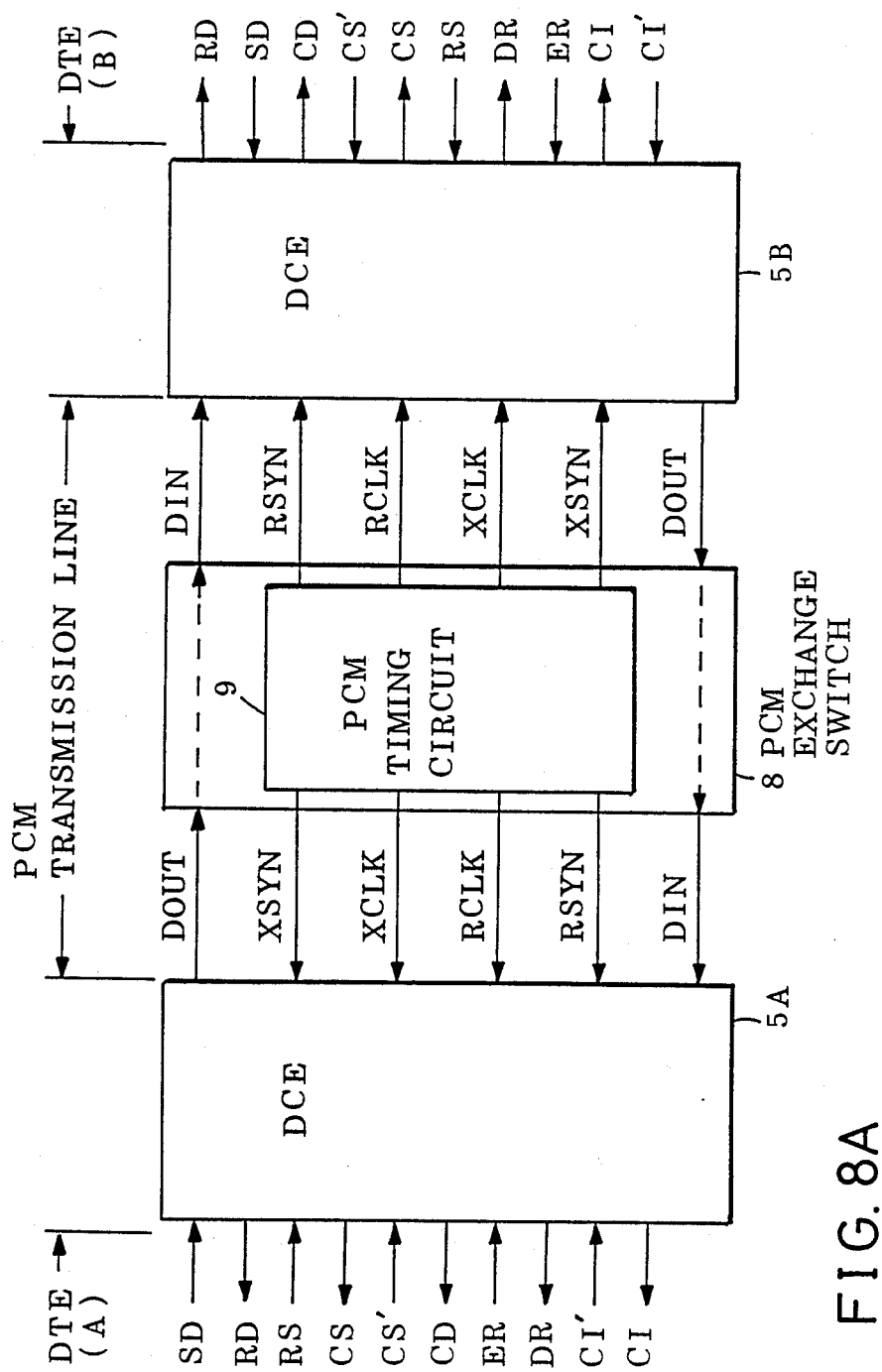
FIG. 8A is a block diagram illustrating an operational conception of the present invention.

A systematic block diagram is shown in FIG. 8A in order to describe a concept of an operation of the present invention constructed as a data circuit-terminating equipment which can be connected with a PCM transmission line transmitting data of various speeds.

There is shown in FIG. 8A a PCM transmission line between a data circuit-terminating equipment DCE 5A connected to an asynchronous data terminal equipment DTE (A) and a DCE 5B connected to a DTE (B). Data speeds on the PCM transmission line are 128, 192, 256, 384 kilobits, 1.554, 2.048 megabits per second and so on. A PCM exchange switch 8 is provided in order to exchange signals on the PCM transmission line. The PCM exchange switch 8 includes a PCM timing circuit 9 which sends out various timing signals i.e. a sending synchronization signal XSYN which is one of PCM synchronization signals, a sending clock XCLK which is one of PCM clocks, a receiving synchronization signal RSYN which is one of PCM synchronization signals and a receiving clock RCLK which is on of PCM clocks, to send and receive data signals.

Figure 8B:
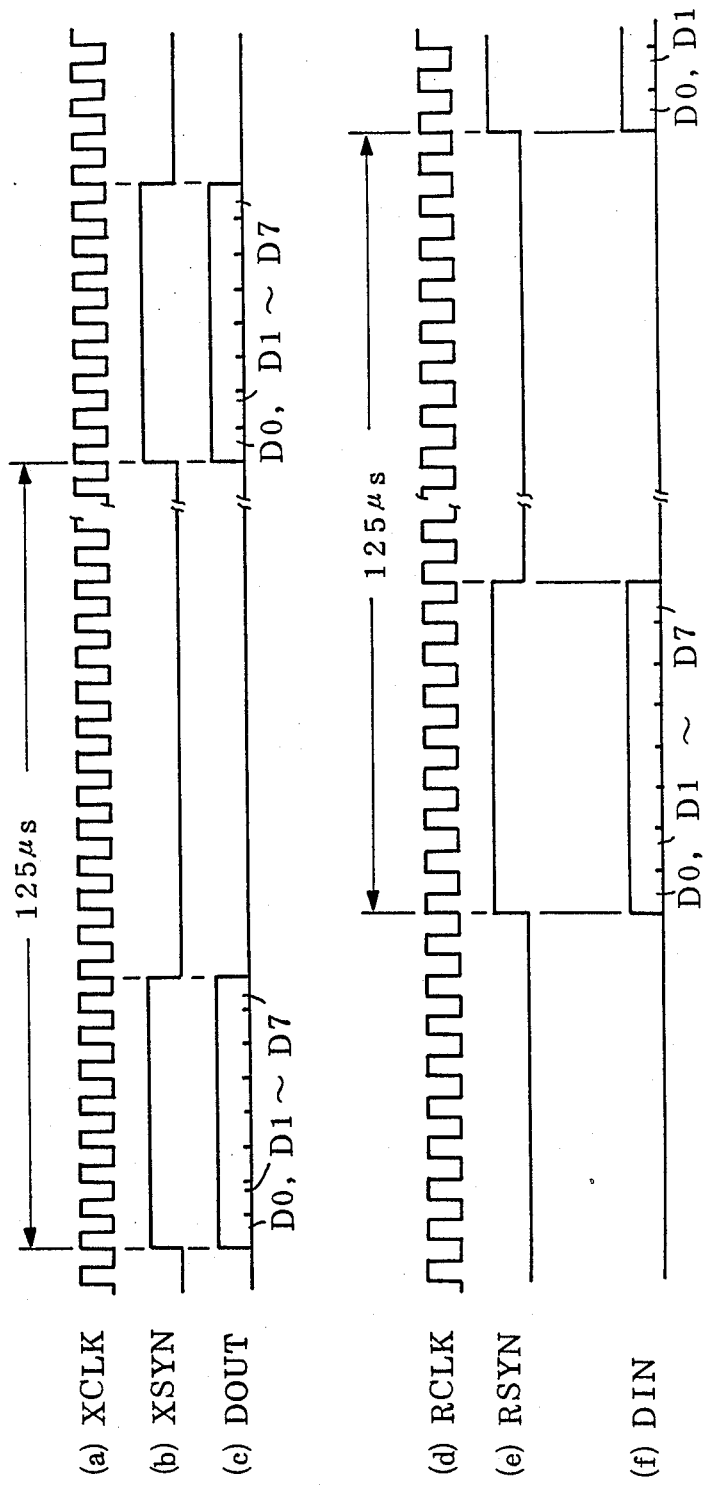
FIG. 8B is a time chart illustrating waveforms at various portions in the block diagram of FIG. 8A.

FIG. 8B is a time chart showing various timing signals from the PCM timing circuit 9 and data signals to be sent and received by the PCM exchange switch 8.

The XCLK and RCLK shown in (a) and (d) of FIG. 8B are PCM clocks which can be various speeds to define various data speeds on the PCM transmission line. When the clock XCLK and the signal XSYN synchronized with the XCLK are transmitted to the data circuit-terminating equipment DCE 5A, the equipment DCE 5A sends out data signal (D0 to D7), which comes from the equipment DTE (A), as a data-out DOUT shown in (c) of FIG. 8B to the PCM transmission line during the XSYN shown in (b) of FIG. 8B at a repetition rate of 125 microseconds.

The equipment DCE 5B receives data signal (D0 to D7), which comes from the equipment DTE A, as a data-in DIN shown in (f) of FIG. 8B, during the signal RSYN of (e), which is synchronized with the clock RCLK of (d), at a repetitio rate of 125 microseconds.

Figure 4:
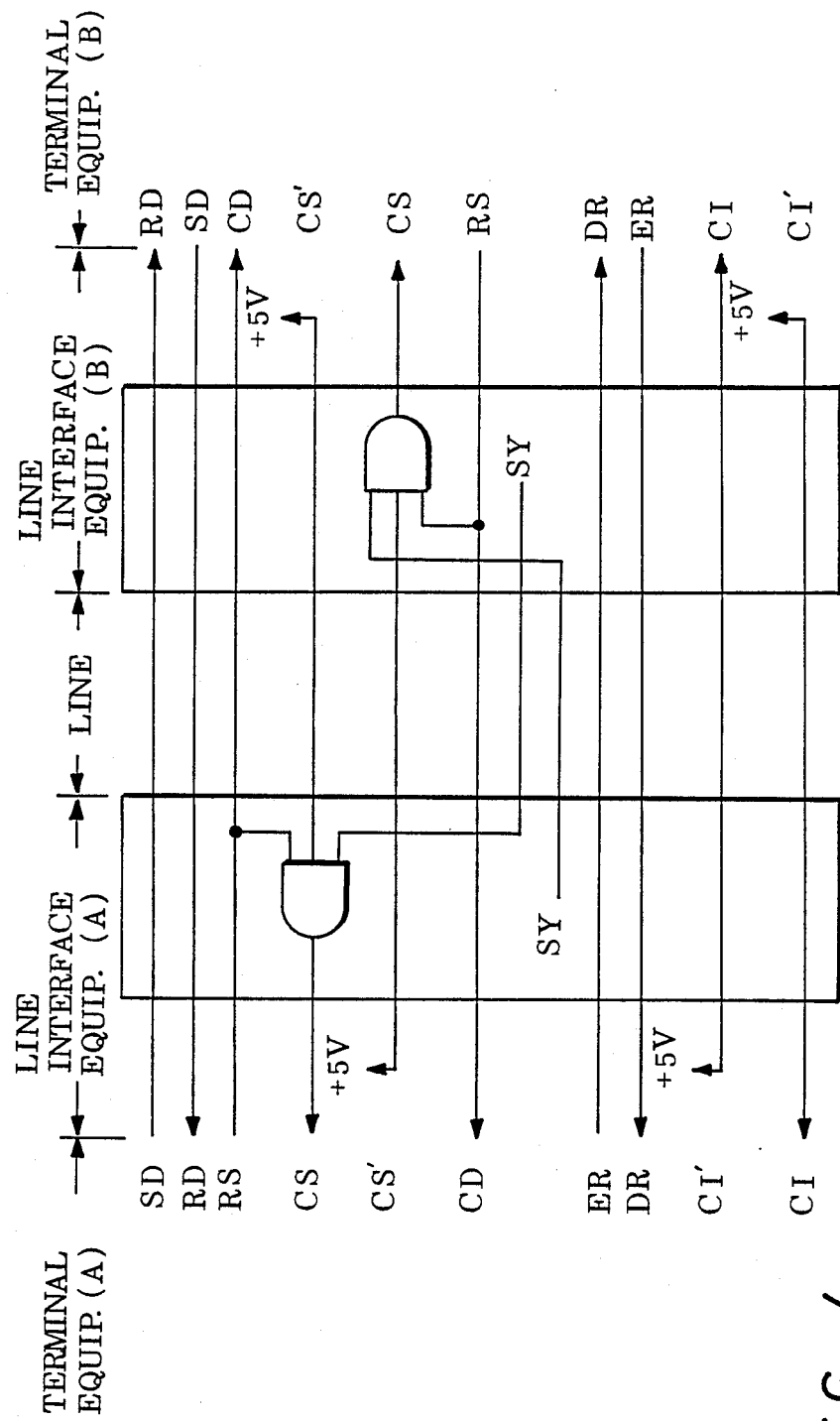
FIG. 4 is a diagram showing a control signal transmission system of the prior art.
Figure 5A:
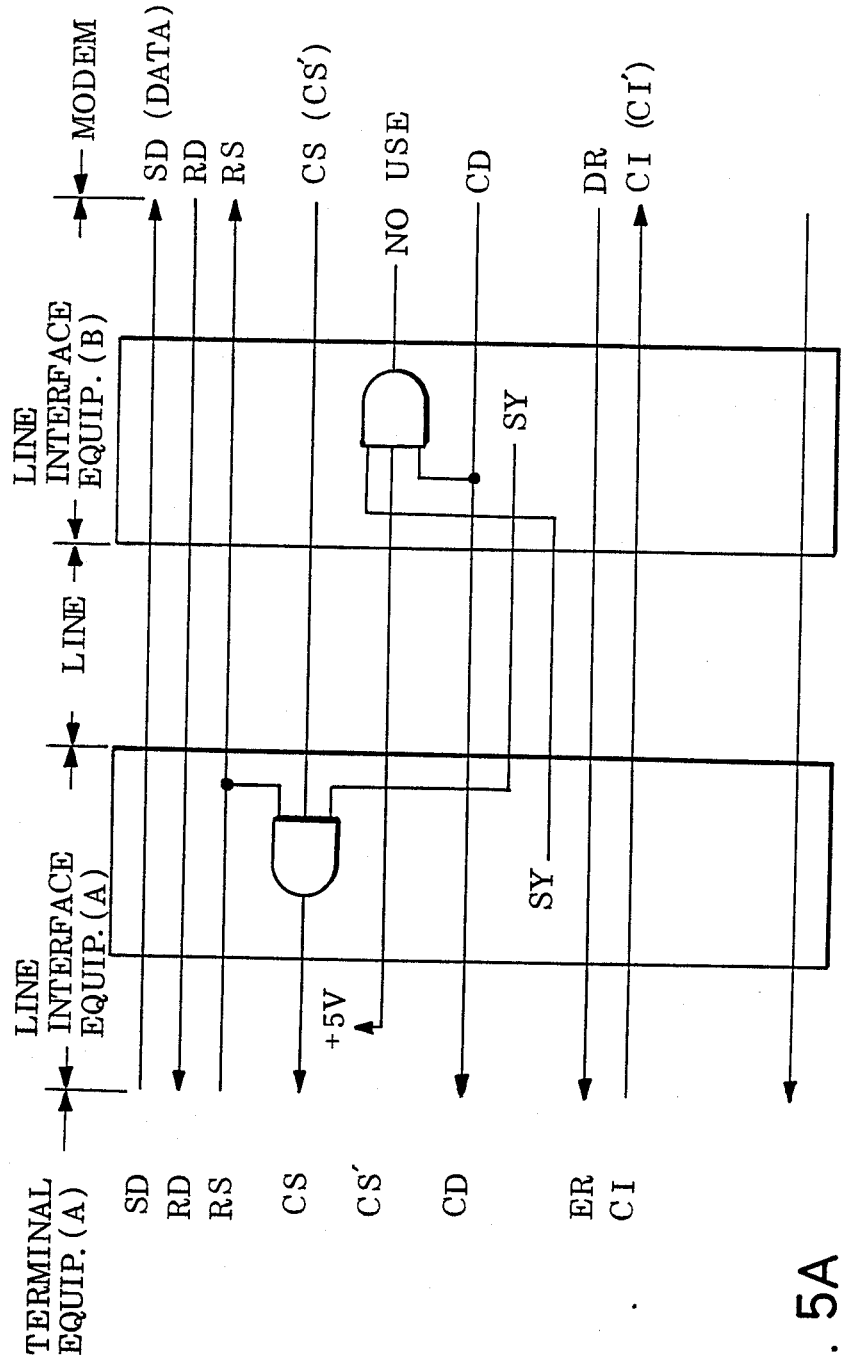
FIG. 5A is a diagram showing a control signal transmission system between a data terminal equipment and a modem in the prior art.
Figure 5B:
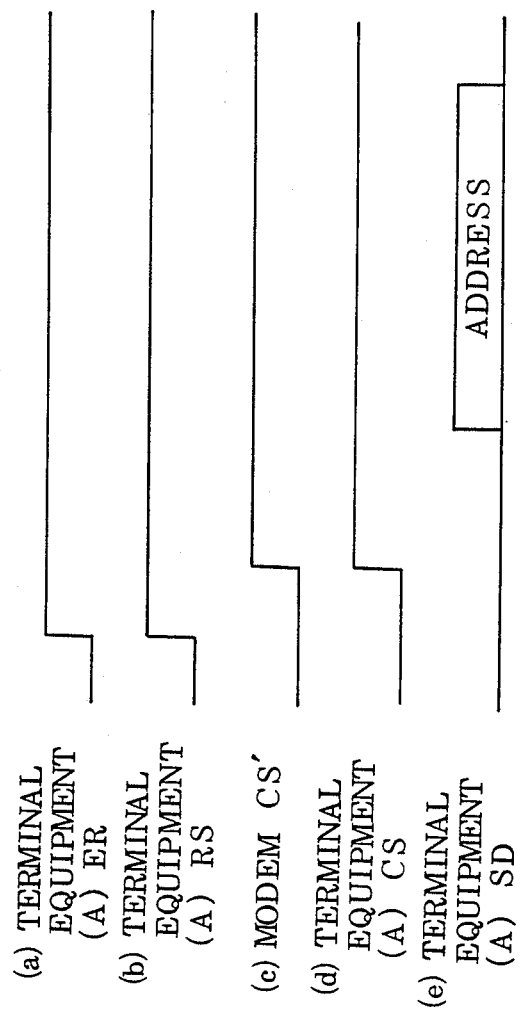
FIG. 5B is a time chart showing various signals of FIG. 5A in the prior art.

Communication between the data terminal equipments DTE (A) and DTE (B) through the data circuit-terminating equipments DCE 5A and DCE 5B can be executed by using various timing signals which are based on the signal XSYN by the equipments DCE 5A and 5B. In the communication, there are used various signals i.e. sending data SD, receiving data RD, a request-to-send signal RS, CS and CS' clear-to-send signals CS and CS', a carrier detect signal CD, a equipment ready signal ER, a data set ready signal DR and call indicator signals CI and CI' shown in FIGS. 4 and 5A illustrating the prior art.

Figure 8C:
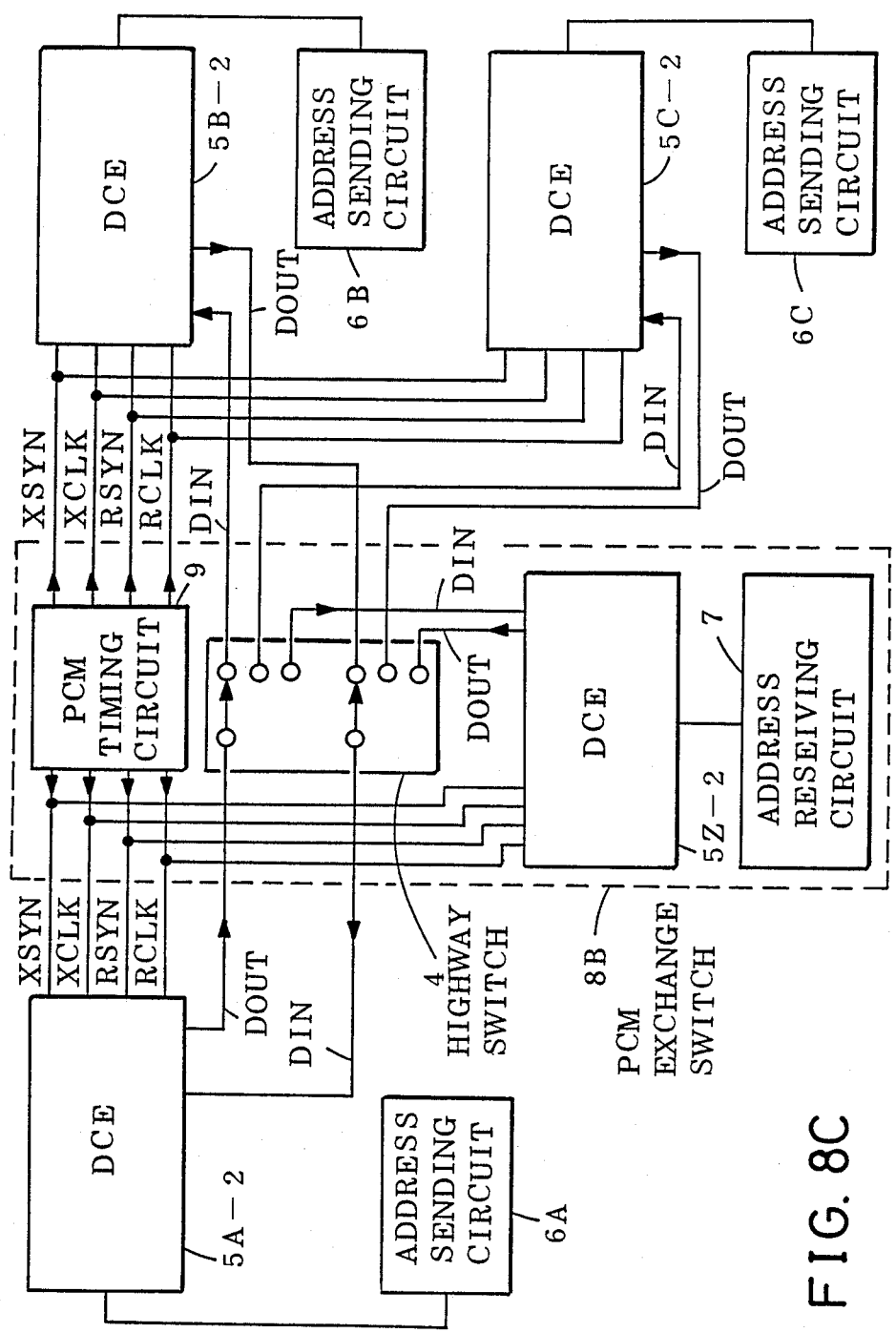
FIG. 8C is a block diagram illustrating an operational conception of another embodiment which can process an address as one of data to be transmitted.

Another systematic block diagram is shown in FIG. 8C in order to describe a concept of another operation of the present invention constructed as a data circuit-terminating equipment which satisfies recommendations of the V25 bis of CCITT (The International Telegraph and Telephone Consultative Committee) and can be connected with a PCM transmission line transmitting data of various speeds.

In FIG. 8C, address sending circuits 6A, 6B and 6C included in data terminal equipments DTEs are shown in which it is omitted to indicate data receiving circuits and data sending circuits included in those DTEs. A PCM transmission line connects a DCE (data circuit-terminating equipment) 5A-2 with DCE B5-2 and 5C-2 through a PCM exchange switch 8B. The equipments DCEs 5A-2, 5B-2 and 5C-2 are respectively connected with address sending circuits 6A, 6B and 6C. Data speeds on the PCM transmission line of FIG. 8C are 128, 192, 256, 384 kilobits, 1.544, 2.048 megabits per second and so on. The PCM exchange switch 8B includes a PCM timing circuit 9, an address receiving circuit 7, the equipment DCE 5Z-2 connecting the address receiving circuit 7 with the PCM transmission line, and a highway switch 4 exchanging equipments DCEs 5A-2, 5B-2, 5C-2 and 5Z-2, in which the highway switch 4 connects the equipment DCE 5A-2 to one of equipments DECs 5A-2, 5C-2 or 5Z-2 to be easy to understand. The address receiving circuit 7 receives addresses whch are sent from equipments DCEs 5A-2, 5B-2 and 5C-2 in which three equipments DCEs 5A-2, 5B-2 and 5C-2 are illustrated in order to be easy to understand.

There are shown in FIG. 8B various timing signals which are transmitted from the PCM timing circuit 9 to equipments DCEs 5A-2, 5B-2, 5C-2 and 5Z-2 via the PCM transmission line, and timing of data which are exchanged by the PCM exchange switch 8B.

The equipments DCEs 5A-2, 5B-2 and 5C-2 are respectively connected with asynchronous data terminal equipments which respectively include address sending circuits 6A, 6B and 6C. Those data terminal equipments not shown in FIG. 8C can transmit data each other. The address receiving circuit 7 can receive address from address sending circuit 6A, 6B or 6C.

Figure 8D:
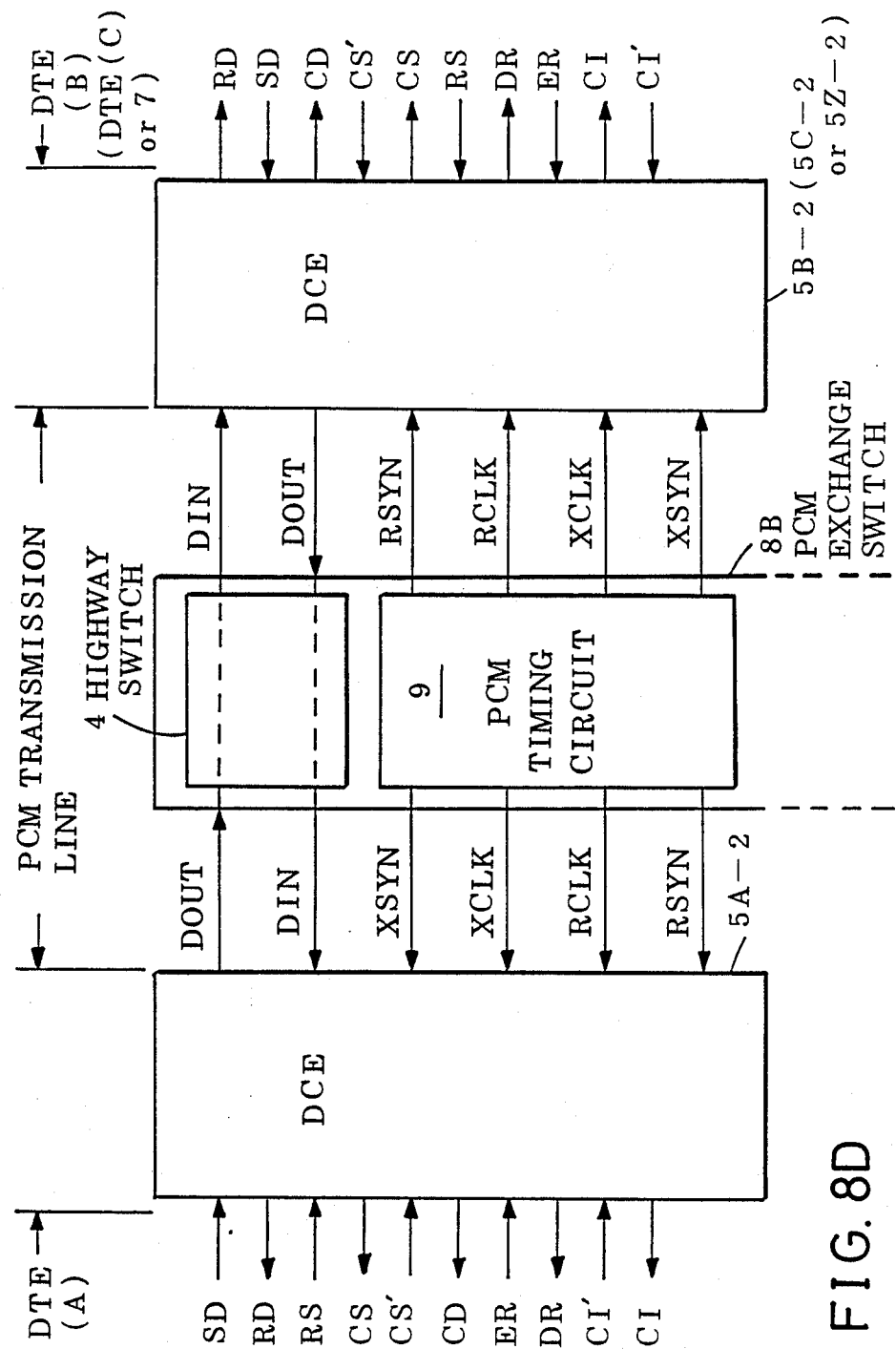
FIG. 8D is a block diagram illustrating a connection of a data circuit-terminating equipment with a PCM exchange switch.

There is detailedly shown in FIG. 8D a connection between the equipment DCE 5A-2, the equipment DCE 5A-2 (5C-2 or 5Z-2) and the highway switch 4 and PCM timing circuit 9 included in the PCM exchange switch 8B in which the equipment DCE 5A-2 is connected with the equipment DTE (A) including the address sending circuit 6A, the equipment DCE 5B-2 is connected with the equipment DTE (B) including the address sending circuit 6B, the equipment DCE 5C-2 is connected with the equipment DTE (C) including the address sending circuit 6C, and the equipment DCE 5Z-2 is connected with the address receiving circuit 7.

Each communication between the equipment DCE 5A-2 or 5B-2 (5C-2 or 5Z-2) and the address sending circuit 6A or 6B (6C or the address receiving circuit 7) is executed on the basis of a clock signal which is produced from the signal XSYN in the equipment DCE 5A-2 or 5B-2 (5C-2 or 5Z-2) so that various signals i.e. SD, RD, RS, CS, CS', CD, ER, DR, CI', CI are transmitted as shown in FIGS. 4 and 5A which show the prior art.

Figure 8E:
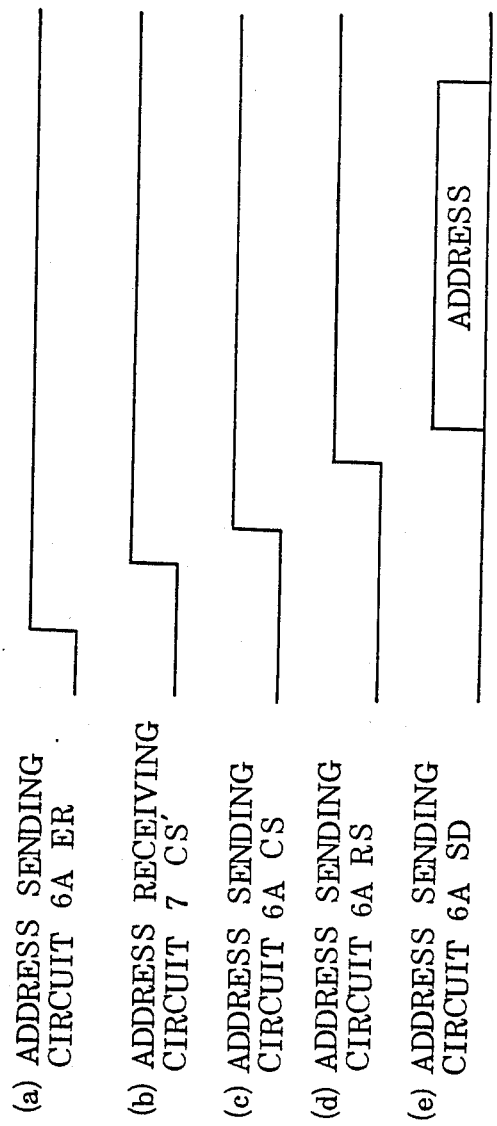
FIGS. 8E and 8F are time charts illustrating waveforms at various portions in the block diagram of FIG. 8D.

There is shown in FIG. 8E a chart illustrating signals at various portions in the block diagram of FIG. 8D in which the equipment DCE 5A-2 is connected with the equipment DTE 6A and the equipment DCE 5Z-2 is connected with the address circuit 7.

When a equipment ready signal ER is sent out from the address sending circuit 6A to call as shown in FIG. 8E (a), the address receiving circuit 7 receives the equipment ready signal ER via the equipment DCE 5A-2, the highway switch 4 and the equipment DCE 5Z-2, so that the address receiving circuit 7 sends out a clear-to-send signal CS' as shown in FIG. 8E (b). The signal CS' is transmitted to the address sending circuit 6A through the equipment DCE 5Z-2, the highway switch 4 and the equipment DCE 5A-2. The address sending circuit 6A receives the signal CS' as a signal CS shown in (c) and sends out a request-to-send signal RS as shown in (d). After that, the address sending circuit 6A sends out an address as sending data SD to the address receiving circuit 7 as shown in (e).

In such a manner, when the signal CS' indicates a "1" as shown in FIG. 8E (b), the signal CS of (c) can be sent out from the equipment 5A-2 to the address sending circuit 6A in spite of the signal RS of (d) indicating a "0". Thus the recommendations of the V25 bis of CCITT can be satisfied.

The address in FIG. 8E (e) is applied to a highway switch controller being not shown, so that the highway switch 4 is controlled to connect the equipment DTE (A) including the address sending circuit 6A to e.g. the equipment DTE (B) including the address sending circuit 6B. This aspect is shown in FIG. 8F.

Figure 8F:
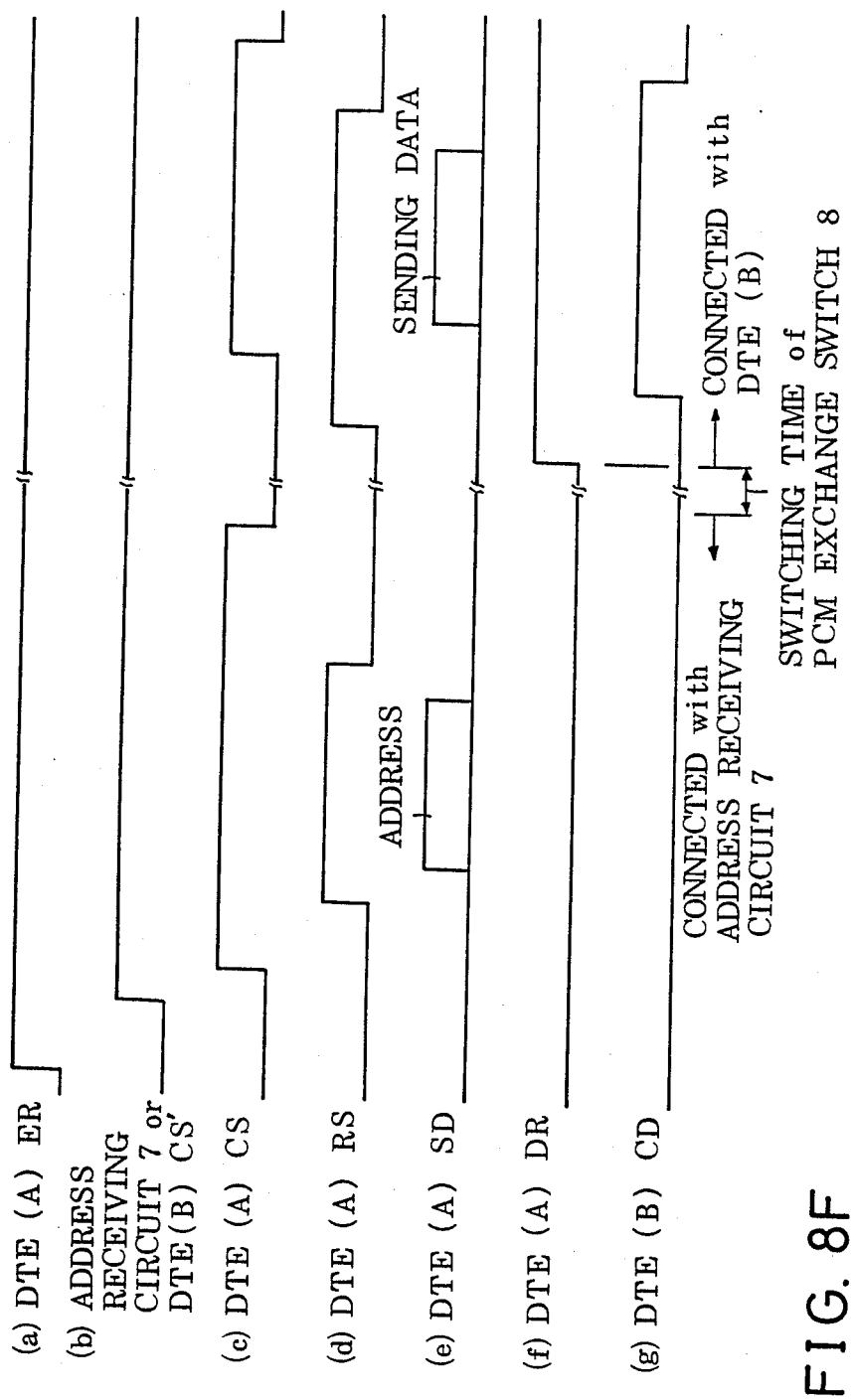

In FIG. 8F, the address of (e) is sent out as the sending data SD and so the equipment DTE (A) and (B) can be connected by operation of the PCM exchange switch 8. The equipment DTE (B) sends out a signal ER to the equipment DTE (A) which receives the signal ER as a data-set-ready signal DR of (f) and sends out the signal RS of (d). The signal RS is received as a carrier detect signal CD of (g) by the equipment DTE (B) which has a short line to short the signal CD and a carrier-to-send signal CS'. The signal CS' is therefore sent out to the equipment DTE (A). The equipment DTE (A) receives the CS' signal as a carrier-to-send CS signal of (c) and start to send out a sending data SD as shown in (e).

Having sent out the sending data SD of (e), the equipment DTE (A) changes the RS signal of (d) from a "1" to a "0" to be sent to the DTE (B) so that the equipment DTE (B) changes the signal CD of (g) from a "1" to a "0". The signal CS of (c) is therefore changed from a "1" to a "0" because the CS signal is shorted to the signal CD.

Figure 9A:
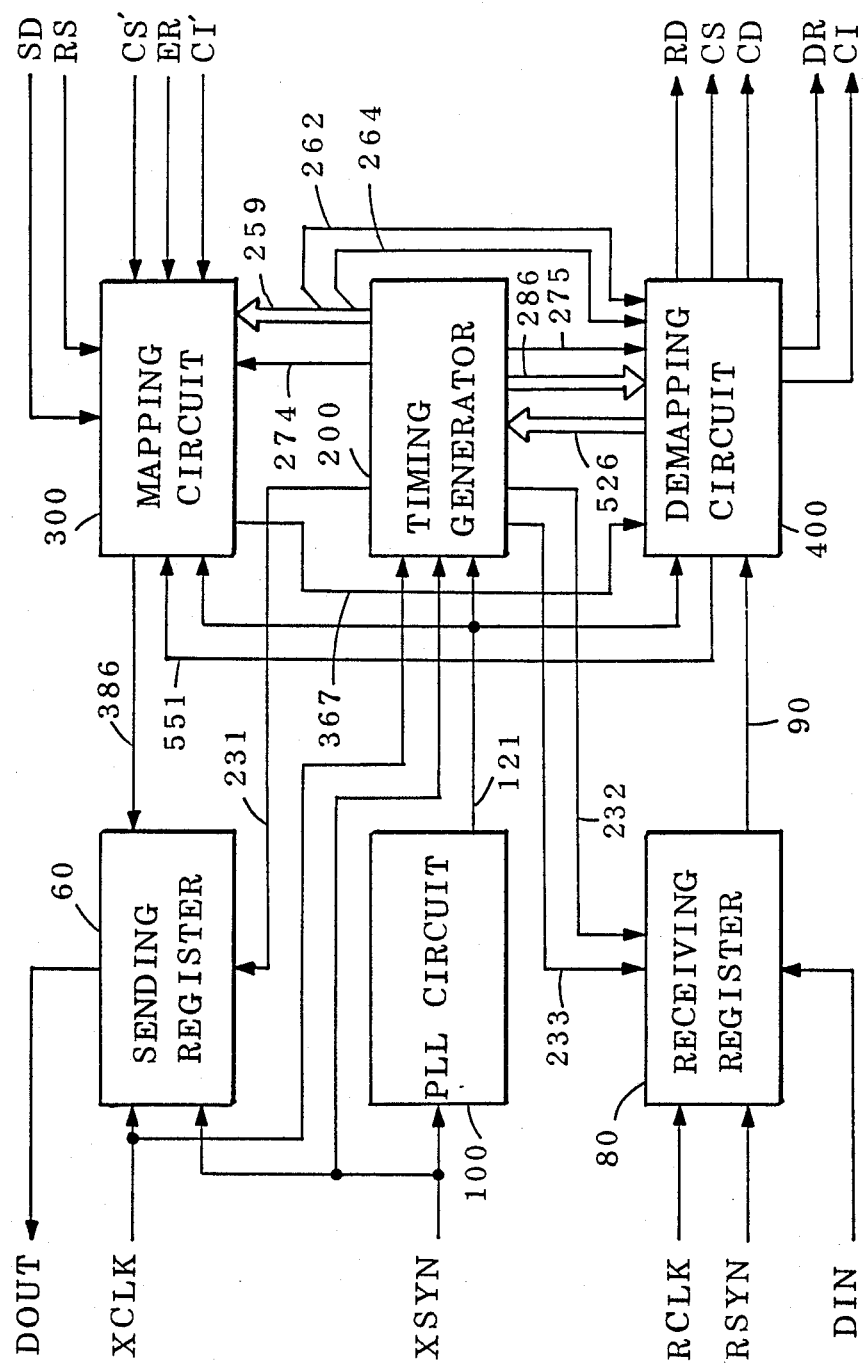
FIG. 9A is a block diagram illustrating an embodiment in accordance with the present invention.

There is shown in FIG. 9A a block diagram of an embodiment of the data circuit-terminating equipment DCE 5A or 5B according with the invention of which concept is illustrated in FIG. 8A. The equipment DCE 5B has the same construction as that of the equipment DCE 5A.

There is shown in FIG. 9B a time chart illustrating waveforms at various portions in the block diagram of FIG. 9A.

In FIG. 9A, numeral 100 indicates a PLL (phase-locked loop) circuit which generates a standard clock 121 on the basis of a sending synchronization signal XSYN from the PCM transmission line. Various timing signals in the equipment DCE 5A or 5B are produced from the standard clock 121. The timing relationship between the signal XSYN and the standard clock 121 is shown in FIG. 9B (c) and (f). A leading edge of the standard clock 121 of (f) synchronizes with a trailing edge of the signal XSYN of (c).

Receiving the standard clock 121 of (f), a sending clock XCLK of (d) and the signal XSYN of (c), a timing generator 200 generates various timing signals 231 of (b), 232 of (k), 233 of (l), a bus signal 259 including signals 262 and 264 and a bus signal 286.

Figure 1:
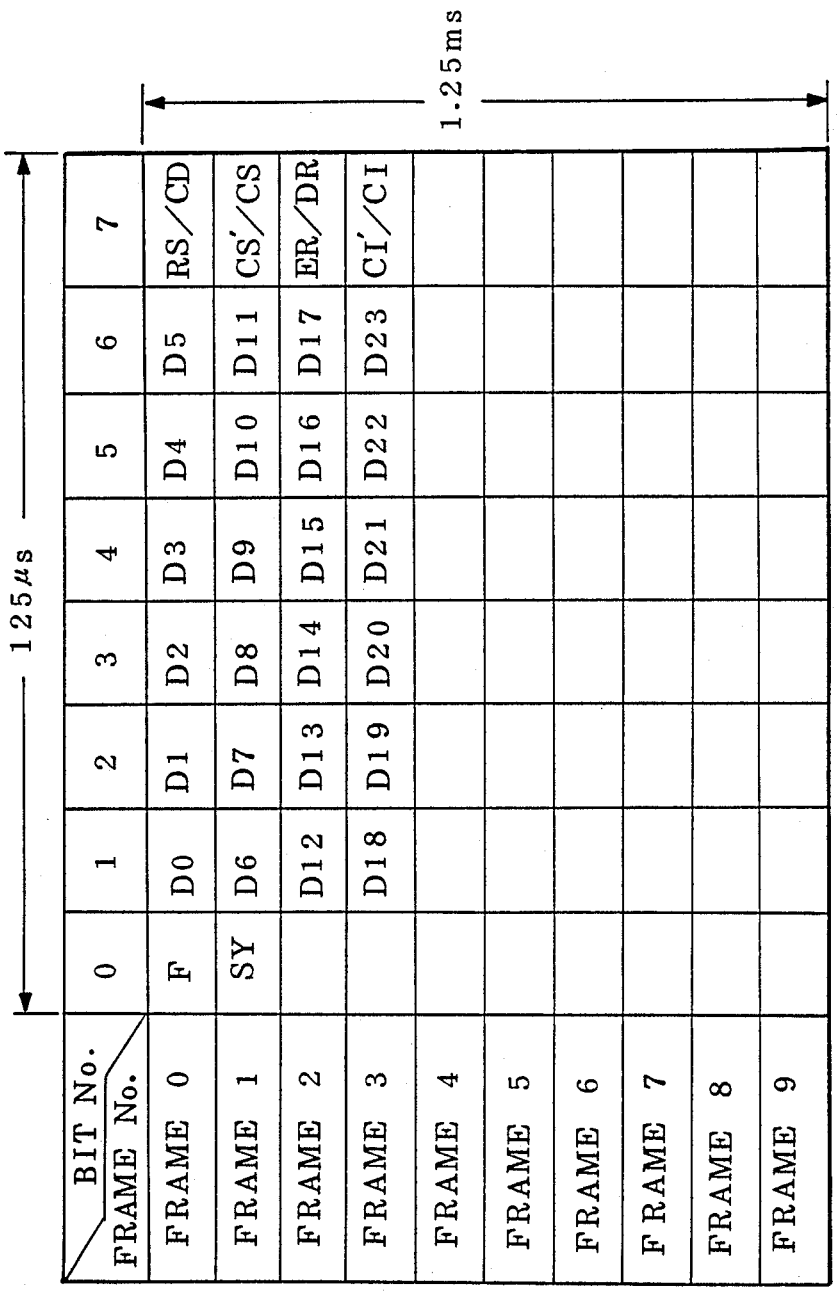
FIG. 1 is a time chart showing time slots for accommodating respective control signals and data of a 19.2 Kbps transmission speed in the prior art.
Figure 2:
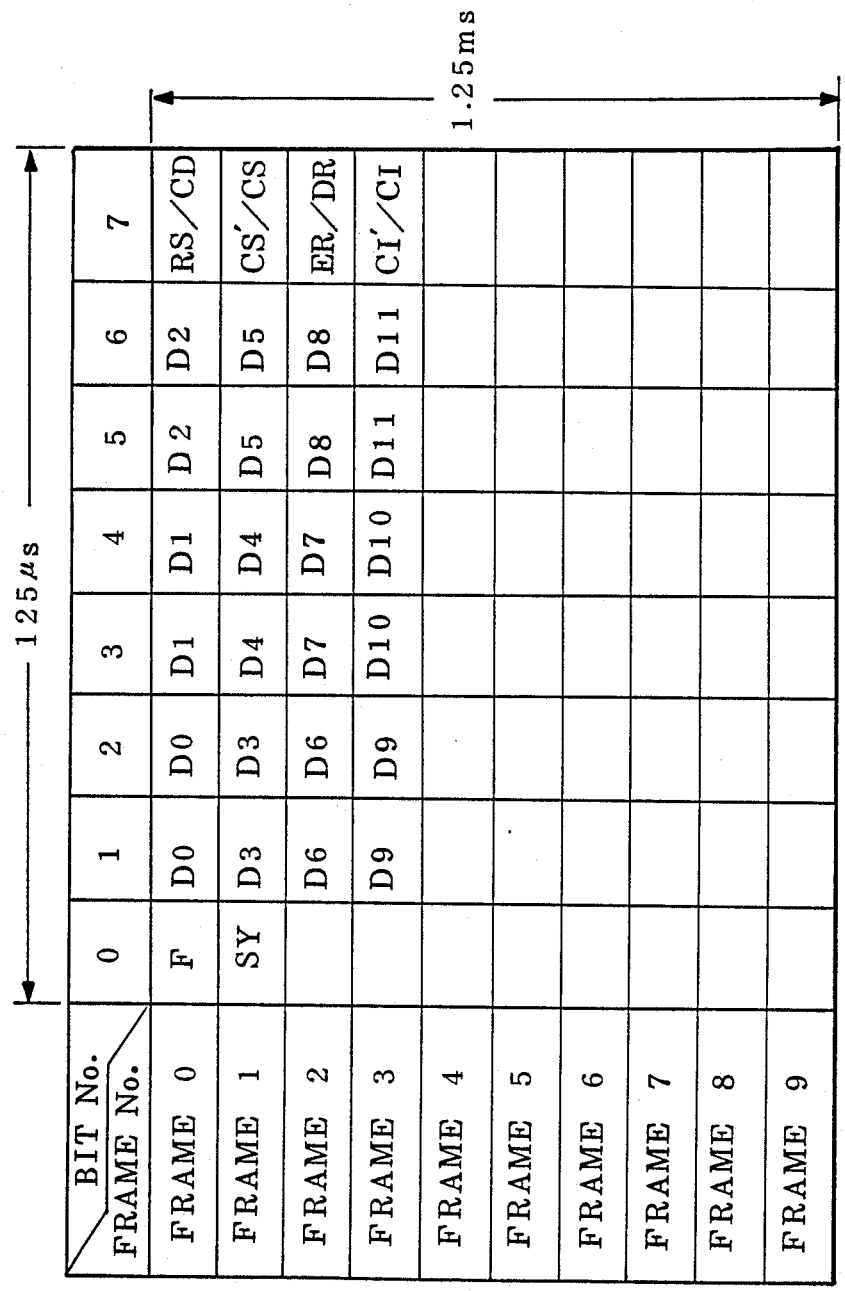
FIG. 2 is a time chart showing time slots for accommodating respective control signals and data of a 9.6 Kbps transmission speed in the prior art.
Figure 3:
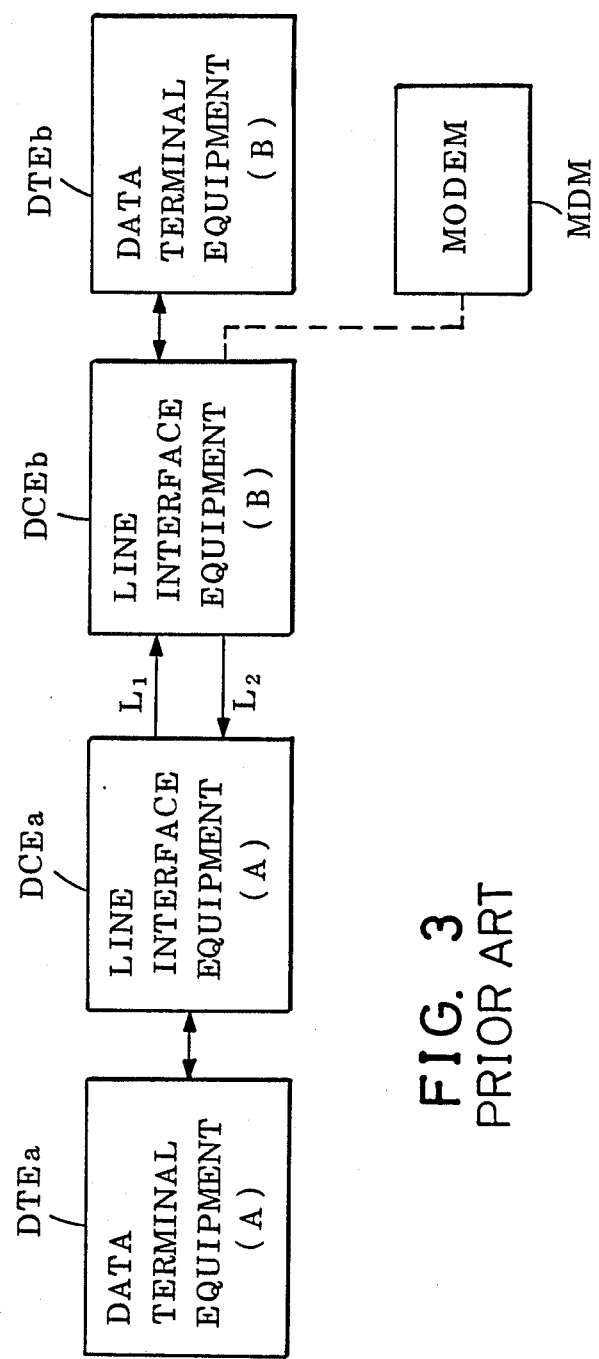
FIG. 3 is a block diagram illustrating a transmission system of the prior art.

Numeral 300 identifies a mapping circuit which maps a sending data SD, a request-to send signal RS, a clear-to-send signal CS', a equipment ready signal ER and a call indicator signal CI', which are transmitted from a data terminal equipment, as shown in FIGS. 1 or 2, to send out a mapped signal 286 of FIG. 9B (a).

Numeral 60 denotes a sending register which is loaded by means of sampling the mapped signal 386 of FIG. 9B (a) by a signal 231 of (b) and sends out the loaded contents as a data-out signal DOUT of (e) synchronously with the clock XCLK of (d) during the signal XSYN of (c). The data-out signal DOUT of (e) is formed at every frame which is sent out at every signal XSYN of (c) having a repetition rate of 125 microseconds. Every frame is mapped as shown in FIGS. 1 or 2 and so each frame is sent out in order of frame numbers.

Numeral 80 designates a receiving register which is loaded by sampling a data-in signal DIN of FIG. 9B (i) by a receiving clock RCLK of (h) during a receiving synchronization signal RSYN of (g). So the receiving register 80 sends out a signal to-be-demapped 90 synchronously with a timing signal 232 of (k) during another timing signal 233 of (l) of FIG. 9B.

Numeral 400 represents a demapping circuit which receives the signal to-be-demapped 90 including a receiving data RD (D0 to 5, DS to 11—in FIG. 9B (j)), a clear-to-send signal CS, a data set ready signal DR, a call indicator signal CI and a carrier detect signal CD which are demapped by a process reverse to the mapping process shown in FIGS. 1 and 2. The demapping process of the signal RD is executed at the timing of signals 262 and 275, the same of the signals CS, DR and CI at the timing of the bus signal 286, and the same of the signal CD at the timing of the signal 264. Those demapped signals are sent out from the demapping circuit 400 to the data terminal equipment.

Further, the demapping circuit 400 sends out the frame numbers (frame 0, frame 1, ---) shown in FIG. 9B (j) as the bus signal 526 to the timing generator 200. Receiving the bus signal 526, the timing generator 200 generates the bus signal 286 for demapping process.

The demapping circuit 400 detects a SY-bit (the first bit) of the frame 1 in FIG. 9B (j) and so the demapping circuit 400 sends out a signal 551 to the mapping circuit 300, which maps the SY-bit in the frame 1 of (a), in which the signal 551 indicates the establishment of the synchronization.

Receiving the signal RS, the mapping circuit 300 sends out a signal 367 to the demapping circuit 400 which sends out the signal CS by ANDing the signal 367 and a CS-bit included in the frame 1 of FIG. 9B (j).

Figure 9C:
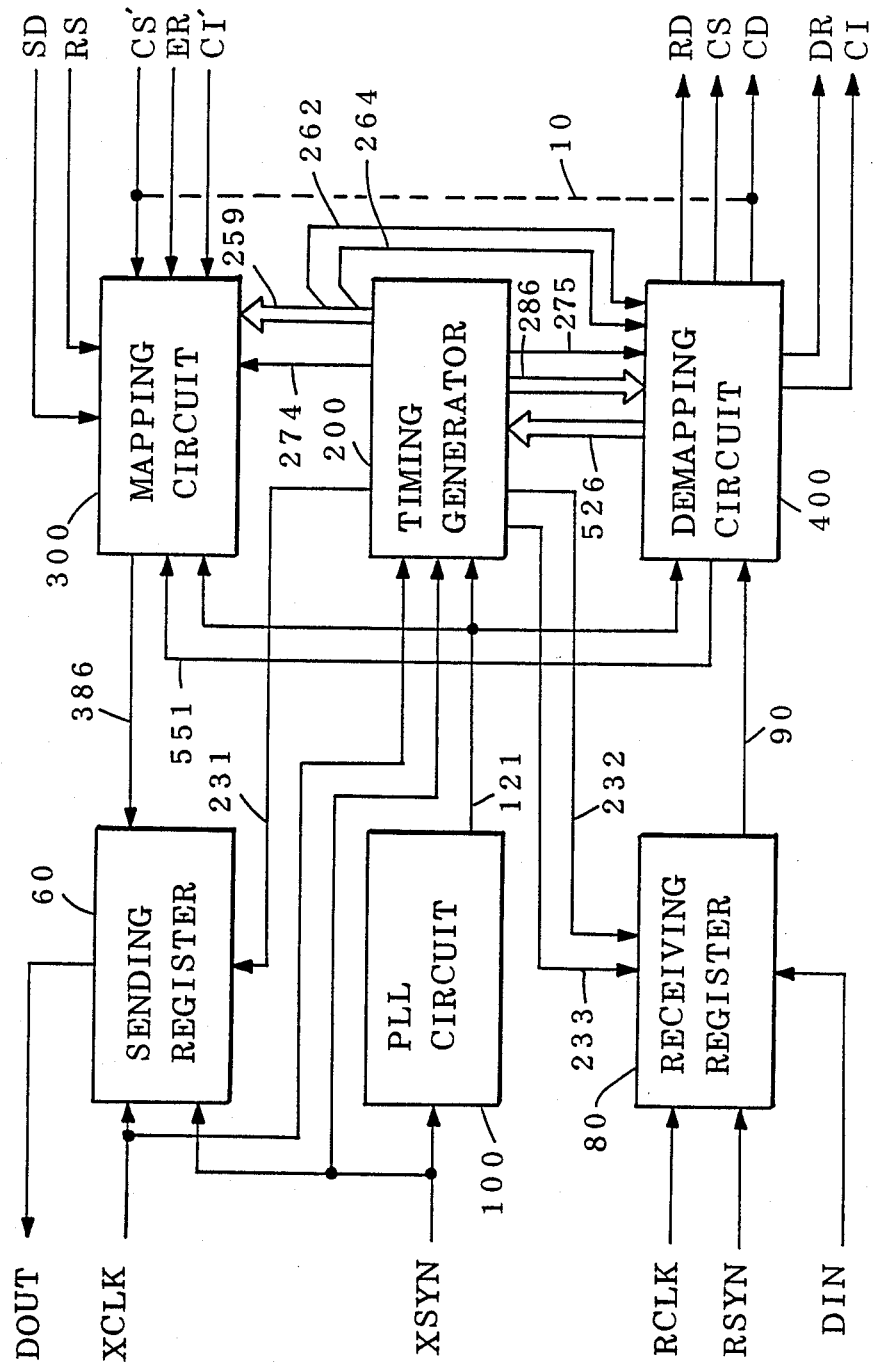
FIG. 9C is a block diagram illustrating another embodiment in accordance with the present invention.

There is shown in FIG. 9C a block diagram of an embodiment of the data circuit-terminating equipment DCE 5A-2, 5B-2, 5C-2, or 5Z-2 according with the invention of which concept is illustrated in FIGS. 8C and 8D.

The equipment DCE 5A-2 has the same construction as that of the equipments DCEs 5B-2 and 5C-2.

It is the difference of the equipment DCE 5A-2 shown in FIG. 9C from the equipment DCE 5A shown in FIG. 9A that a short line 10 is appended between the signal CS' and the signal CD, and the signal 367 from the mapping circuit 300 to the demapping circuit 400 is omitted.

It is the difference of the equipment DCE 5Z-2 form the equipment DCE 5A-2 shown in FIG. 9C that the short line 10 is omitted.

When e.g. the equipment DCE 5A-2 connected with the equipment DTE (A) receives the signal RS from the equipment DTE (B) via the equipment DCE 5B-2 as shown in FIG. 8D, the demapping circuit 400 of the equipment DCE 5A-2 receives the signal RS through the receiving register 80 and demaps it to change the signal CD from a "0" to a "1". The signal CD of a "1" is sent out to the mapping circuit 300 through the short line 10. The mapping circuit 300 receives the signal CD as the signal CS' of a "1" in which the signal CS' is mapped to be sent out to the equipment DTE (B) via the sending register 60. The equipment DTE (B) receives the mapped signal CS' as a signal CS. It is therefore not needed to obtain ANDing the signal 367 and a CS-bit included in the frame 1 (FIG. 9B) as shown in FIG. 9B.

In the case of the equipment DCE 5Z-2, the short line 10 is omitted in FIG. 9C, because the equipment DCE 5Z-2 is connected with the only address receiving circuit 7. The circuit 7 causes the signal CS' from a "0" to a "1" to send out the signal CS' to e.g. the equipment DTE (A) in only case the circuit 7 can receive an address when the circuit 7 receives a signal CD from the equipment DTE (A). Receiving the signal CS', the equipment DTE 5A sends out the address as a sending data SD to the address receiving circuit 7 as shown in FIGS. 8E (e) and 8F (e).

Figure 10:
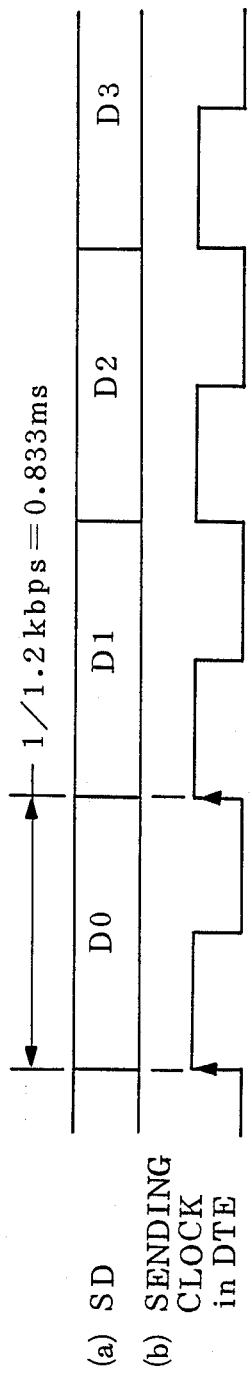
FIG. 10 is a time chart illustrating timing to send out data from a data terminal equipment.

There is shown in FIG. 10 a relationship between a sending data SD of (a) and a sending clock of (b) in a data termination equipment (DTE) connected with equipments DCEs 5A, 5B, 5A-2, 5B-2, 5C-2 or 5Z-2. Data D0, D1,—are sent out as the sending data SD of (a) to the mapping circuit 300 at every leading edge of the sending clock of the equipment DTE of (b) which is not synchronized with the equipment DCE 5A (5B, 5A-2, 5B-2, 5C-2 or 5Z-2).

Figure 11:
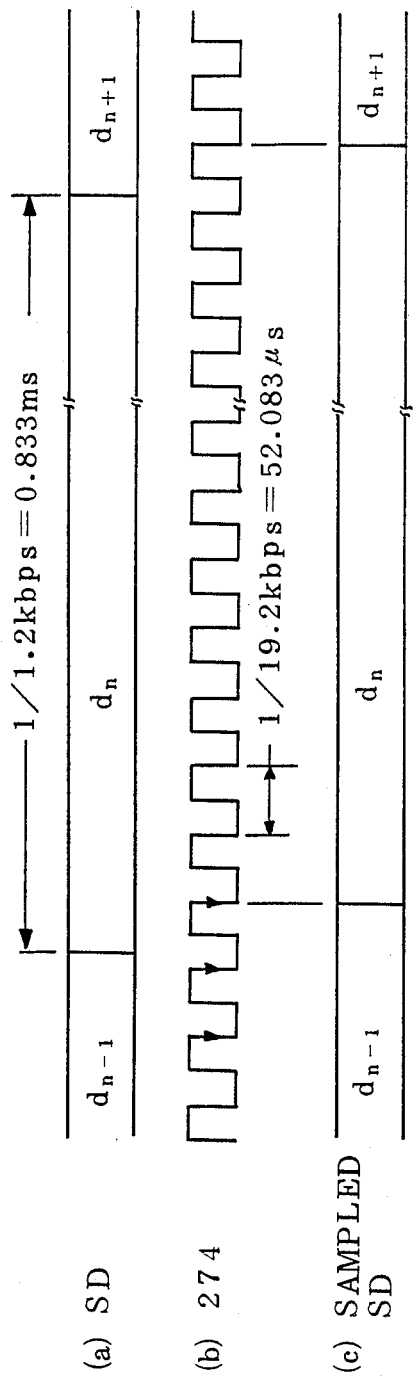
FIG. 11 is a time chart illustrating a relationship between timing signal to sample sending data from a data terminal equipment and a sampled sending data in which the timing signal is generated by a timing generator 200.

There is shown in FIG. 11 a relationship of the sending data SD of (a), a timing signal 274 of (b) and a sampled sending data SD of (c) in the case of the transmission rate of 1.2 kilobits per second at which rate the data terminal equipment sends out the sending data SD of (a) to the mapping circuit 300.

Receiving the sending data SD of (a), the mapping circuit 300 maps the sampled SD of (c) by multi-sampling every data using the signal 274 of (b) in which each data is sampled 16 times in FIG. 11.

Figure 12:
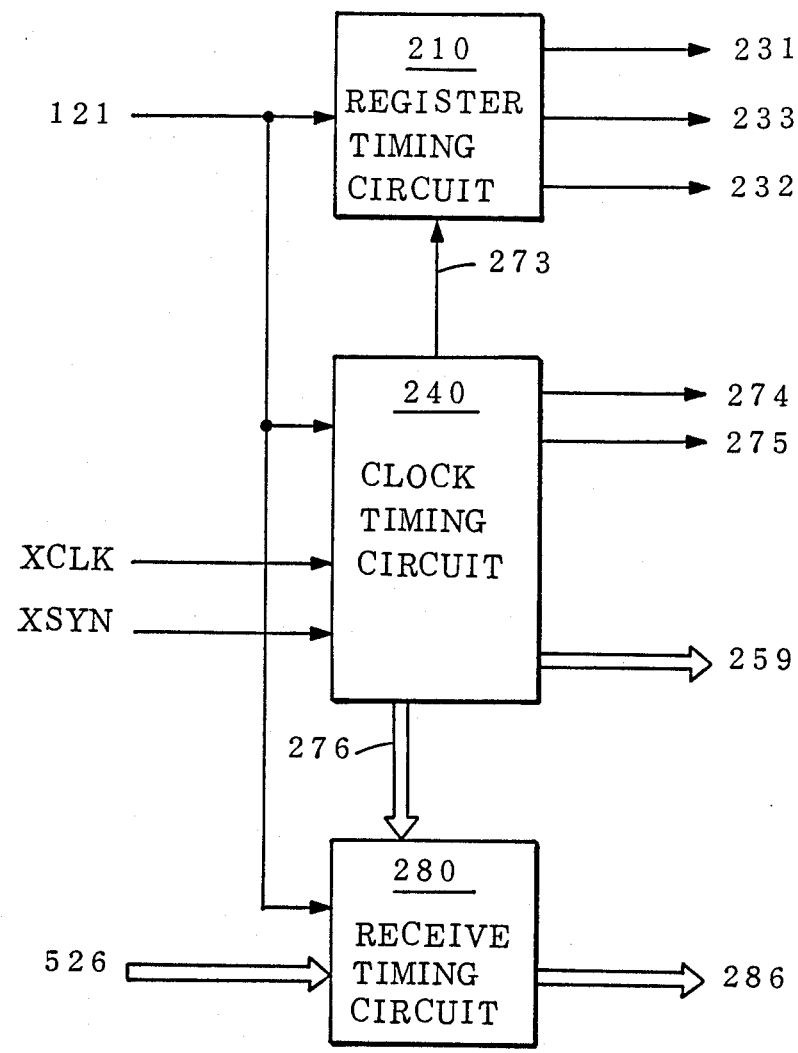
FIG. 12 is a block diagram illustrating an embodiment of the timing generator 200.

In FIG. 12, a block diagram of the timing circuit 200 is shown. Numeral 210 indicates a register timing circuit generating timing signals 231, 232 and 233 to be sent to the sending register 60 and the receiving register 80 on the basis of the standard clock 121 and a signal 273.

Numeral 240 identifies a clock timing circuit 240 generates the signal 273 to the register timing circuit 210, a bus signal 276, a signal 274 and a bus signal 259 to the mapping circuit 300, and a signal 275 to the demapping circuit 400 by receiving the standard clock 121, the sending clock XCLK and the sending synchronization signal XSYN. Signals 262 and 264 included in the bus signal 259 are sent out to the demapping circuit 400.

Numeral 280 denotes a receive timing circuit which sends out a bus signal 286 to the demapping circuit 400 by receiving the standard clock 121, bus signals 526 and 276.

Figure 13A:
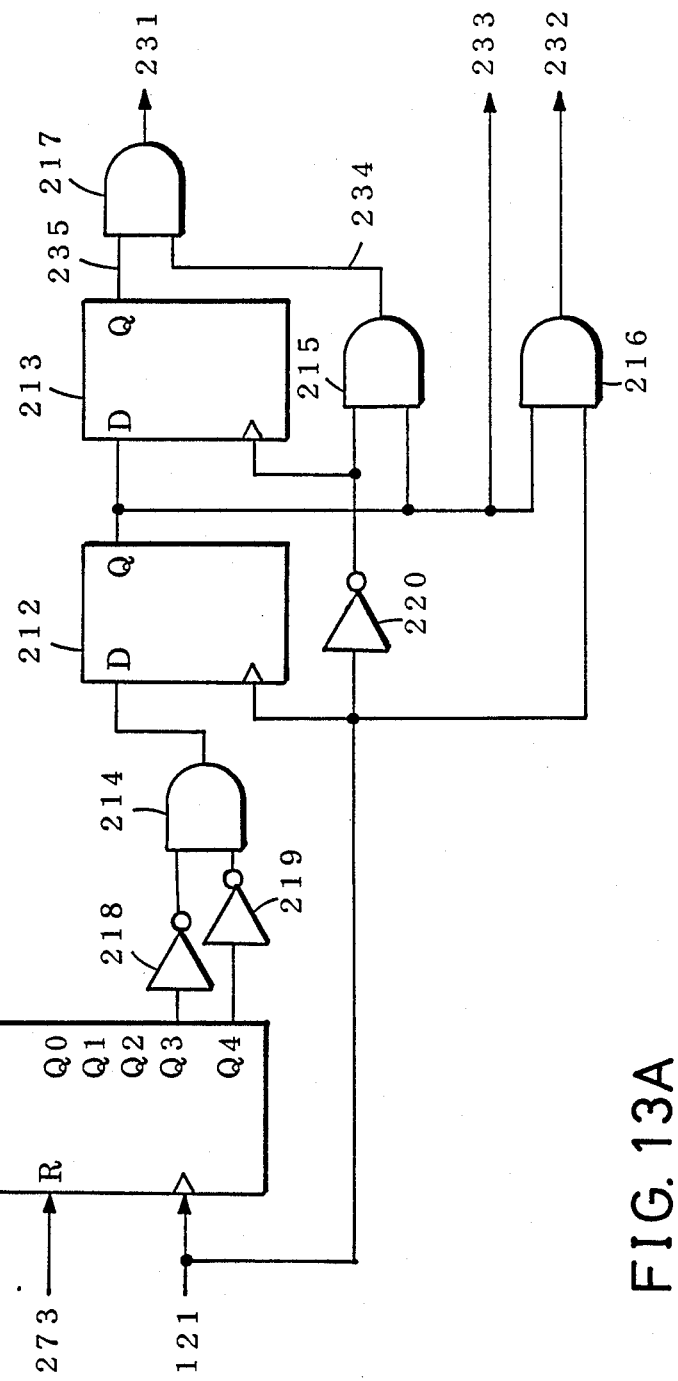
FIG. 13A is a circuit diagram illustrating an embodiment of a register timing circuit 201 included in the timing generator 200 of FIG. 12.
Figure 13B:
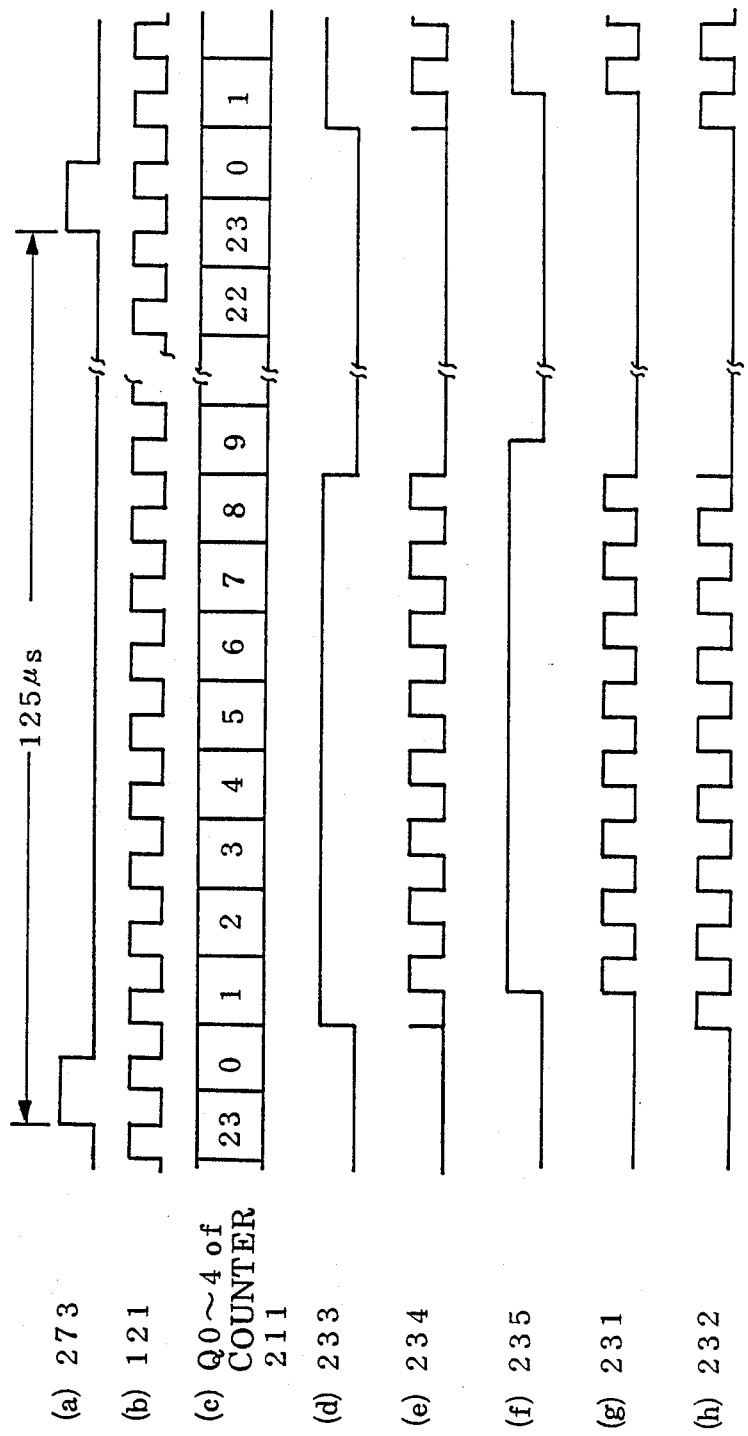
FIG. 13B is a time chart illustrating waveforms at various portions in the circuit diagram of FIG. 13A.

There is shown in FIG. 13A a circuit diagram of an embodiment of the register timing circuit 210 of which time chart illustrating waveforms is shown in FIG. 13B.

The signal 273 in FIG. 13B (a) from the clock timing circuit 240 is applied to a reset terminal R of a one-to-24 counter 211 at a repetition rate of 125 microseconds. The one-to-24 counter 211 starts to count up from zero and so the signal 23 of (a) is reset when outputs of from Q0 to Q4 of (c) indicate 23. When both outputs Q3 and Q4 of the one-to-24 counter 211 indicate "0s", an AND gate 214 applied the "0s" delivers a "1". Both outputs Q3 and Q4 of the one-to-24 counter 211 indicate "0s" during a period of from numerals zero to seven shown in FIG. 13B (c).

While the AND gate 214 delivers a "1", a D flip-flop 212 applied the "1" continuously delivers "1" by receiving the standard clock 121 at its clock terminal so that a signal 233 of (d) is obtained at an output Q of the D flip-flop 212. An AND gate 216 ANDs the signal 233 and the standard clock 121 to deliver a signal 232 shown in (h).

Receiving the signal 233 of FIG. 13B (d) and the standard clock 121 of (b) through an inverter 220, a D flip-flop 213 sends out a signal 235 as shown in FIG. 13B (f) from its output Q in which the signal 235 is delayed from the signal 233 of (d) by a half cycle of the standard clock 121.

Receiving the signal 233 of (d) and the standard clock 121 via the inverter 220, an AND gate 215 ANDs to obtain a signal 231 of (g).

Figure 14A:
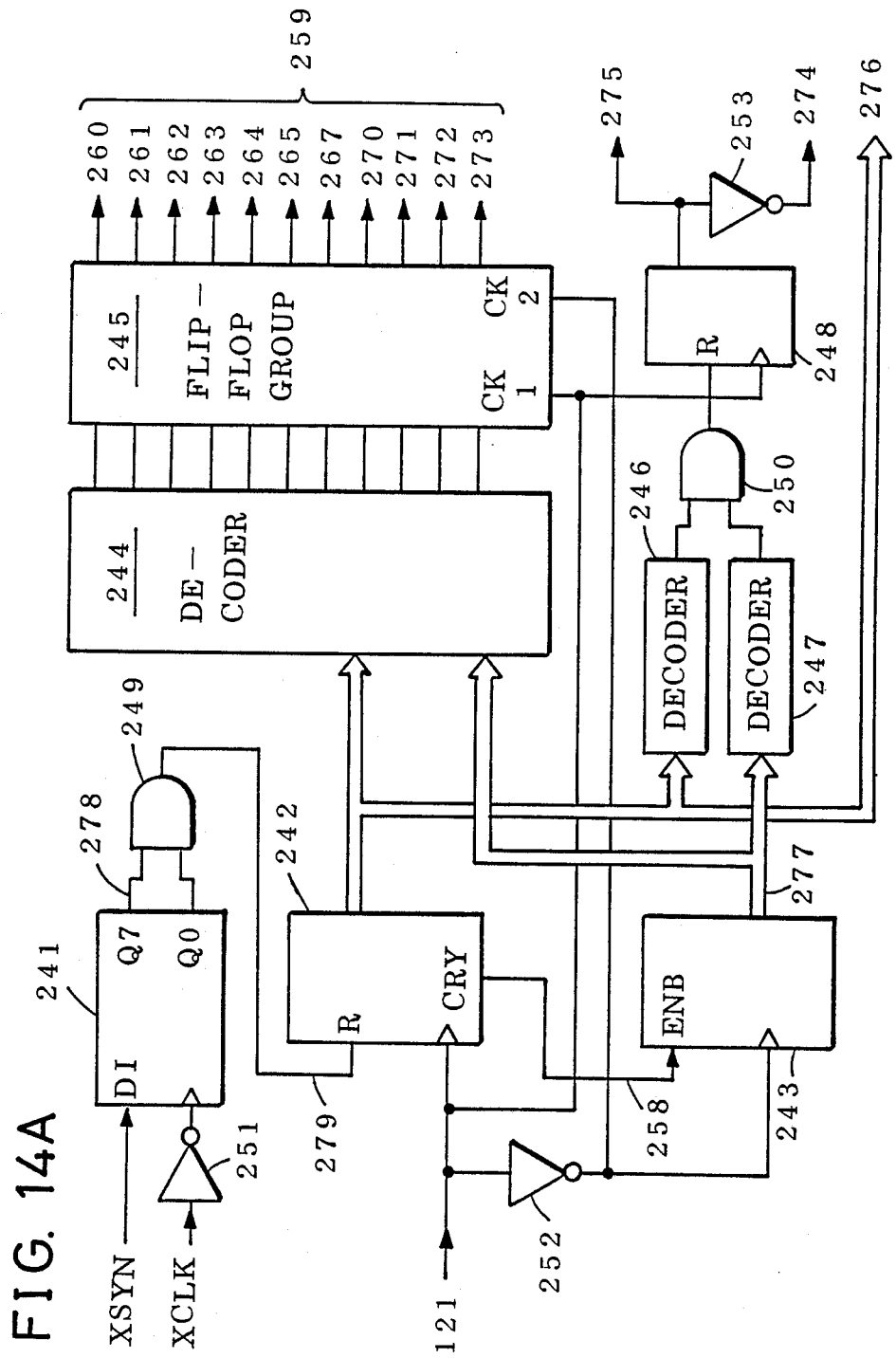
FIG. 14A is a circuit diagram illustrating an embodiment of a clock timing circuit 240 included in the timing generator 200 of FIG. 12.
Figure 14B:
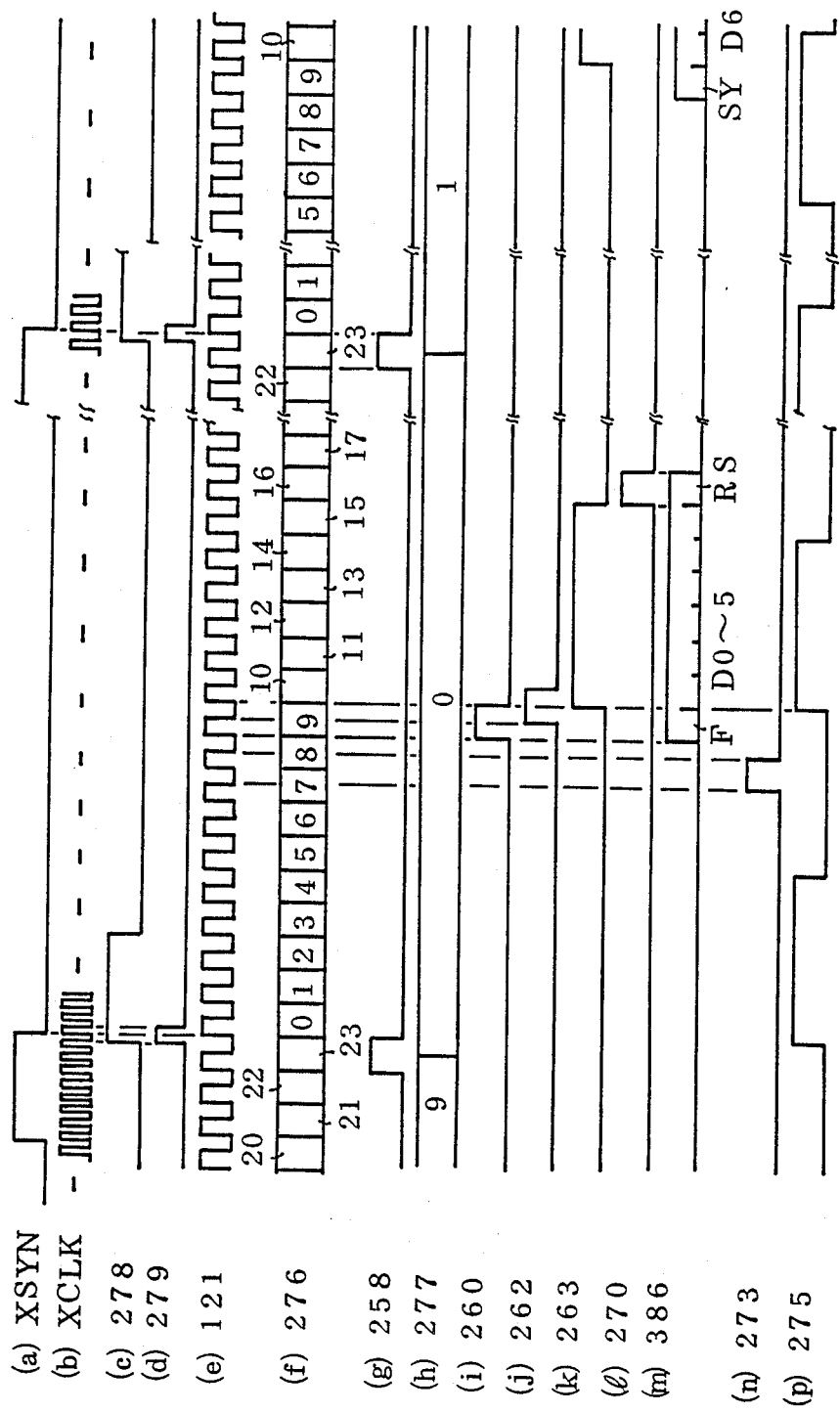
FIG. 14B is a time chart illustrating waveforms at various portions in the circuit diagram of FIG. 14A.

FIGS. 14A and 14B show a block diagram and its time chart of the clock timing circuit 240.

In FIG. 14A, numeral 241 shows a 8-BIT serial-in parallel-out register 241 which receives the signal XSYN of (a) at the repetition interval of 125 microseconds at its data input terminal DI and the sending clock XCLK of (b) at its clock terminal through an inverter 251. The register 241 delivers a signal 278 in FIG. 14B (c) from its output Q7. Each leading edge of the signal 278 of (c) precedes the trailing edge of the signal XSYN of (a) by a half cycle of the sending clock XCLK of (b). Each trailing edge of a signal of an output terminal Q0 of the register 241 is delayed from a trailing edge of the signal SXYN of (a) by a half cycle of the sending clock XCLK of (b). An AND gate 249 ANDs both signals from outputs Q0 and Q7 of the register 241 and delivers a signal 279 in FIG. 14B (d). Each leading edge of the signal 279 precedes the trailing edge of the signal XSYN of (a) by a half cycle of the sending clock XCLK of (b) and each trailing edge of the signal 279 is delayed from the trailing edge of the signal XSYN by a half cycle of the sending clock.

The signal 279 is applied to a reset terminal R of a one-to-24 counter 242. On the other hand, a clock terminal of the counter 242 is applied the standard clock 121 of (e). When applied the signal 279, the counter 242 starts to count up pulses of the standard clock 121 from zero to twenty-three and so the counter 242 delivers a signal 258 of (g) from a carry out terminal CRY. Counted values during counting are sent out as a bus signal 276 in FIG. 14B (f).

Receiving the signal 258 of (g) at an enable input ENB and the standard clock 121 of (e) via an inverter 252 at a clock terminal, a decimal multiframe counter 243 counts up at every pulse of the signal 258 to deliver the counting value as a bus signal 277 of (h). When the counting value reaches nine, the counting value of the bus signal 277 shown in (h) becomes to zero and the counting up is continued again by inputs of the next pulse of the signal 258 of (g) and the standard clock 121.

The bus signal 276 from the one-to-24 frame counter 242 is applied to a flip-flop group 245 via a decoder 244. The flip-flop group 245 includes a number of D flip-flops, in which each D flip-flop corresponds to each decoded signal applied. Each decoded signal from the decoder 244 is inputted to a data terminal of each D flip-flop of which clock terminal is applied the standard clock 121 (CK1) or another standard clock CK2 which is obtained by an inverter 252 inputted the standard clock 121.

In such a manner, the flip-flop group 245 delivers a signal 260 of (i) when the bus signal 276 of (f) indicates nine and a signal 262 of (j) which is delayed from the signal 260 by a half cycle of the standard clock 121.

A signal 261 from the flip-flop group 245 consists of six pulses (refer to (d) or (g) of FIG. 24B). Each pulse of the six pulses is respectively delivered when the bus signal 276 of (f) indicates each value of from ten to fifteen and the value of the bus signal 277 shows zero, one, two or three.

A signal 264 which has a pulse width equaling to a period of one cycle of the standard clock 121 of (e) is delivered from the flip-flop group 245 when the bus signal 277 of (h) indicates zero and the bus signal 276 of (f) ten.

In like manner, a signal 265 which has a pulse width equaling to a period of one cycle of the standard pulse 121 of (e), is delivered when the bus signal 277 of (h) indicates one and the bus signal 276 of (f) ten.

In like manner, a signal 267 which has a pulse width equaling to a period of one cycle of the standard pulse 121 of (e) is delivered when the bus signal 277 of (h) indicates three and the bus signal 276 of (f) sixteen.

In like manner, a signal 270 which has a pulse width equaling to a period of one cycle of the standard pulse 121 of (e) is delivered when the bus signal 277 of (h) indicates zero and the bus signal 276 of (f) sixteen.

In like manner, a signal 271 which has a pulse width equaling to a period of one cycle of the standard pulse 121 of (e) is delivered when the bus signal 277 of (h) indicates one and the bus signal 276 of (f) nine.

In like manner, a signal 272 which has a pulse width equaling to a period of one cycle of the standard pulse 121 of (e) is delivered when the bus signal 277 of (h) indicates two and the bus signal 276 of (f) sixteen.

In like manner, a signal 273 of (n) which has a pulse width equaling to a period of one cycle of the standard pulse 121 of (e) is delivered when the bus signal 277 of (h) indicates zero and the bus signal 276 of (f) seven in which the leading edge of the signal 273 is delayed by a half cycle of the standard clock 121 of (e) from the time when the bus signal 276 indicates seven.

The signal 263 shown in FIG. 14B (k) is delivered when the bus signal 277 of (h) indicates zero, one, two or three and the bus signal 276 of (f) indicates from ten to fifteen.

These signals 260, 261, 262, 263, 264, 265, 267, 270, 271, 272, and 273 form a bus signal 259.

The bus signal 276 of (f) is applied to a decoder 246 which sends out the same signal as the signal 262 shown in FIG. 14B (j) to an input terminal of an AND gate 250.

The bus signal 277 is applied to a decoder 247 to be decoded, too. The decoder 247 sends out a "1" to another input terminal of the AND gate 250 when the bus signal 277 of (h) indicates zero. The AND gate 250 delivers the same signal as the signal 262 of (j) to a rest terminal R of a decimal counter 248 to rest.

On the other hand, the decimal counter 248 of which clock terminal is applied the standard clock 121 of (e) delivers a signal 275 in FIG. 14B (p). The leading edge of the signal 275 rises up synchronously with a leading edge of the standard clock 121 of (e) which is inputted just after the leading edge of the signal 262 of (j). The trailing edge of the signal 275 falls down after counting 5 pulses of the standard clock 121. After that, when 5 pulses of that are counted, the signal 275 of (p) rises up again. The signal 275 is inverted by an inverter 253 to obtain a clock 274.

Figure 15A:
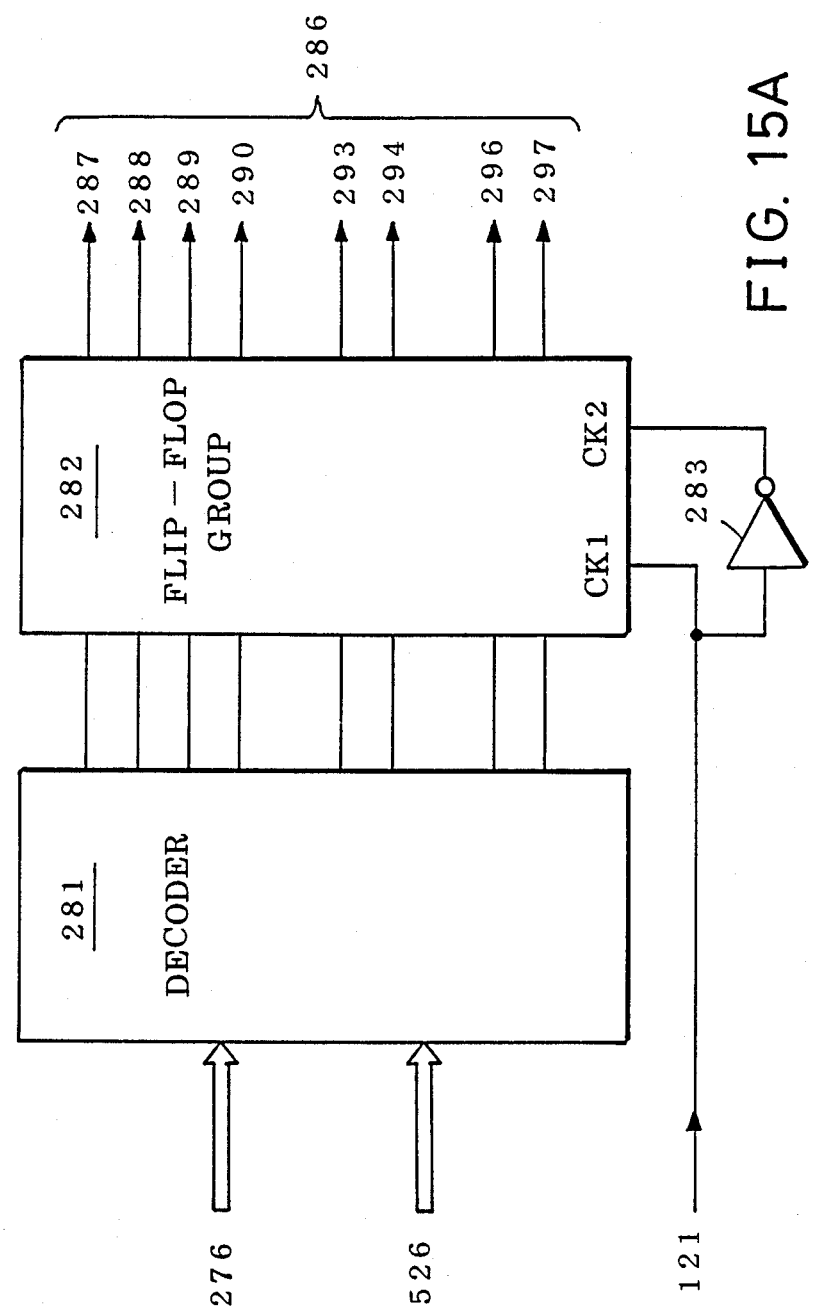
FIG. 15A is a block diagram illustrating an embodiment of a receive timing circuit 280 included in the timing generator 200 of FIG. 12.
Figure 15B:
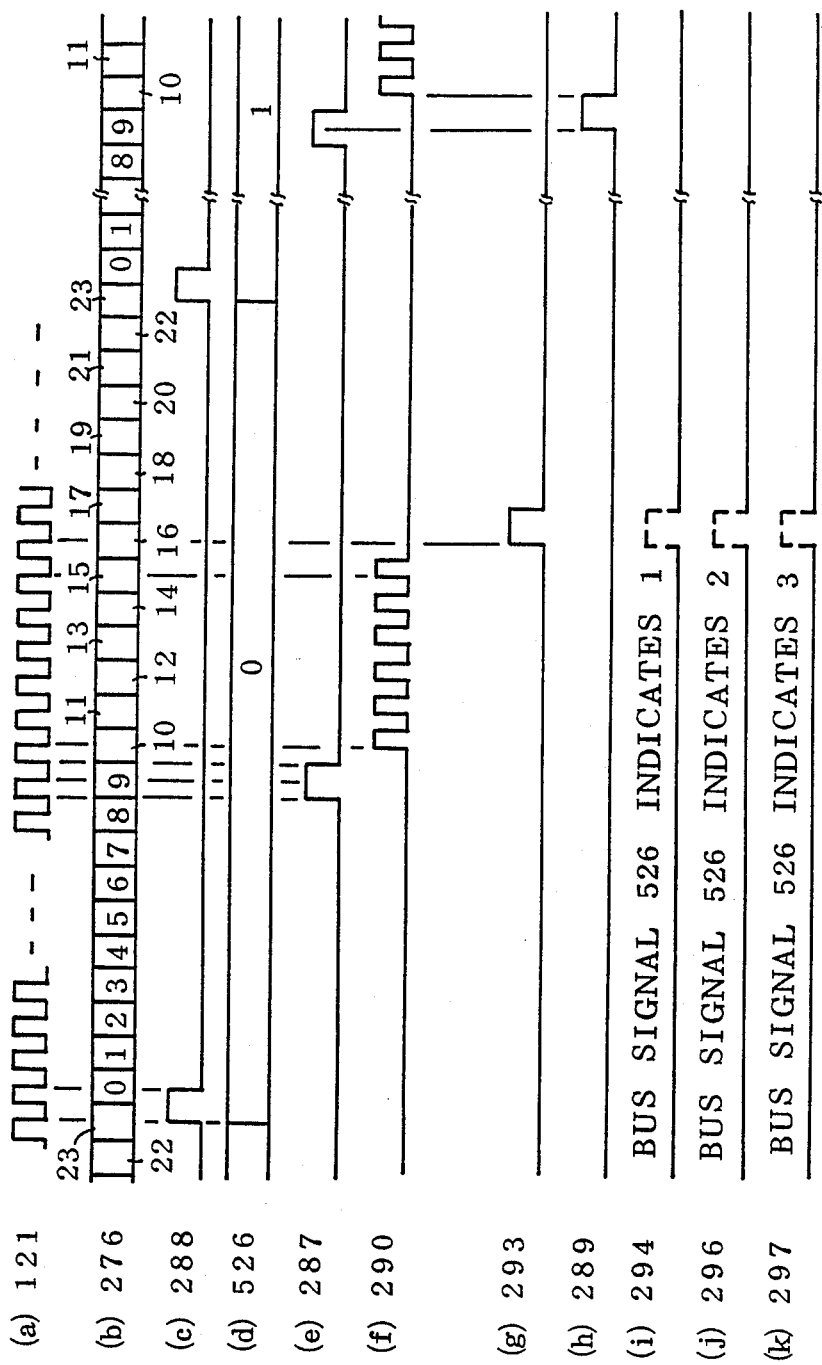
FIG. 15B is a time chart illustrating waveforms at various portions in the block diagram of FIG. 15A.

There are shown in FIGS. 15A and 15B a block diagram and its time chart of an embodiment of the receive timing circuit 280.

In FIG. 15A, a decoder 281 decodes the bus signals 276 and 526 to send out to a flip-flop group 282. The decoder 281, the flip-flop group 282 and inverter 283 correspond to the decoder 244, the flip-flop group 245 and the inverter 252 shown in FIG. 14A respectively.

A signal 288 of FIG. 15B (c) which has a pulse width equaling to a period of one cycle of the standard clock 121 of (a) is delivered at every change of the value of the bus signal 526 of (d). The signal 288 of (c) indicates a "1" for the period of from the later half of three to the first half of zero which are shown by the bus signal 276 of (b).

A signal 287 of (e) which has a pulse width equaling to a period of one cycle of the standard clock 121 of (a) is delivered at every change of the value of the bus signal 526 while the bus signal of 276 (b) indicates nine.

A signal 289 of (h) shows a "1" for the period of from the later half of nine to the first half of ten which are shown by the bus signal 276 of (b) while the bus signal 526 of (d) indicates one.

A signal 293 of (g) shows a "1" for the period of from the later half of sixteen to the first half of seventeen which are shown by the bus signal 276 of (b) while bus signal 526 of (d) indicates zero.

A signal 294 of (i) shows a "1" for the period of from the later half of sixteen to the first half of seventeen which are shown by the bus signal 276 of (b) while the bus signal 526 of (d) indicates one.

A signal 296 of (j) shows a "1" for the period of from the later half of sixteen to the first half of seventeen which are shown by the bus signal 276 of (b) while the bus signal 526 of (d) indicates two.

A signal 297 of (k) shows a "1" for the period of from the later half of sixteen to the first half of seventeen which are shown by the bus signal 276 of (b) while the bus signal 526 of (d) indicates three.

A signal 290 of (f) delivers six pulses for the period of from the later half shown ten to the end shown fifteen by the signal 276 of (b) when the bus signal 526 of (d) indicates zero, one, two or three.

Figure 16:
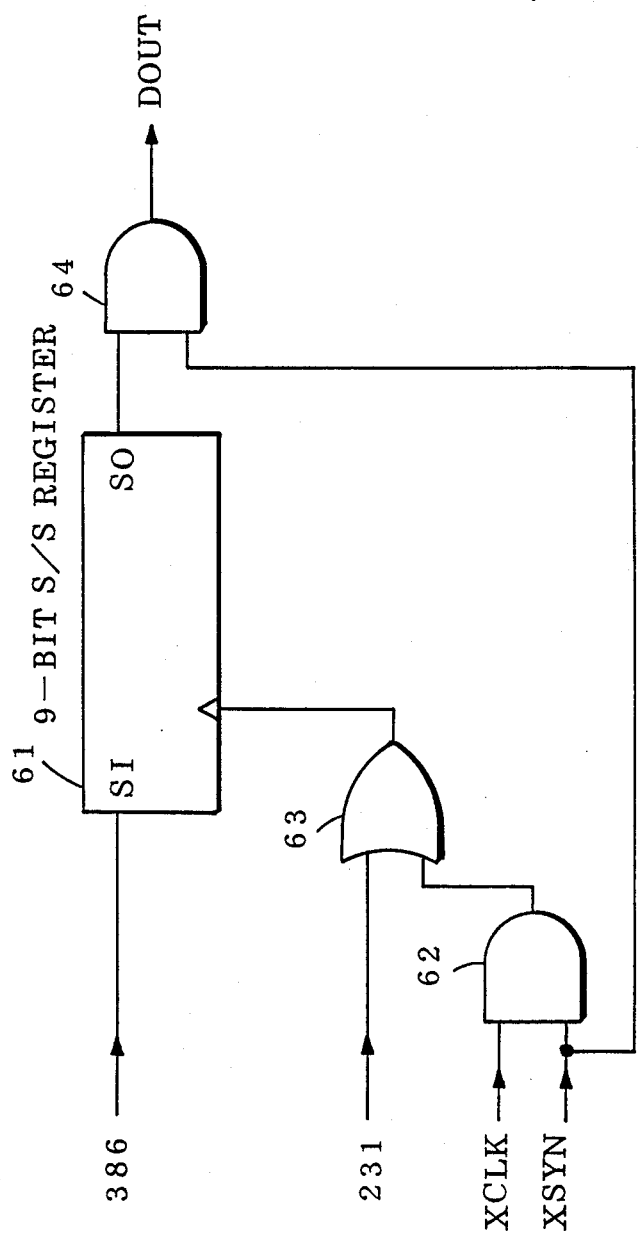
FIG. 16 is a circuit diagram illustrating an embodiment of a sending register 60 of FIG. 2A.

There is shown in FIG. 16 a circuit diagram of an embodiment of the sending register 60 of which time chart is shown in from (a) to (e) of FIG. 9B.

Numeral 61 indicates a 9-bit serial-in serial-out (S/S) register of which signal input SI is applied the mapped signal 386 in FIG. 9B (a) and of which clock terminal is inputted the signal 231 in FIG. 9B (b) via an OR gate 63 to load the frame zero of the mapped signal 386 of (a) thereinto.

The signal XSYN of (c) and the clock XCLK of (d) is ANDed by a gate 62 to deliver a clock terminal of the register 61 through the OR gate 63. Thus the 9-bit serial-in-serial-out register 61 delivers the frame zero, which has been loaded, from an output terminal SO during the signal XSYN of (c). The output from the output terminal SO and the signal XSYN of (c) are ANDed by an AND gate 64 to be sent out as a data out DOUT of FIG. 9B (b).

In like manner, the frame 1 is loaded into the register 61 to deliver the frame 1 as the out put DOUT.

Figure 17:
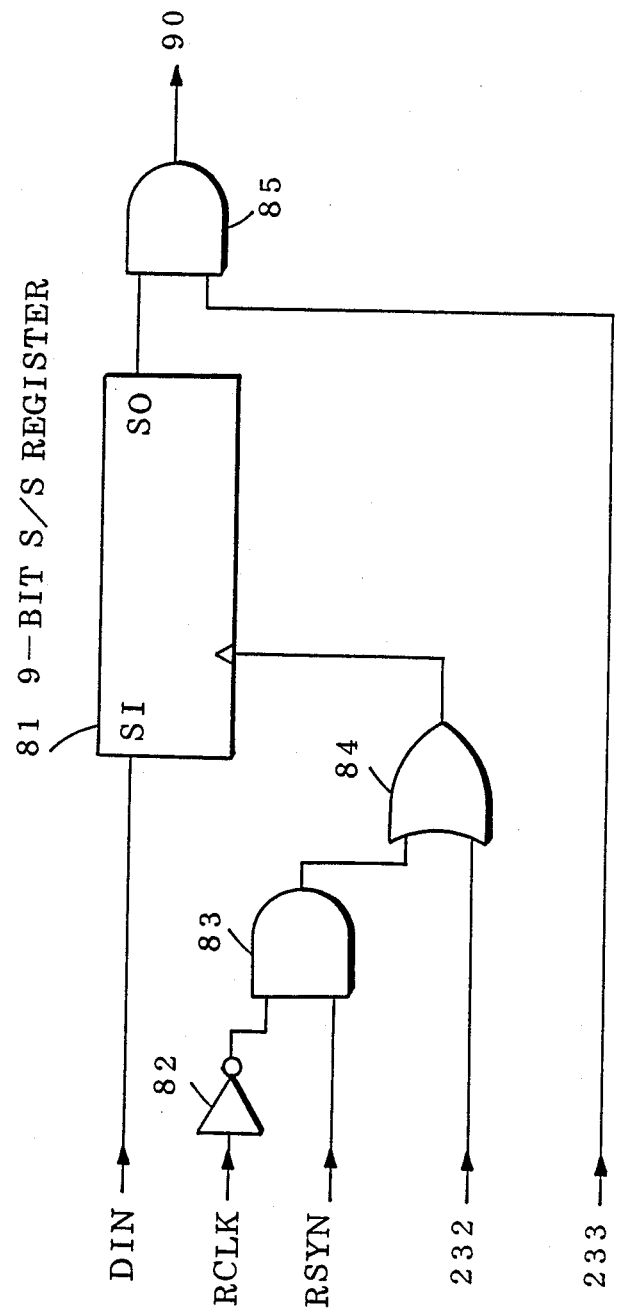
FIG. 17 is a circuit diagram illustrating an embodiment of a receiving register 80 of FIG. 2A.

There is shown in FIG. 17 a circuit diagram of an embodiment the receiving register 80 of which time chart is shown in from (g) to (l) of FIG. 9B. The receiving register 80 has substantially the same circuit diagram as that of the sending register 60 shown in FIG. 16 except an addition of an inverter 82. A data-in signal DIN of FIG. 17 corresponds to mapped signal 386 of FIG. 16. The same relationships applied correspondingly to the following, the clock RCLK to the clock XCLK, the signal RSYN to the signal XSYN, the signal 232 to the signal 231, the signal to-be-demapped 90 to the data-out DOUT, a 9-bit serial-in-serial-out register 81 to the register 61, an AND gate 83 to the AND gate 62, and an OR gate 84 to the OR gate 63. An input terminal of the AND gate 85 is applied the signal 233 in FIG. 9B (1) to send the output SO of the register 81 as the signal to-be-demapped 90 in FIG. 9B (j) to the demapping circuit 400.

Figure 18:
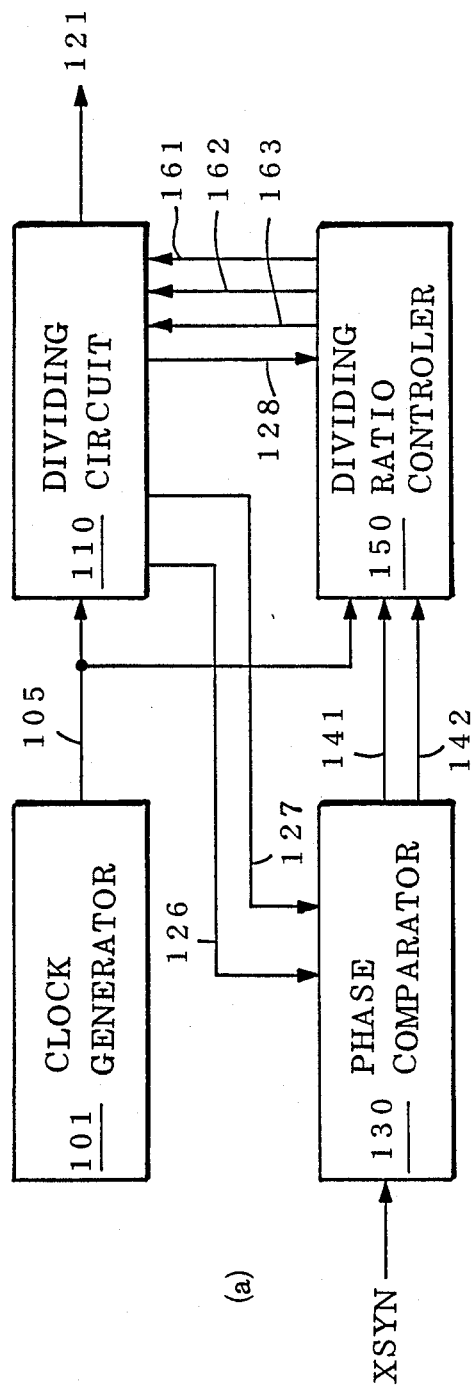
FIG. 18 is a block diagram and a state table illustrating an embodiment of a PLL circuit 100 of FIG. 2A.

There is shown in FIG. 18 a block diagram of an embodiment of the PLL (phase-locked loop) circuit 100. Numeral 101 designates a clock generator to generate a clock 105 of e.g. 3.072 megahertz. Numeral 110 represents dividing circuit divides the clock 105 by a dividing ratio of 15, 16 or 17 under control of signals 161, 162, and 163 shown in the table of FIG. 18 (b).

When signals 163, 162, and 161 show a "0", a "1" and a "1" respectively, a delayed phase which means the frequency of the standard clock 121 being low is detected and so the dividing ratio of fifteen is selected to set the frequency of the standard clock 121 higher.

When signals 163, 162 and 161 show a "1", a "0" and a "0" respectively, a delayed or an advanced phase is not detected and so the dividing ratio of sixteen is selected.

When signals 163, 162, and 161 show a "1", a "0" and a "1" respectively, an advanced phase is detected and so the dividing ratio of seventeen is selected to set the frequency of the standard clock 121 lower. Thus the standard clock 121 of 192 kilohertz is synchronously obtained with the sending synchronization signal XSYN.

The dividing circuit 110 divides the clock 105 of 3.072 megahertz by the dividing ratio of three, four or five as shown in FIG. 18 (b) to obtaining a signal 128 of a repetition rate of 768 kilohertz, too. Further the dividing circuit 110 divides the standard clock 121 by the dividing ratio of twenty-four to obtain a signal 126 of a repetition rate of 8 kilohertz and delivers a signal 127 of the same frequency as that of the signal 128 in different timing.

Numeral 130 shows a phase comparator receiving signals XSYN, 126 and 127 compares the phase of the signal 126 with the same of the signal XSYN. The comparison is executed at every 125 microseconds. When an advanced phase of the signal 126 is detected, a signal 141 is delivered and when a delayed that of 126 is detected, a signal 142 is delivered. Both signals 141 and 142 show "0s" while the comparison is not executed.

Receiving the clock 105, the signal 141 indicating the advanced phase, the signal 142 indicating the delayed phase and the signal 128, a dividing ratio controller 150 makes signals 163, 162 and 161 into a "1", a "0" and a "1" to deliver respectively when the signal 141 shows a "1" indicating the advanced phase, signals 163, 162 and 161 into a "0", a "1" and a "1" respectively when the signal 142 shows a "1" indicating the delayed phase, and signals 163, 162 and 161 into a "1", a "0" and a "0" respectively when both signals 141 and 142 show "0s".

Figure 19A:
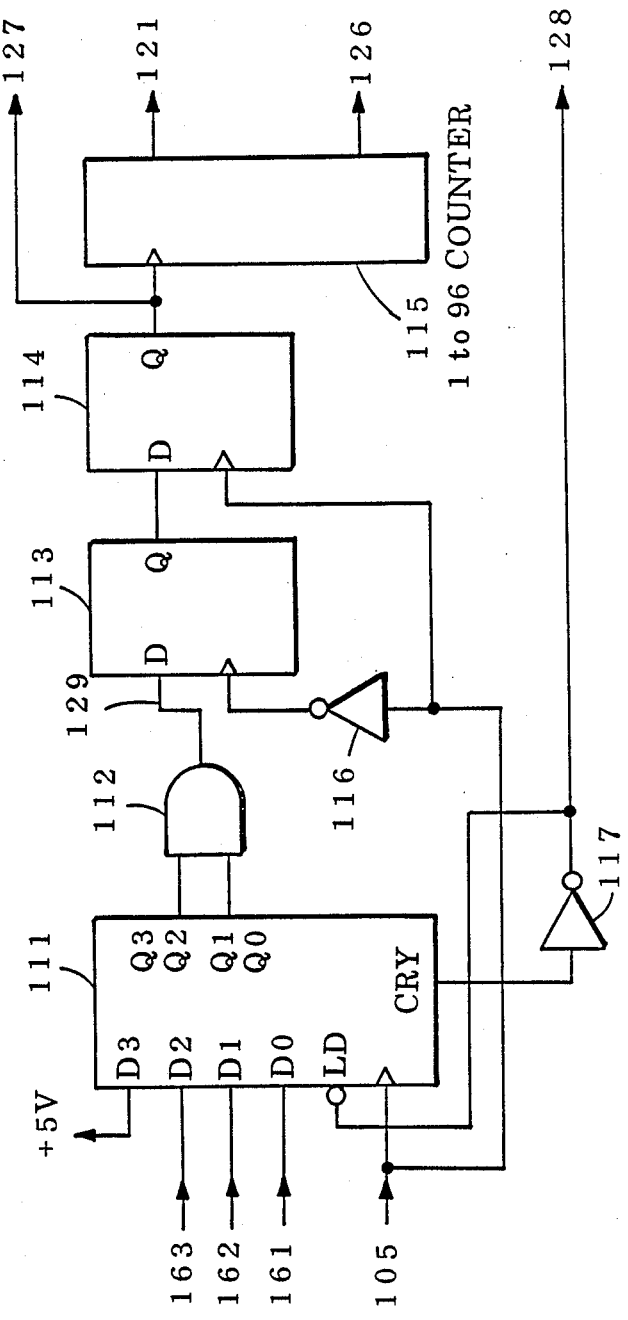
FIG. 19A is a circuit diagram illustrating an embodiment of a dividing circuit 110 included in the PLL circuit 100 of FIG. 18.
Figure 19B:
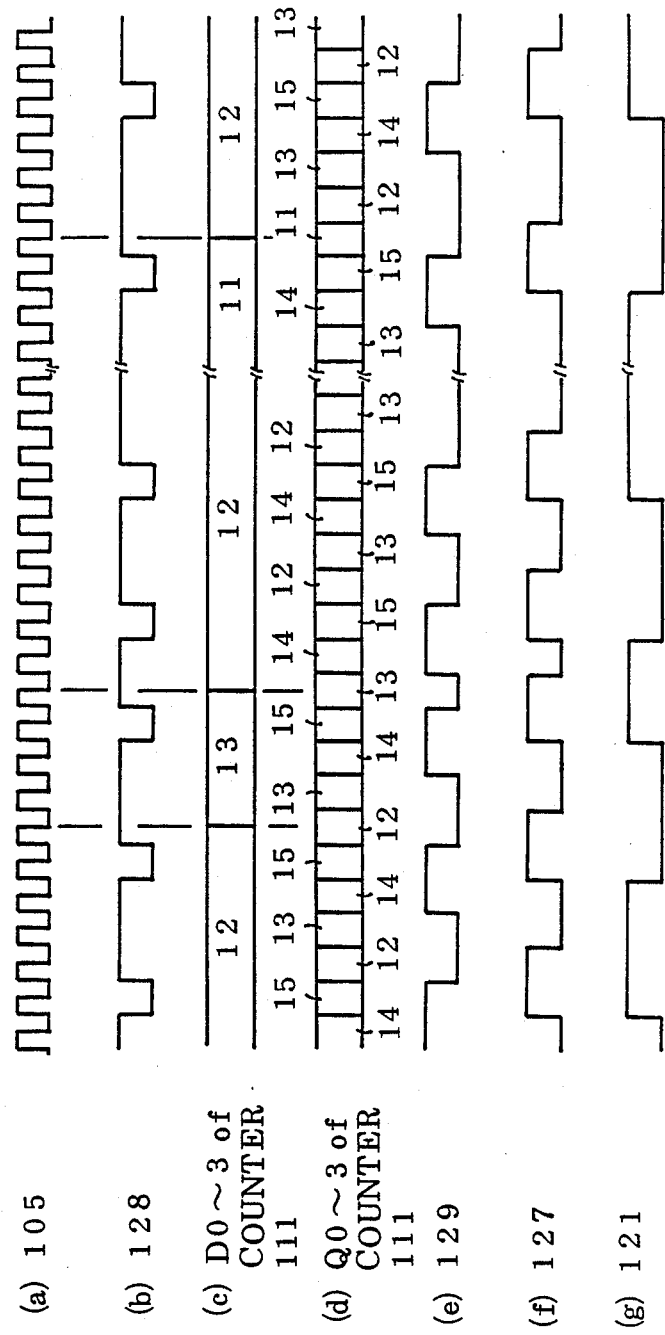
FIG. 19B is a time chart illustrating waveforms at various portions in the circuit diagram of FIG. 19A.

FIGS. 19A and 19B show a circuit diagram and its time chart of an embodiment of the dividing circuit 110.

Numeral 111 indicates a hexadecimal counter of which clock terminal and load terminal LD are driven by the clock 105 of FIG. 19B (a) and an output of a carry terminal CRY through an inverter 117 respectively.

Further, data terminals D0, D1, D2 and D3 of the counter 111 are applied signals 161, 162, 163 and "1" being +5V and so outputs Q1 and Q2 of the counter 111 are connected to an AND gate 112 to obtain a signal 129 in FIG. 19B (e).

When signals 163, 162 and 161 show a "0", a "1", and a "1" respectively to indicates the delayed phase and a carry CRY is sent out via an inverter 117 as a signal 128 as shown in FIG. 19B (b), the counter 111 applied the signal 128 at a load terminal LD is loaded with a counted number 11 of (c) and so counting up the clock 105 of (a) the output of Q1 of the counter 111 indicates a "1" whenever the counting value indicates 11, 14 or 15. The same of Q2 shows a "1" while the counting values indicate from 12 to 15. The outputs Q1 and Q3 are ANDed by the AND gate 112 to obtain the signal 129 of (e). Therefore the signal 129 designates a "1" when the outputs from Q0 to Q3 shows 14 and 15.

When signals 163, 162 and 161 show "1", "0" and "1" respectively to indicates the advanced phase and a carry CRY is sent out via the inverter 117 as a signal 128 of (b), the counter 111 is loaded with a counted number 13 in FIG. 19B (c) and so counting up the clock 105 of (a), the output Q1 of the counter 111 indicates a "1" while the counting values indicate 14 and 15. The same of Q2 shows a "1" while the counting values designate from 13 to 15. The outputs Q1 and Q3 are ANDed by the AND gate 112 to obtain the signal 129 of (e).

When signals 163, 162 and 161 show "1", "0" and "0" respectively to indicates not delayed phase or not advanced phase and a carry CRY is sent out, the counter 111 is loaded with a counted number 12 in FIG. 19B (c) and so counting up the clock 105 of (a), the output Q1 of the counter 111 indicates a "1" whenever the counting value indicates 13, 14 or 15. The same of Q2 shows a "1" while the counting value designates from 12 to 15. The outputs Q1 and Q2 are ANDed by the AND gate 112 to obtain the signal 129 of (e).

Numerals 113 and 114 represent D flip-flops. Being applied the signal 129 of (e) to a data terminal D and the clock 105 to a clock terminal through an inverter 116, the D flip-flop 113 delivers an output Q to a data terminal D of the D flip-flop 114. The D flip-flop 114 is inputted the clock 105 at its clock terminal to obtain a signal 127 of (f) which is delayed from the signal 129 of (e) by one cycle of the clock 105 in FIG. 19B (a). Receiving the signal 127, a one-to-96 counter 115 divides the same 127 by dividing ratios of one fourth and one ninety-sixth to obtain signals 121 and 126 respectively.

Figure 20B:
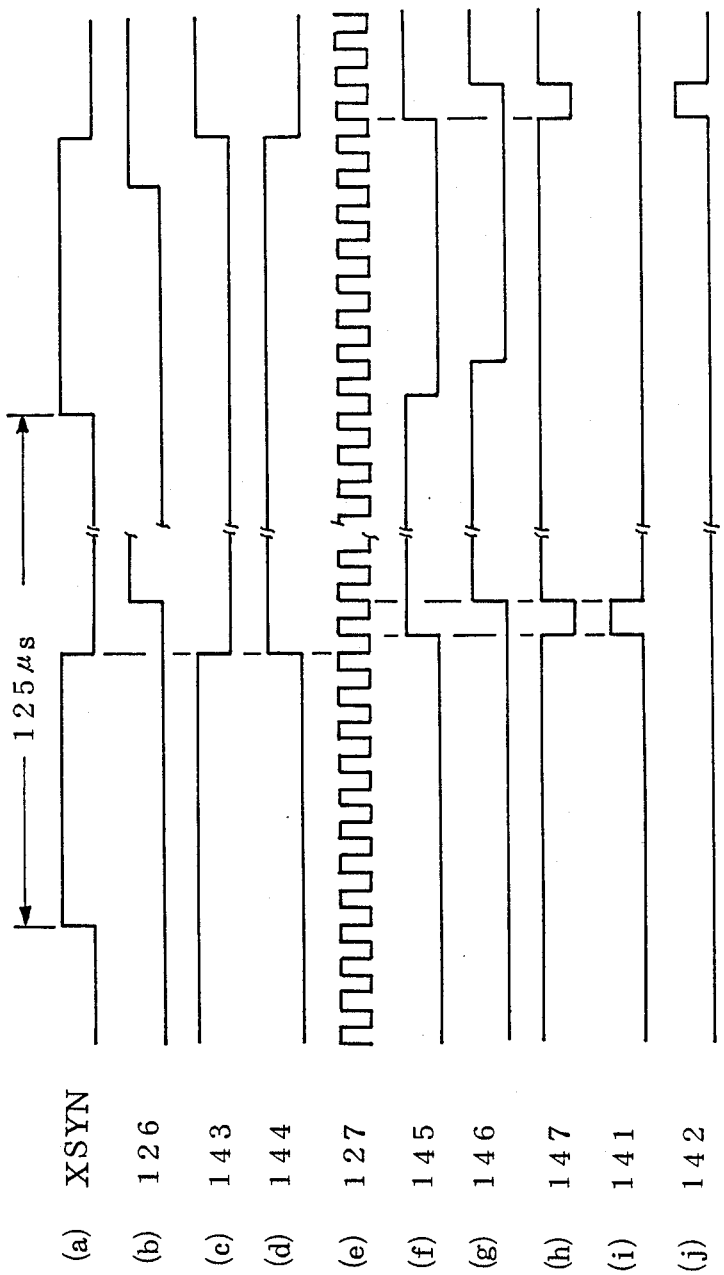
FIG. 20B is a time chart illustrating waveforms at various portions in the circuit diagram of FIG. 20A.

FIGS. 20A and 20B show a circuit diagram and a time chart of an embodiment of the phase comparator 130.

Numerals 131, 132 and 133 refer to D flip-flop. Receiving the signals 126 in FIG. 20B (b) at a data terminal D and the signal XSYN of (a) via an inverter 137 at a clock terminal, the D flip-flop 131 delivers signals 143 of (c) and 144 of (d) from outputs Q and not-Q. When the signal 126 of (b) is delayed from the signal XSYN of (a), the signal 143 indicates a "0" and when advanced, the same 143 indicates a "1".

Receiving the signal 127 of (e) at a clock terminal and the signal XSYN through an inverter 137 at a data terminal D, the D flip-flop 132 delivers a signal 145 of (f) to a NAND gate 134. Receiving the signal 127 of (e) at a clock terminal and the signal 145 of (f) at a data terminal D, the D flip-flop 133 delivers a signal 146 of (g) from the output Q to the NAND gate 134 through an inverter 138 to obtain a signal 147 of (h) by NANDing.

Signals 143 of (c) and 147 of (h) are provided for a NOR gate 135 to obtain a signal 141 as shown in FIG. 20B (i). Signals 144 of (d) and 147 of (h) are applied to a NOR gate 136 to obtain a signal 142 of (j). Both signals 141 of (i) and 142 of (j) make the only data valid which is obtained from the signal 126 immediately after a trailing edge of the signal XSYN in FIG. 20B (a).

Figure 21A:
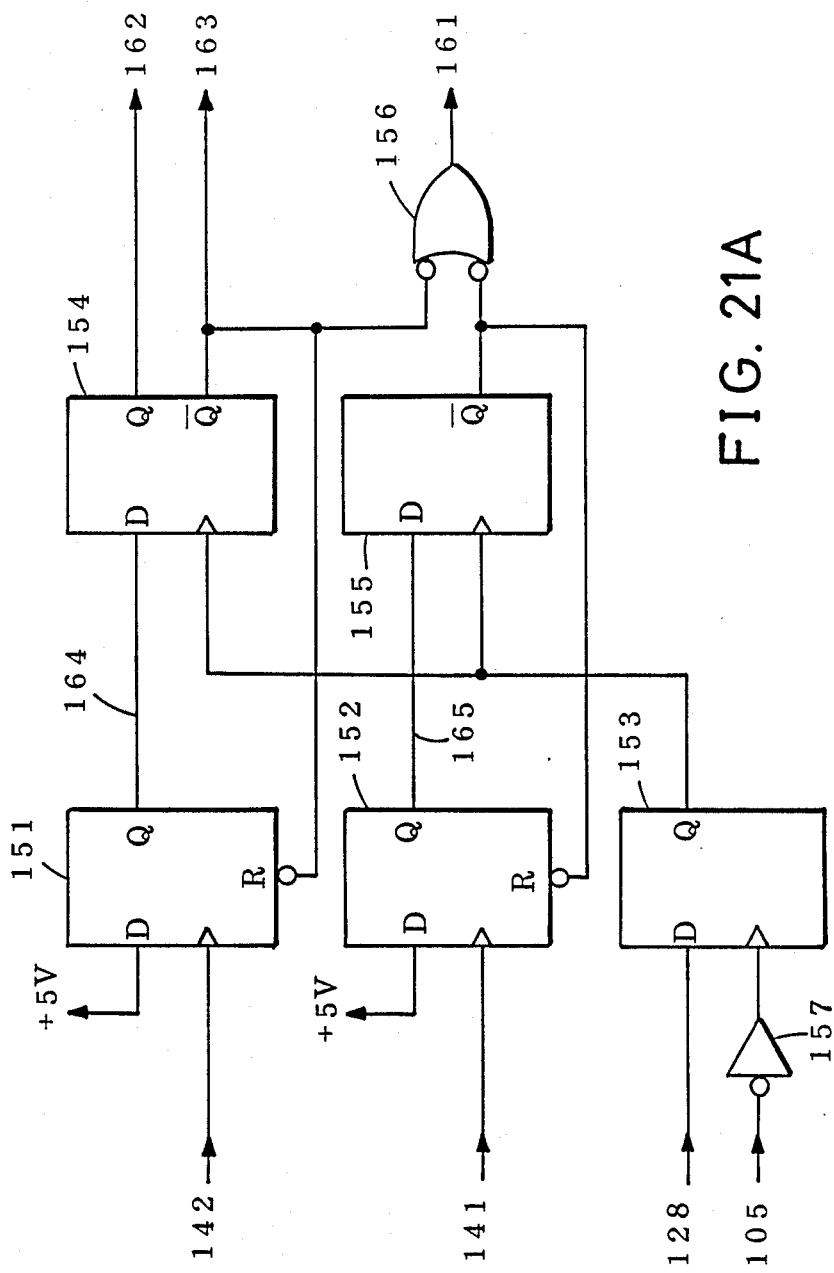
FIG. 21A is a circuit diagram illustrating an embodiment of a dividing ratio controller 150 included in the PLL circuit 100 of FIG. 18.
Figure 21B:
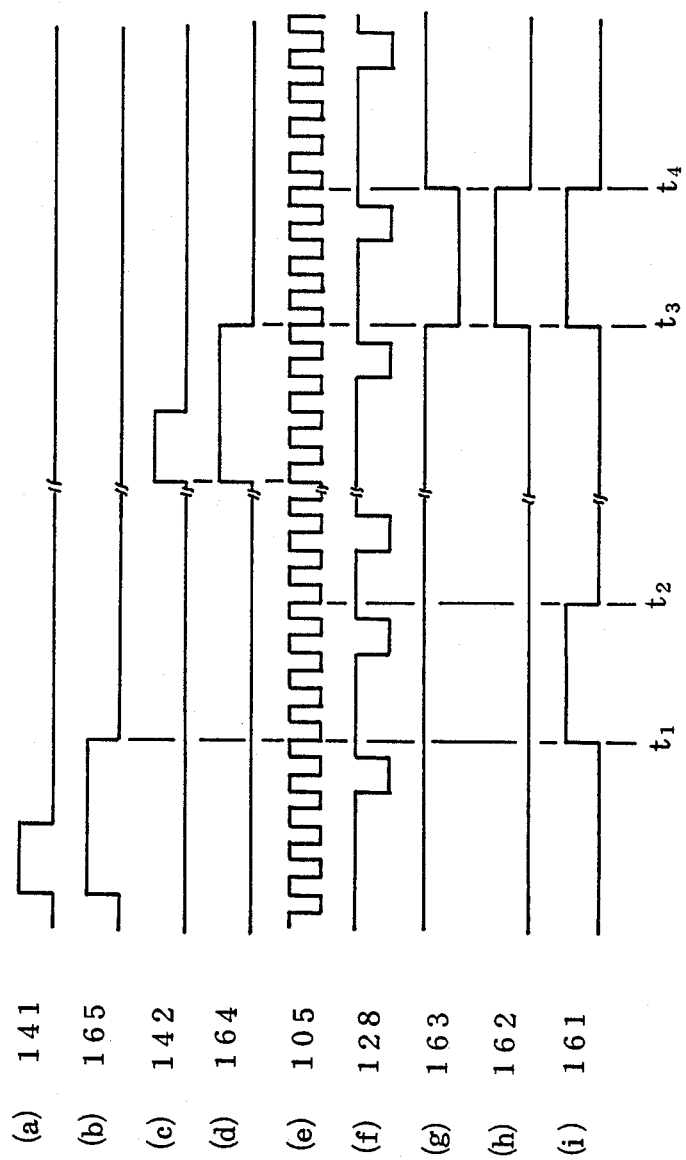
FIG. 21B is a time chart illustrating waveforms at various portions in the circuit diagram of FIG. 21A.

FIG. 21A and 21B show a circuit diagram and a time chart of an embodiment of the dividing ratio controller 150.

Numerals 151 to 155 indicate D flip-flops. When the signal 141 of (a) showing the advanced phase is applied to a clock terminal, the D flip-flop 152 of which data terminal D is connected to +5V being "1" delivers a signal 165 FIG. 21A (b). When a signal 128 of (f) is inputted to a data terminal D of the D flip-flop 153 which receives the clock 105 at its clock terminal via an inverter 157, the D flip-flop 153 delivers an output Q to clock terminals of the D flip-flop 154 and 155.

On the other hand, the signal 142 of (c) to indicate the delayed phase is still a "0" and so a signal 164 of (d) of an output Q of the D flip-flop 151 is still a "0", too. Receiving an output not-Q of the D flip-flop 155 and a signal 163 of (g), a NAND gate 156 delivers a "1" of a signal 161 of (i) because signals 162 and 163 indicate a "0" and a "1" respectively before the time $t_1$. The signal 161 shows a "0" before the time $t_1$.

After the time $t_1$ of FIG. 21A, the signal 128 of (f) indicates a "0" and the signal 161 of (i) turns from a "1" to a "0" at the time $t_2$ when negative transition of the signal 105 of (e) is applied after a positive transition of the signal 128.

In like manner, the signal 161 of (i) turns from a "0" to a "1", the signal 162 from a "0" to a "1" and the signal 163 of (g) from a "1" to a "0" at the time $t_3$. As compared this state with the signals in FIG. 18 (b), signals 163 of (g), 162 of (h) and 161 of (i) in FIG. 21B show a "1", a "0" and a "0" respectively before the time $t_1$ to indicate the state of no control. During a period of between $t_1$ and $t_2$, signals 163, 162 and 161 show a "1", a "0" and a "1" respectively to indicate the advance in the phase. During a period of time $t_3$ and $t_4$ signals 163, 162 and 161 show a "0", a "1" and a "1" to indicate the delay in the phase. After the time $t_4$, the state of no control is indicated in FIG. 21B.

Figure 22A:
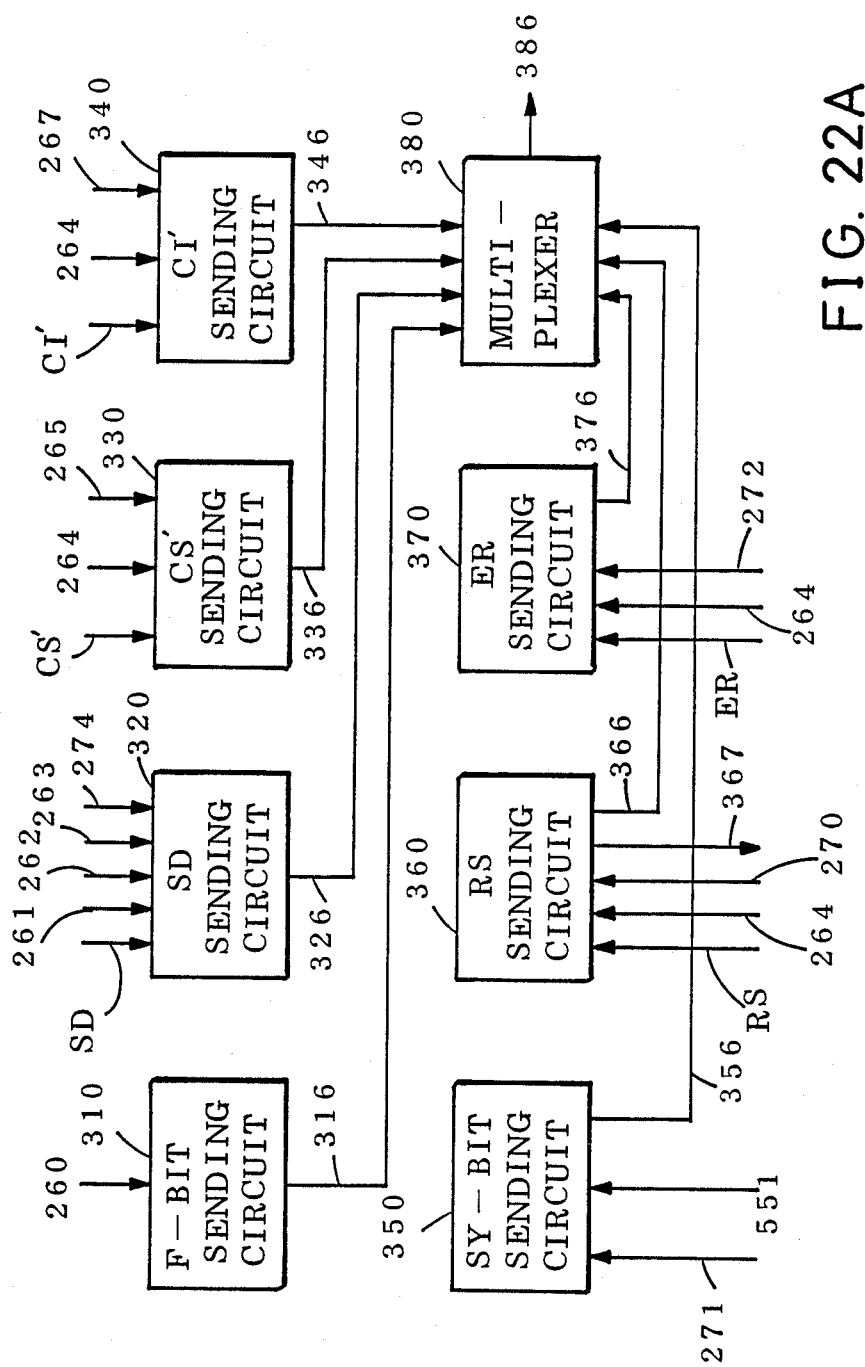
FIG. 22A is a block diagram illustrating an embodiment of a mapping circuit 300 of FIG. 9A.
Figure 22B:
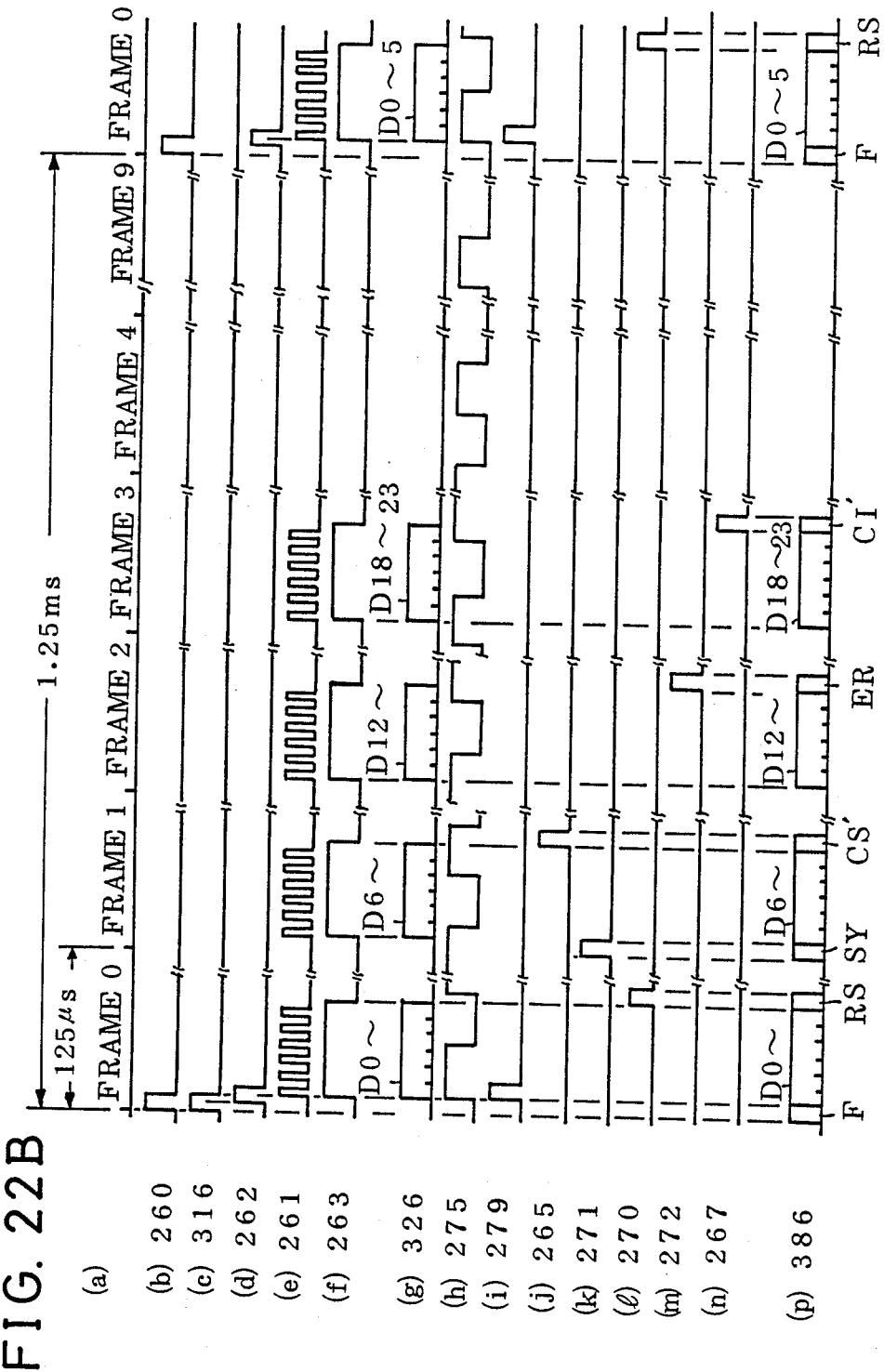
FIG. 22B is a time chart illustrating waveforms at various portions in the block diagram of FIG. 22A.

FIGS. 22A and 22B show a block diagram and a time chart of an embodiment of the mapping circuit 300 which maps the F-bit and SY-bit in the bit NO. 0, various signals CS', CI', RS and ER in the bit NO. 7, and data D0 to D23 in the bit NOs. 1 to 6 to multiplex as shown in FIGS. 1 or 2.

Receiving a signal 260 in FIG. 22B (b), a F-bit sending circuit 310 delivers a "1" of a signal 316 of (c) showing the F-bit. The signal 316 of (c) indicates a "0" when the F-bit shows a "0" after 1.25 milliseconds being a frame cycle.

Receiving signals 261 of (e) and 263 of (f) of FIG. 22B, a SD sending circuit 320 samples the sending data SD with a clock 274 to deliver a signal 326 of (g).

A CS' sending circuit samples the clear-to send signal CS' with a signal 264 to deliver a signal 336 at a timing of a signal 265 of (j).

A CI' sending circuit 340 samples the call indicator signal CI' with the signal 264 to deliver a signal 346 at a timing of a signal 267 in FIG. 22B (n). The construction of the CI' sending circuit 340 is the same as that of the CS' sending circuit 330.

Receiving a signal 551, a SY-bit sending circit 350 delivers a signal 356 at a timing of a signal 271 of (k).

Receiving the request-to-send signal RS, a RS sending circuit 360 samples the signal RS with the signal 264 to deliver a signal 366 at a timing of a signal 270 of (1). A signal 367 is for sending out always a signal obtained by sampling the signal RS. The signal 367 is however omitted in the equipment shown in FIG. 9C.

A ER sending circuit 370 samples the equipment ready signal ER with the signal 264 to send out a signal 376 at a timing of a signal 272. The construction of the ER sending circuit 370 is the same as that of the CS' sending circuit 330.

A multiplexer 380 multiplexes signals 316 of (c) and 326 of (g), 336, 346, 356, 366, and 376 by ORing to deliver the mapped signal 386 in FIG. 22B (p).

Figure 23A:
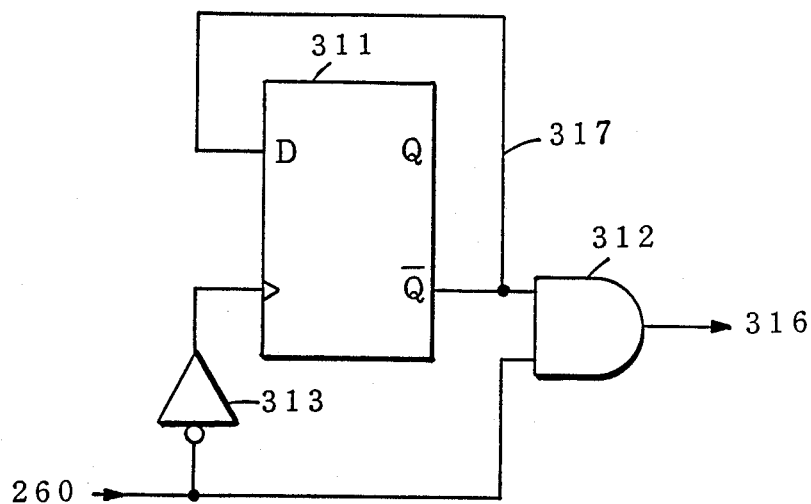
FIG. 23A is a circuit diagram illustrating an embodiment of a F-bit sending circuit 310 of FIG. 22A.
Figure 23B:
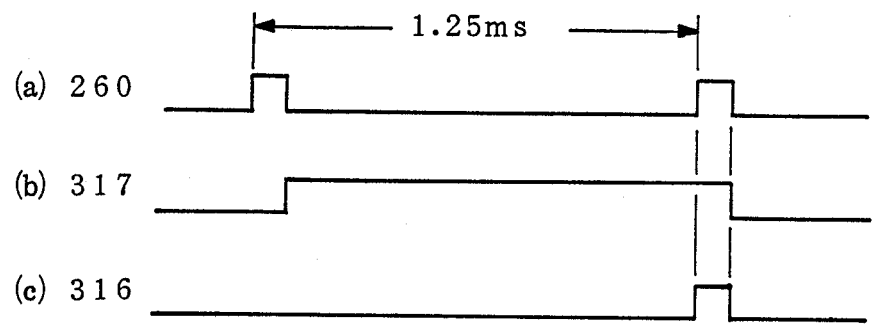
FIG. 23B is a time chart illustrating waveforms at various portions in the circuit diagram of FIG. 23A.

FIGS. 23A and 23B show a circuit diagram and a time chart of an embodiment of the F-bit sending circuit 310.

Numeral 311 represents a D flip-flop of which output not-Q being a signal 317 of FIG. 23B (b) is connected to its data terminal D and its clock terminal is provided with a signal 260 of (a) of which cycle time is 1.25 milliseconds through an inverter 313. The signals 316 of (c) and 260 of (a) are ANDed by an AND gate 312 to deliver a signal 316 of (c) at the start of every ten frames.

Figure 24A:
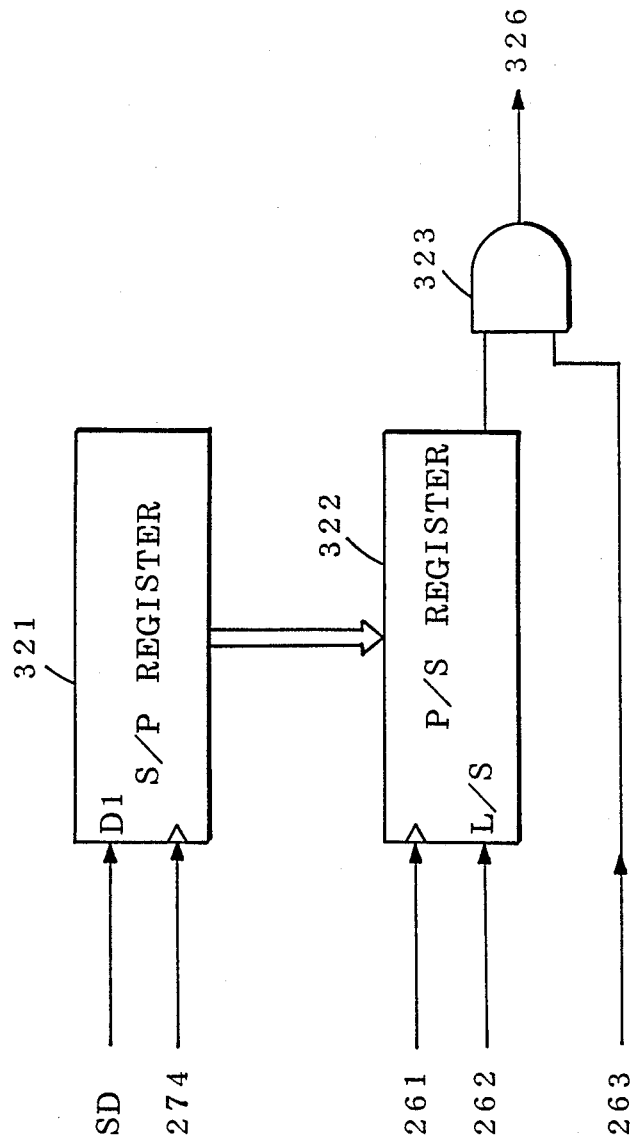
FIG. 24A is a circuit diagram illustrating an embodiment of a SD sending circuit 320 of FIG. 22A.

FIGS. 24A and 24B show a circuit diagram and a time chart of an embodiment of the SD sending circuit 320.

A S/P register 321, which is a 24-bit serial-input-parallel-output shift register, samples the sending data SD with a clock 274 of FIG. 24B (a) to load and send out in parallel. The clock 274 of (a) has a repetition rate of 19.2 kilobits per second to divide 1.25 milliseconds of a period of 10 frames of 24. The sending data SD of (b) shows data of from 0 to 23 which are transmitted from a data terminal equipment.

Receiving the data in parallel from the S/P register 321, a P/S register 322, which is a 24-bit parallel-input-serial-output shift register, loads the data at a timing of a signal 262 of (c) and delivers a signal 326 of (i) at a timing of a signal 261 of (d) during a signal 263 of (e) via an AND gate 323. In FIG. 24B, time axes of (f), (g), and (i) are expanded.

The signal 263 of (h) has a repetition cycle of 125 microseconds. In the cycle the signal 261 of (g) includes four groups to be sent out during 1.25 milliseconds. Each group having a cycle time of 125 microseconds consists of six data of which repetition rate equivalents to 192 kilobits per second.

Figure 25A:
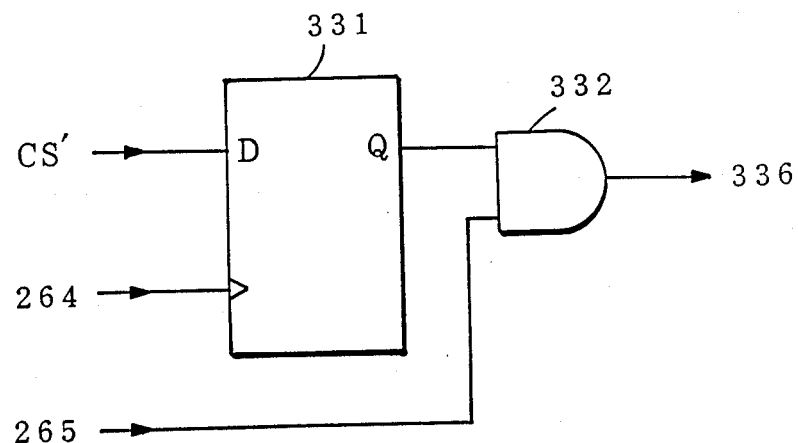
FIG. 25A is a circuit diagram illustrating an embodiment of CS' sending circuit 330 of FIG. 22A.
Figure 25B:
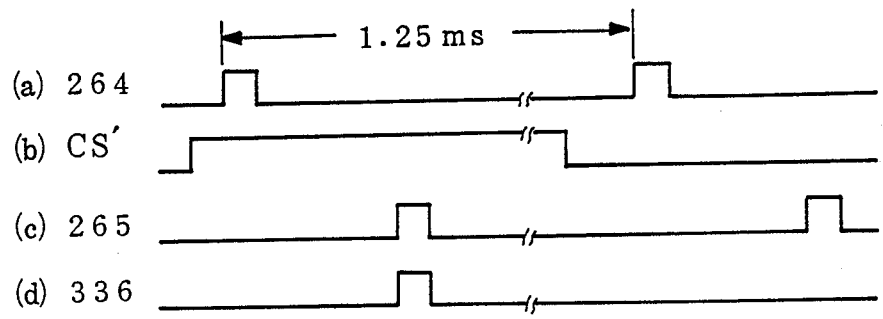
FIG. 25B is a time chart illustrating waveforms at various portions in the circuit diagram of FIG. 25A.

FIGS. 25A and 25B show a circuit diagram and a time chart of an embodiment of the CS' sending circuit 330.

A D flip-flop 331 receives the clear-to-send signal CS' at its data terminal D in FIG. 25B (b) and a signal 264 of (a) of a cycle time of 1.25 milliseconds at its clock terminal to deliver an output Q to an AND gate 332. The AND gate 332 receives the output Q from the D flip-flop 331 and a signal 265 of (c) to deliver a signal 336 of (d). The signal 336 shows a timing to send out the signal CS' to the PCM transmission line.

It is the CS' sending circuit 330 of the same operation as that of the CI' sending circuit 340 or the ER sending circuit 370 in which the signal CS' is replaceable with the call indicator signal CI or the equipment ready signal ER, the signal 265 is replaceable with a signal 267 or 272, and the signal 336 is replaceable with a signal 346 or 376.

Figure 26A:
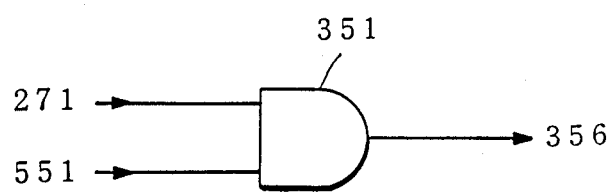
FIG. 26A is a circuit diagram illustrating an embodiment of a SY-bit sending circuit 350 of FIG. 22A.
Figure 26B:
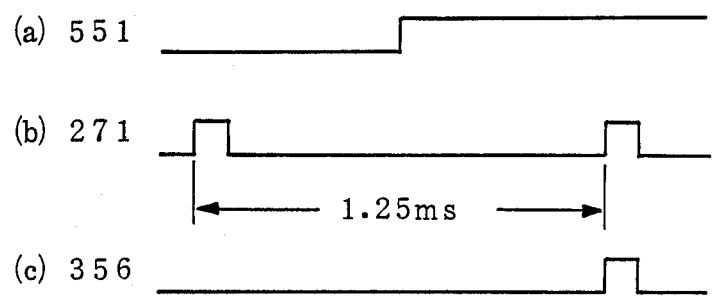
FIG. 26B is a time chart illustrating waveforms at various portions in the circuit diagram of FIG. 26A.

FIGS. 26A and 26B show a circuit diagram and a time chart of an embodiment of the SY-bit sending circuit 350. An AND gate 351 receives signals 551 of FIG. 26A (a) and 271 of (b) having a cycle time of 1.25 milliseconds to obtain ANDing and deliver a signal 356 of (c). The signal 356 indicates the timing to send out the SY-bit to the PCM transmission line.

Figure 27A:
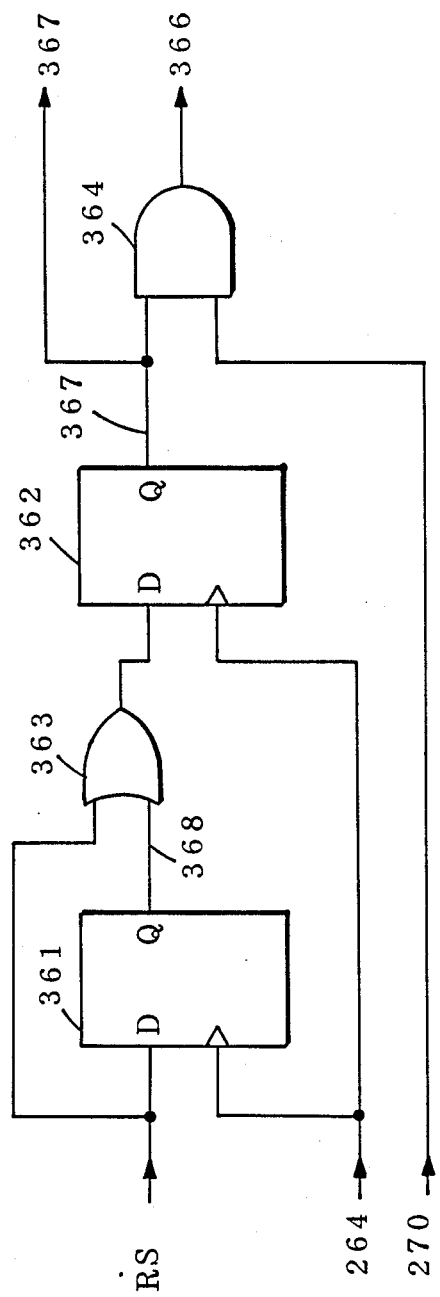
FIG. 27A is a circuit diagram illustrating an embodiment of a RS sending circuit 360 of FIG. 22A.
Figure 27B:
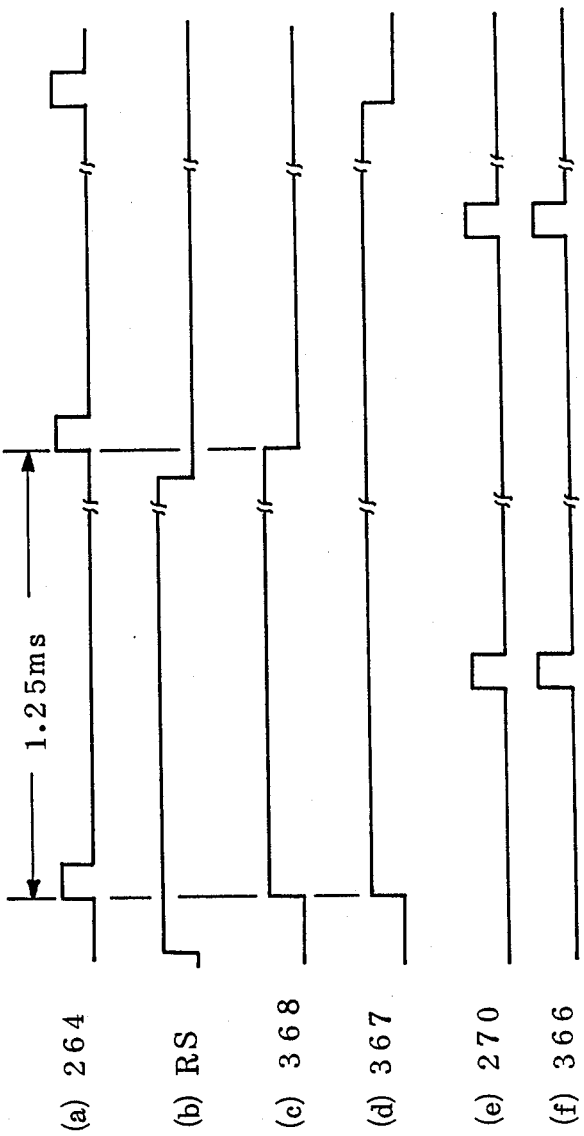
FIG. 27B is a time chart illustrating waveforms at various portions in the circuit diagram of FIG. 27A.

FIGS. 27A and 27B show a circuit diagram and a time chart of an embodiment of the RS sending circuit 360.

Figure 6:
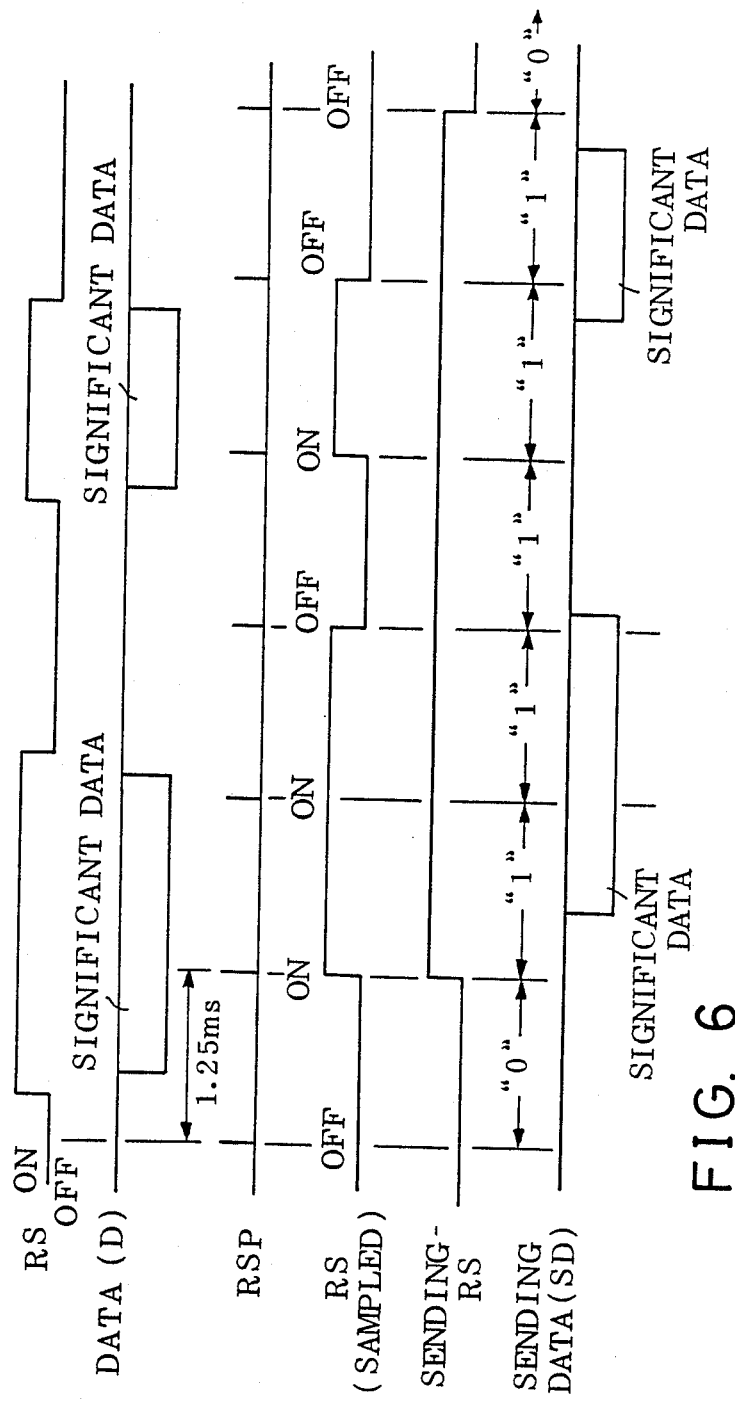
FIG. 6 is a time chart showing an example of transmission of a request-to-send signal RS in the prior art.
Figure 7:
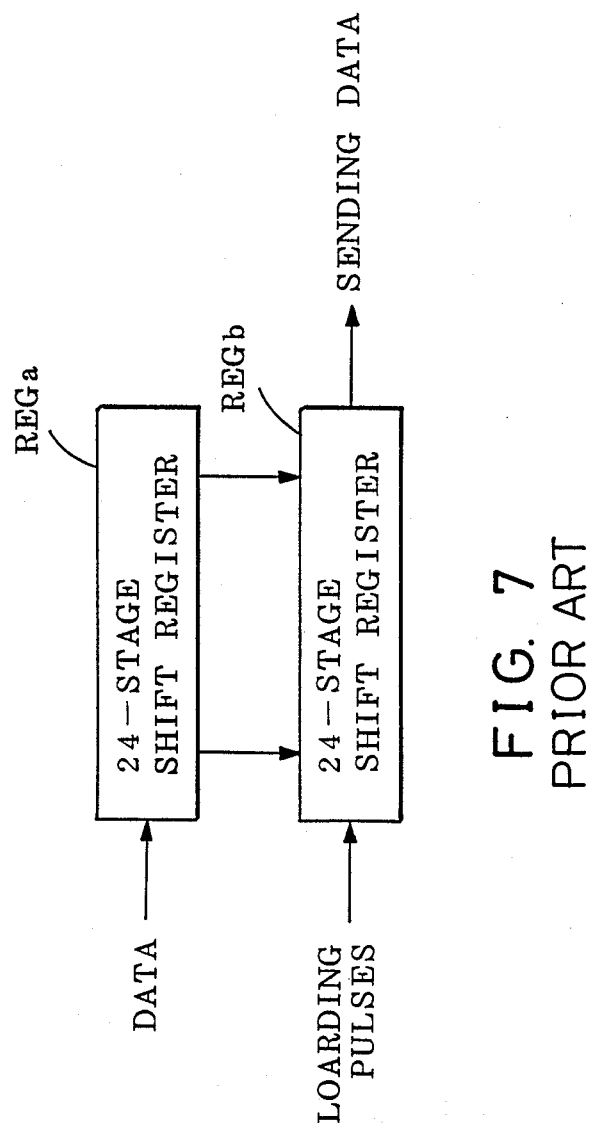
FIG. 7 is a block diagram illustrating an example of a signal delay circuit for use in the prior art.

Receiving the signal RS in FIG. 27B (b) at a data terminal D, and a signal 264 of (a) at a clock terminal, a D flip-flop 361 delivers a signal 368 of (c) from its output Q. The signal 368 of (c) and the signal RS are applied an OR gate 363 to execute ORing. Receiving the output of the OR gate 363 at a data terminal D and the signal 264 of (a) at a clock terminal, a D flip-flop 362 sends out a signal 367 in FIG. 27B (d). The signal 367 is the same signal as the signal RS of FIG. 6.

In the equipment shown in FIG. 9C, the signal 367 is omitted so that the signal 367 is not fed to the demapping circuit 400.

The signal 368 shows the value of the previous signal RS which occured 1.25 milliseconds before the present signal RS. When the previous signal RS was a "0" and the present signal RS is a "0", the signal 367 of (d) shows a "0". When a "0" and a "1", the signal 367 shows "1". When a "1" and a "0", the signal 367 shows "1". When a "1" and a "0", the signal 367 shows "1". To sum up, the signal 367 shows a "1" whenever the previous signal RS showed a "1" or the present signal RS shows a "1".

The signals 367 and 270 in FIG. 27B (e) are applied to an AND gate 364 to execute ANDing and deliver a signal 366 of (f). The signal 366 shows a timing to deliver the signal RS to the PCM transmission line.

Figure 28A:
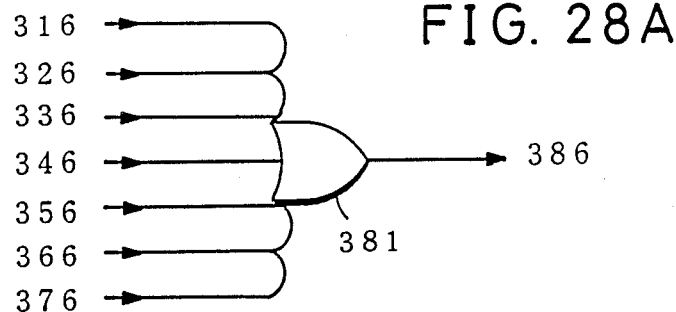
FIG. 28A is a circuit diagram illustrating an embodiment of an multiplexer 380 of FIG. 22A.
Figure 28B:
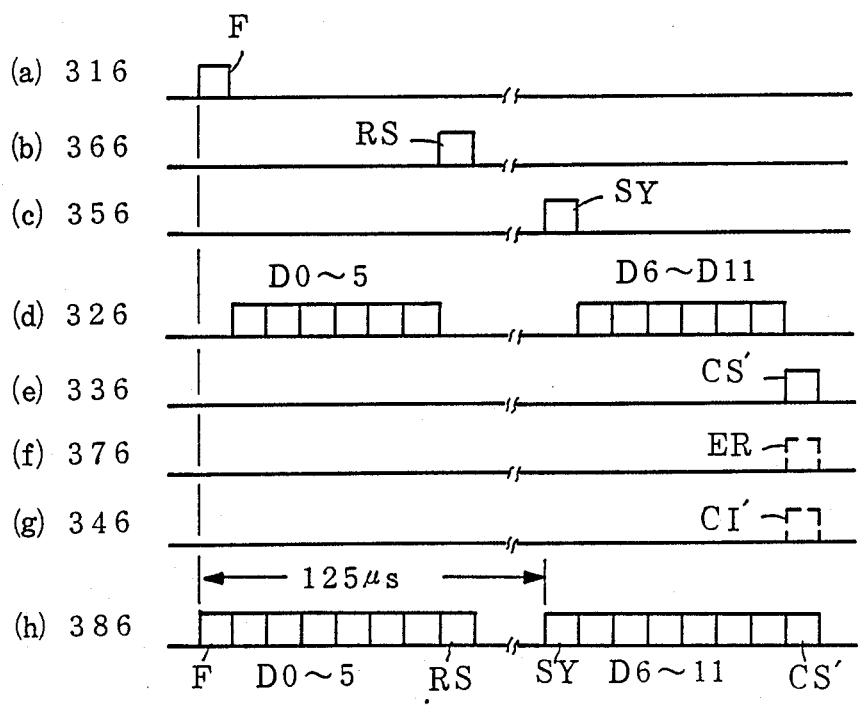
FIG. 28B is a time chart illustrating waveforms at various portions in the circuit diagram of FIG. 28A.

FIGS. 28A and 28B show a circuit diagram and a time chart of an embodiment of the multiplexer 380.

Signals 316 of (a), 326 of (d), 336 of (e), 346 of (g), 356 of (c), 366 of (b) and 376 of (f) of FIG. 28B are applied to an OR gate 381 which sends out the mapped signal 386 of (h). In the mapped signal 386, the first frame of the multiframe consisting of ten frames includes a F-bit at the first bit, data D0 to D5 at the following six bits and the signal RS at the last bit to be transmitted.

The second frame includes a SY-bit at the first bit, data D6 to D11 at the following six bits and the signal CS' at the last bit.

The third frame includes a "0" at the first bit, data D12 to D17 at the following six bits and the signal ER of the signal 376 in FIG. 28B (f).

The fourth frame includes a "0" at the first bit, data D18 to D23 at the following six bits and the signal CI' of the signal 346 in FIG. 28B (g) to be transmitted.

The fifth to the tenth frames include "0s" at all bits. Thus the mapped signal 386 as shown in FIG. 1 is obtained.

Figure 29A:
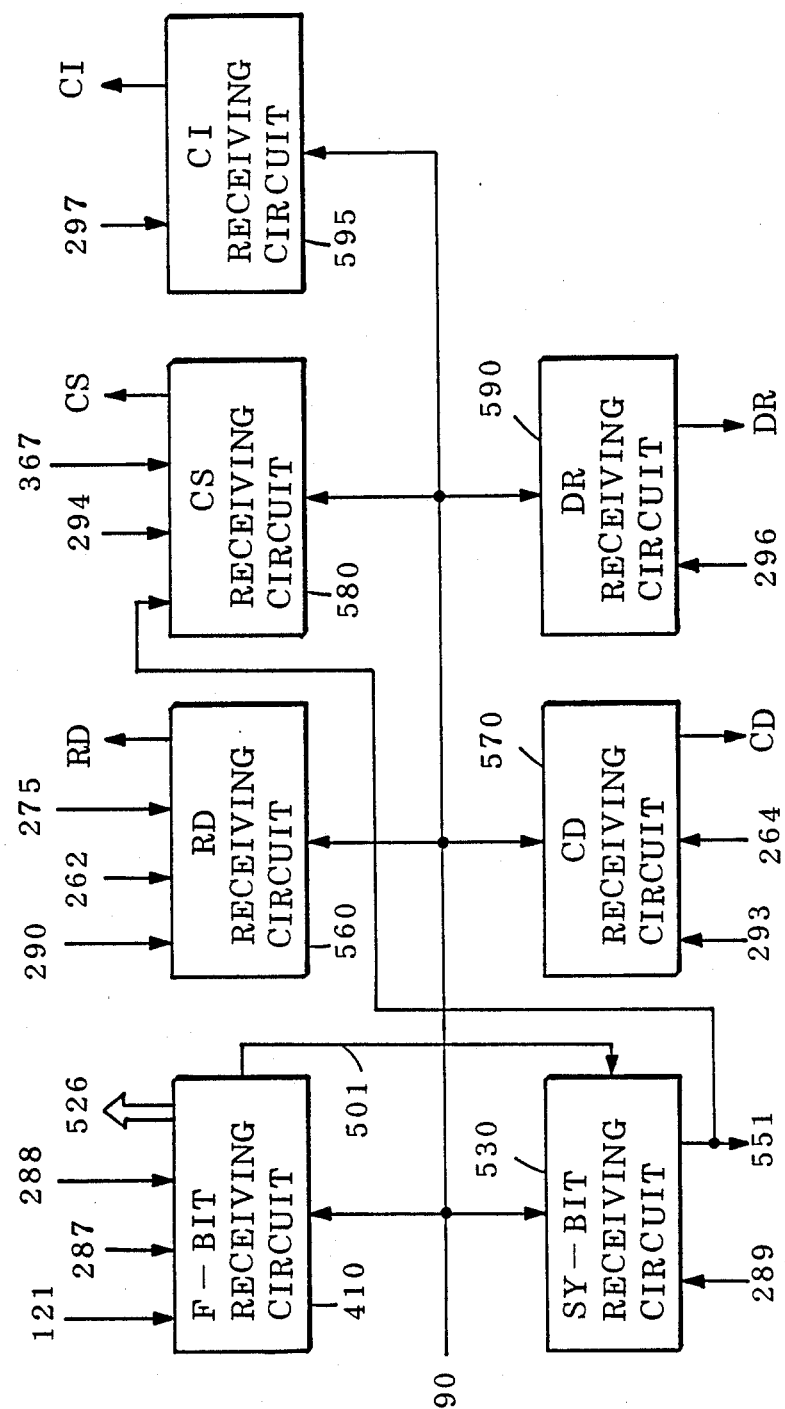
FIG. 29A is a block diagram illustrating an embodiment of a demapping circuit 400 of FIG. 9A.
Figure 29B:
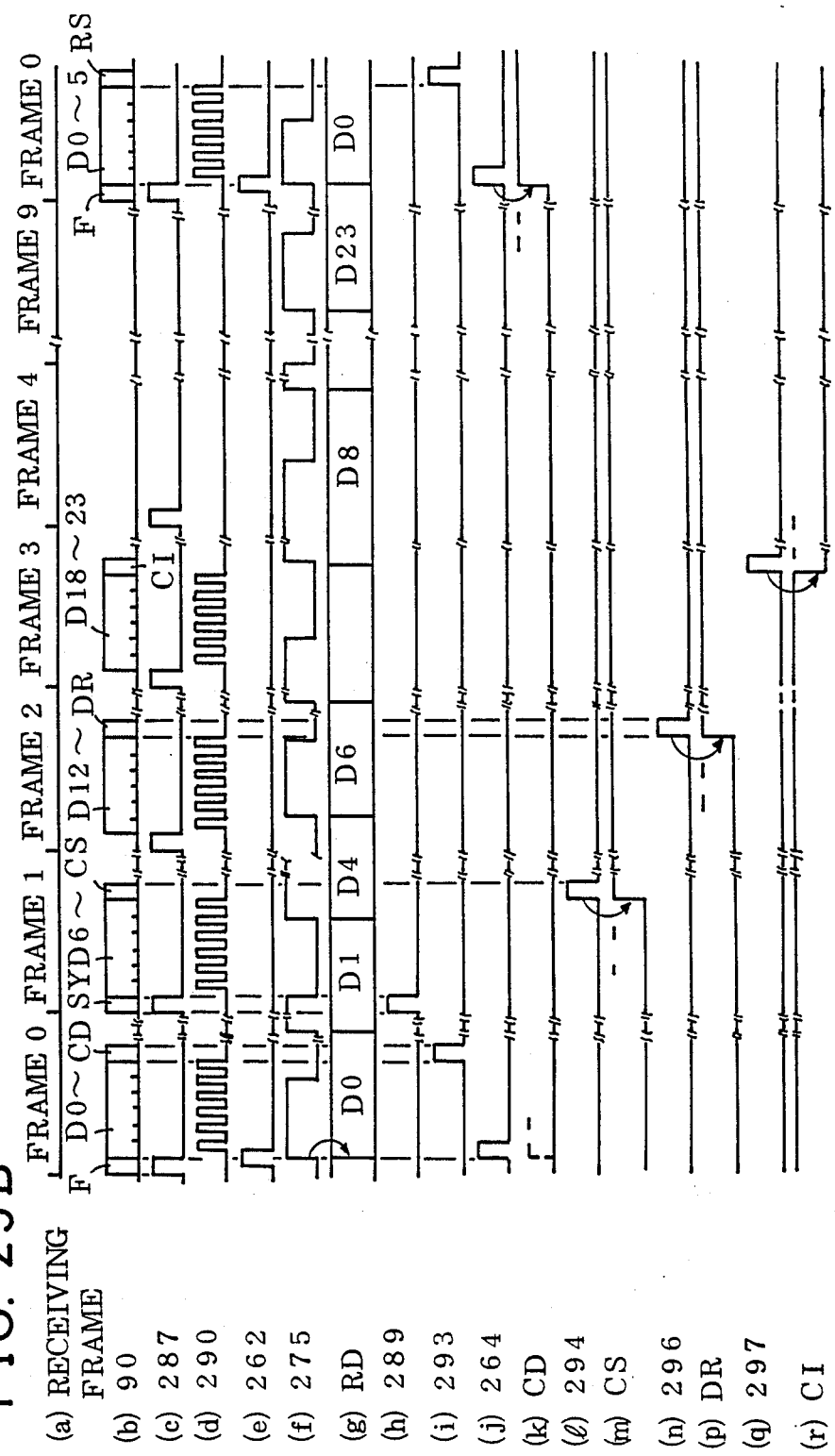
FIG. 29B is a time chart illustrating waveforms at various portions in the block diagram of FIG. 29A.

FIGS. 29A and 29B show a block diagram and a time chart of an embodiment of the demapping circuit 400.

When a F-bit receiving circuit 410 detects a F-bit in the signal to-be-demapped 90 in FIG. 29B (b), the circuit 400 delivers a bus signal 526 and a signal 501. The bus signal 526 indicates a frame number of which frame includes the detected F-bit. The signal 501 shows a synchronous state. The standard clock 121 and signals 287, 288 included in the bus signal 286 are used in order to detect the F-bit. The signal 287 is applied at the timing of the first bit of every frame as shown in FIG. 29B (c). The signal 288 is inputted at every frame in order to indicate the timing to deliver the bus signal 526.

A RD receiving circuit 560 samples the signal to-be-demapped 90 with a signal 290 of FIG. 29B (d) and delivers the sampled receiving data RD of (g) at the timing of a signal 262 of (e) during a signal 275 of (f) to a data terminal equipment. The receiving data RD of (g) has a repetition rate of e.g. 19.21 kilobits per second to be appropriate for operation of a data terminal equipment. Accordingly the receiving data RD represents repeatedly the same data 16 times.

A CS receiving circuit 580 samples the signal to-be-demapped 90 with a signal 294 in FIG. 29B (l) to obtain the signal CS of (m). The signal CS is transmitted when both signals 367 and 551 are "1s". In the equipment shown in FIG. 9C, the signal CS is transmitted when the signal 551 is "1", because the signal 367 is omitted.

A CI receiving circuit 595 samples the signal to-be-demapped 90 with a signal 297 in FIG. 29B (q) to obtain the signal CI of (r).

A SY-bit receiving circuit 530 samples the signal to-be-demapped 90 with a signal 289 of (h) to deliver the sampled result as a signal 551 when the signal 501 is "1".

A CD receiving circuit 570 samples the signal-to-be-demapped 90 with a signal 293 of (i) to deliver the sampled result as a signal the signal CD at the timing of a signal 264 of (j).

A DR receiving circuit 590 has the same construction as that of the CI receiving circuit 595 in which a signal 297 is replaceable with a signal 296 of (n) and the signal CI with the signal DR of (p).

Figure 30A:
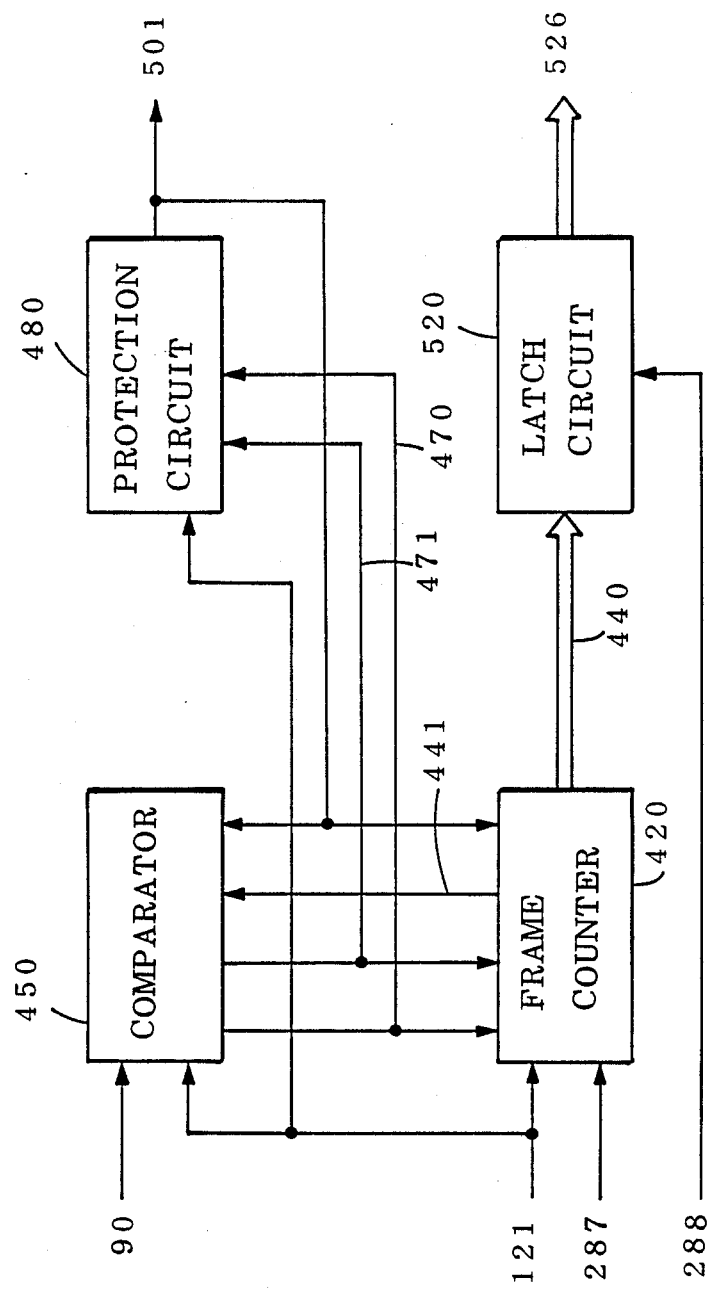
FIG. 30A is a block diagram illustrating a F-bit receiving circuit 410 of FIG. 29A.
Figure 30B:
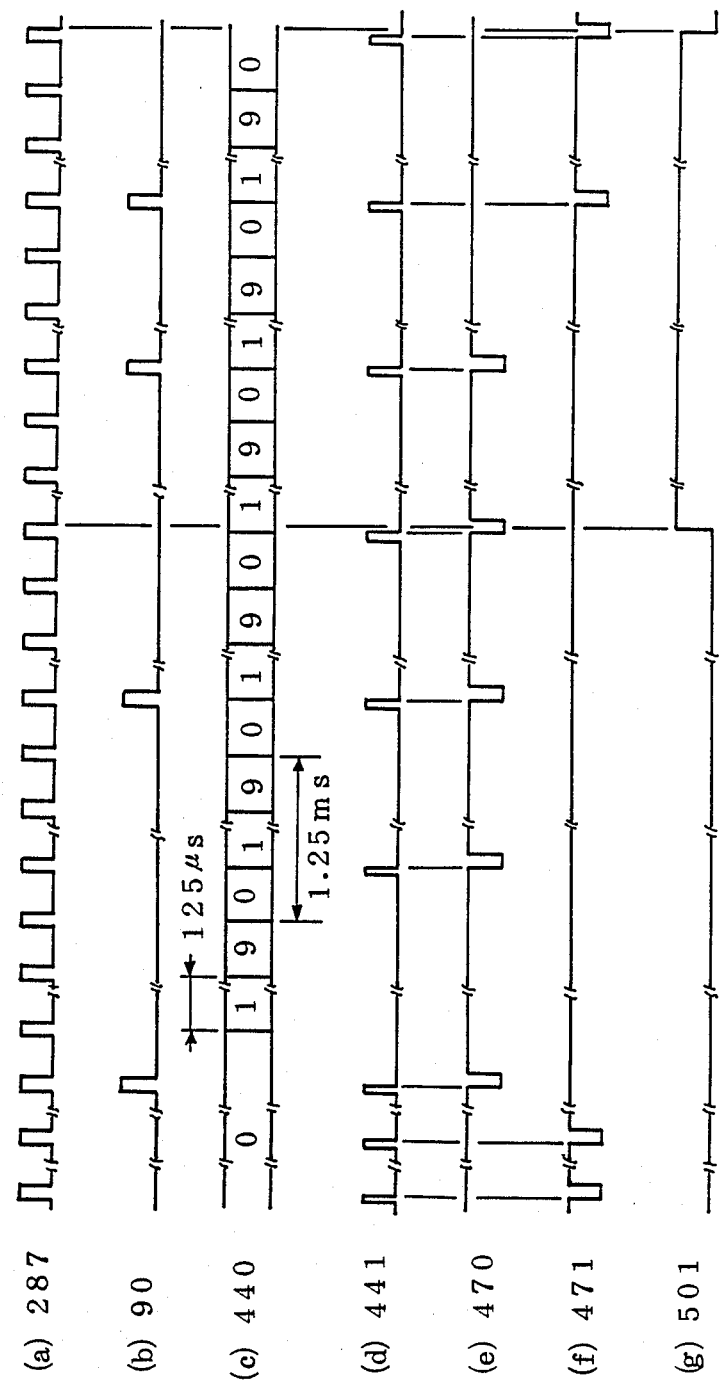
FIG. 30B is a time chart illustrating waveforms at various portions in the block diagram of FIG. 30B.

FIGS. 30A and 30B show a block diagram and a time chart of an embodiment of the F-bit receiving circuit 410. In FIG. 30B (b), the signal to-be-demapped 90 indicates only the F-bit, and all the other data and control signals are "0s" in order to describe simply.

Receiving the standard clock 121 and a signal 287 in FIG. 30B (a), a frame counter 420 sends out a bus signal 440 of (c) which indicates frame numbers 0 to 9. A signal 441 of (d) is delivered at the timing of the signal 287 of (a) during frame number 0.

Receiving a signal 471 of (f), the frame counter 420 can not count up to deliver the bus signal 440 of (c) while a signal 501 of (g) is a "0". Receiving a signal 470 of (e), the frame counter 420 can count up from 0 to 9 on every receipt of a signal 287 of (a) and is reset to 0 again. The count up operation can not be executed when the signal 471 of (a) is applied and can executed when the signal 470 of (e) is applied. In spite of receipt or no receipt of signals 470 of (e) and 471 of (f), the frame counter 420 can count up to make contents of the bus signal 440 change 0 to 9, reset to 0 and 0 to 9 again continuously while the signal 501 of (g) is a "1".

A comparator 450 compares the signal to-be-demapped 90 of (b) showing only F-bits with a state of flip-flops included therein at the timing of a signal 441 of (d) to detect F-bits by obtaining the coincidence of the signal 90 and the state. When the coincidence is obtained, the comparator 450 delivers a signal 470 of (e) and inverts the state of internal flip-flops. When no F-bit is detected and so the non-coincidence is obtained, the comparator 450 delivers a signal 471 of (f) and does not invert the state of flip-flops included therein.

In spite of the coincidence or non-coincidence, the state of flip-flops is inverted at every receipt of a signal 441 of (d) while the signal 501 of (g) is a "1".

Receiving the standard clock 121, a protection circuit 480 detects the asynchronous state to make the signal 501 of (g) into a "0" when the signal 471 of (f) meaning the non-coincidence is applied to the circuit 480 two times continuously and the synchronous state to make the signal 501 into a "1" when the signal 470 of (e) meaning the coincidence is applied four times continuously. In this manner, the synchronous state can be protected from noise because the signal 501 signifying the synchronous state can not be changed by noise.

Receiving the bus signal 440, a latch circuit 520 latches contents (frame Nos.) of the bus signal 440 showing flame numbers at the timing of the signal 288 thereinto to deliver the latched contents as a bus signal 526.

Figure 31A:
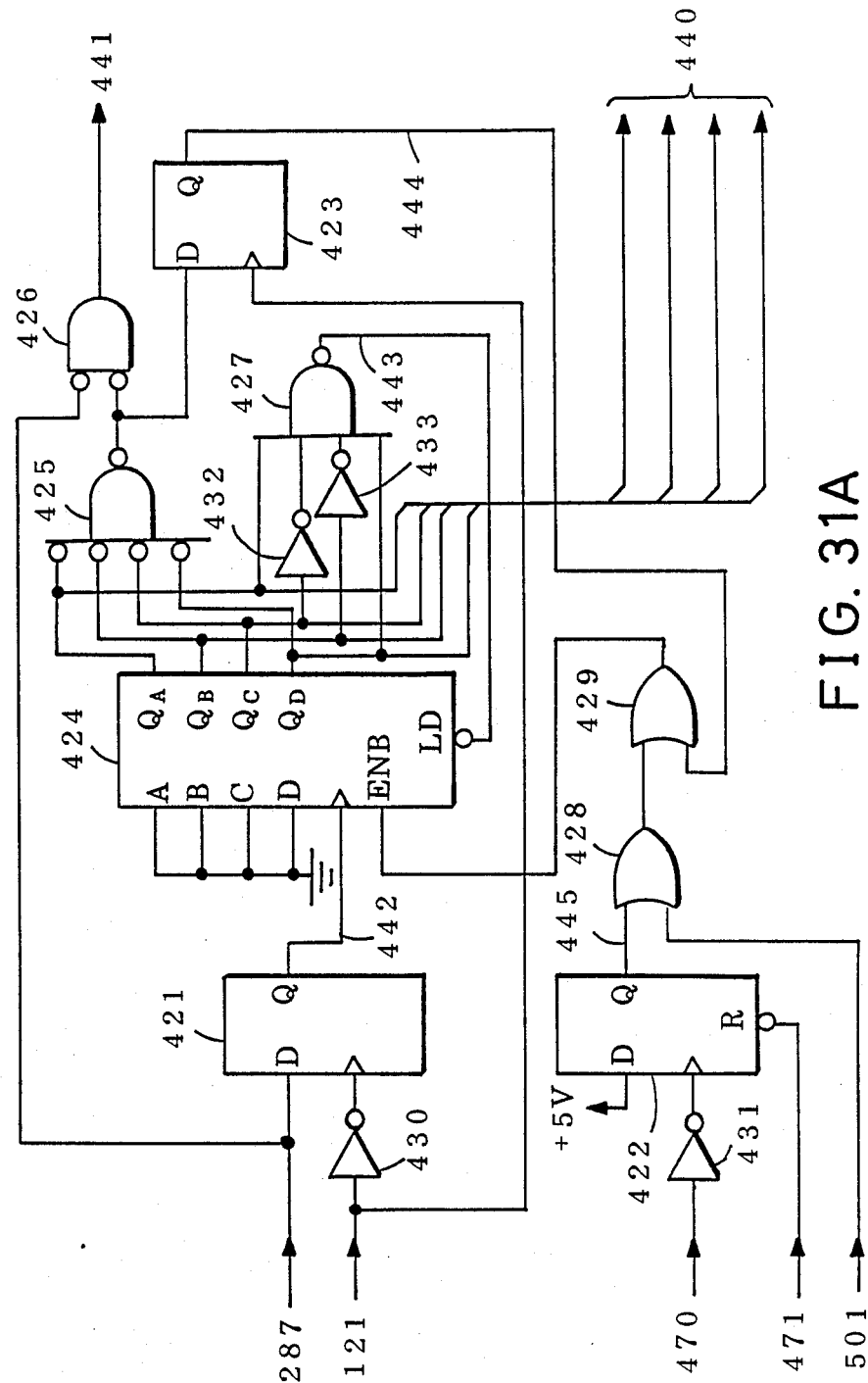
FIG. 31A is a circuit diagram illustrating an embodiment of frame counter 420 of FIG. 30A.
Figure 31B:
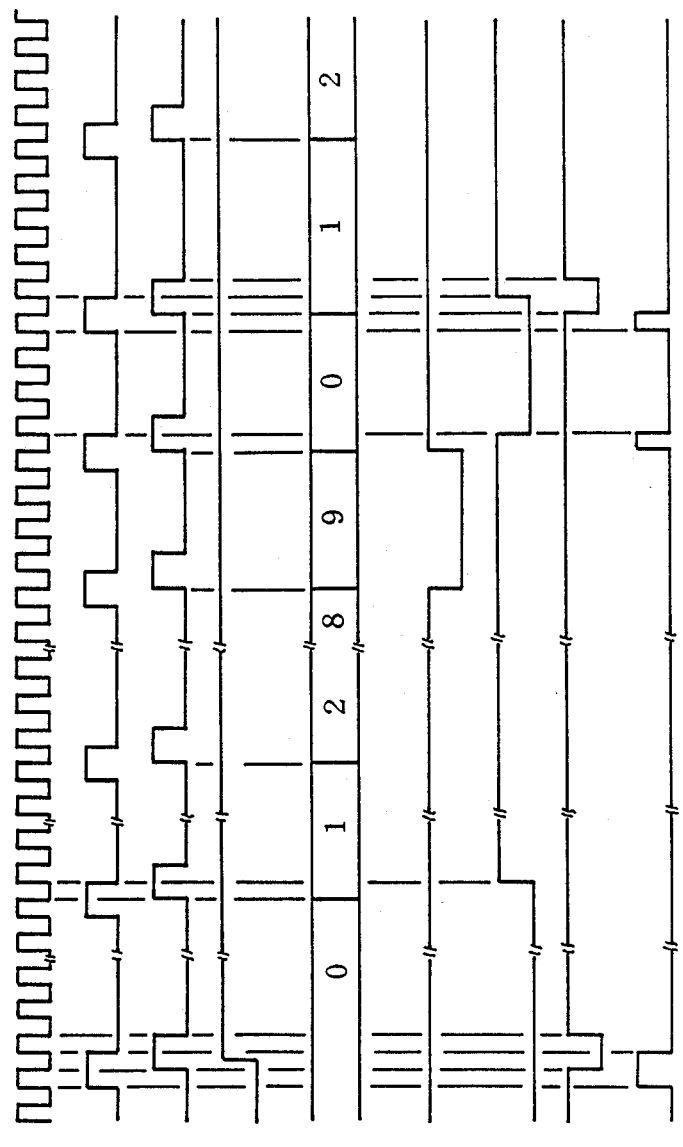
FIG. 31B is a time chart illustrating waveforms at various portions in the circuit diagram of FIG. 30A.

FIGS. 31A and 31B show a circuit diagram and a time chart of an embodiment of the frame counter 420.

A D flip-flop 421 receives the standard clock 121 in FIG. 31B (a) at its clock terminal through an inverter 430 and a signal 287 of (b) at its data terminal D to obtain a signal 442 of (c) at its output Q.

A D flip-flop 422 receives the signal 470 of (h) indicating the coincidence through an inverter 431 at its clock terminal, +5V being "1" at its data terminal D, and the signal 471 indicating the non-coincidence at its reset terminal R. When applied the signal 470 of (h), the signal 445 of (d) at the output Q of the D flip-flop 422 turns to a "1" of which state is continued till the input of the signal 471. Signals 445 of (d), 501 and 444 of (g) are ORed by two OR gates 428 and 429 which delivers an output to an enable terminal of a decimal counter 424. The counter 424 counts up every input of a signal 442 in FIG. 31B (c) while the enable terminal is "1".

A signal 441 of (i) is obtained from outputs $Q_A$, $Q_B$, $Q_C$ and $Q_D$ of the counter 424 through an OR gate 425 and a NOR gate 426. The signal 441 indicates a "1" meaning a F-bit detected when the bus signal 440 shows frame number 0 and the signal 287 of (b) representing the lead of a frame is applied.

A D flip-flop 423 receives the standard clock 121 in FIG. 31B (a) at its clock terminal, and the output of the OR gate 425 at its data terminal D to deliver a "1" of a signal 444 of (g) while the bus signal 440 of (e) indicates 1 to 9.

The enable terminal ENB of the counter 424 applied the output of the OR gate 429 goes to a "1" whenever the signal 444 of (g) is a "1", namely the signal 501 is a "1" representing the establishment of the frame synchronization, the signal 470 of (h) is a "1" representing the coincidence or the bus signal 440 of (e) delivered from the counter 424 indicates 1 to 9.

In this manner, when the enable terminal ENB shows a "1", the counter 424 counts up to 9 which is contents of the bus signals 440 of (e). Then a NAND gate 427 receives outputs $Q_A$, $Q_D$ of the counter 424 and outputs $Q_B$, $Q_C$ of the counter 424 through inverters 432 and 433 to turn a signal 443 of (f) from a "1" to a "0" which is fed to a load terminal LD of the counter 424. After loaded with the "0", the counter 424 starts to count up again.

Figure 32A:
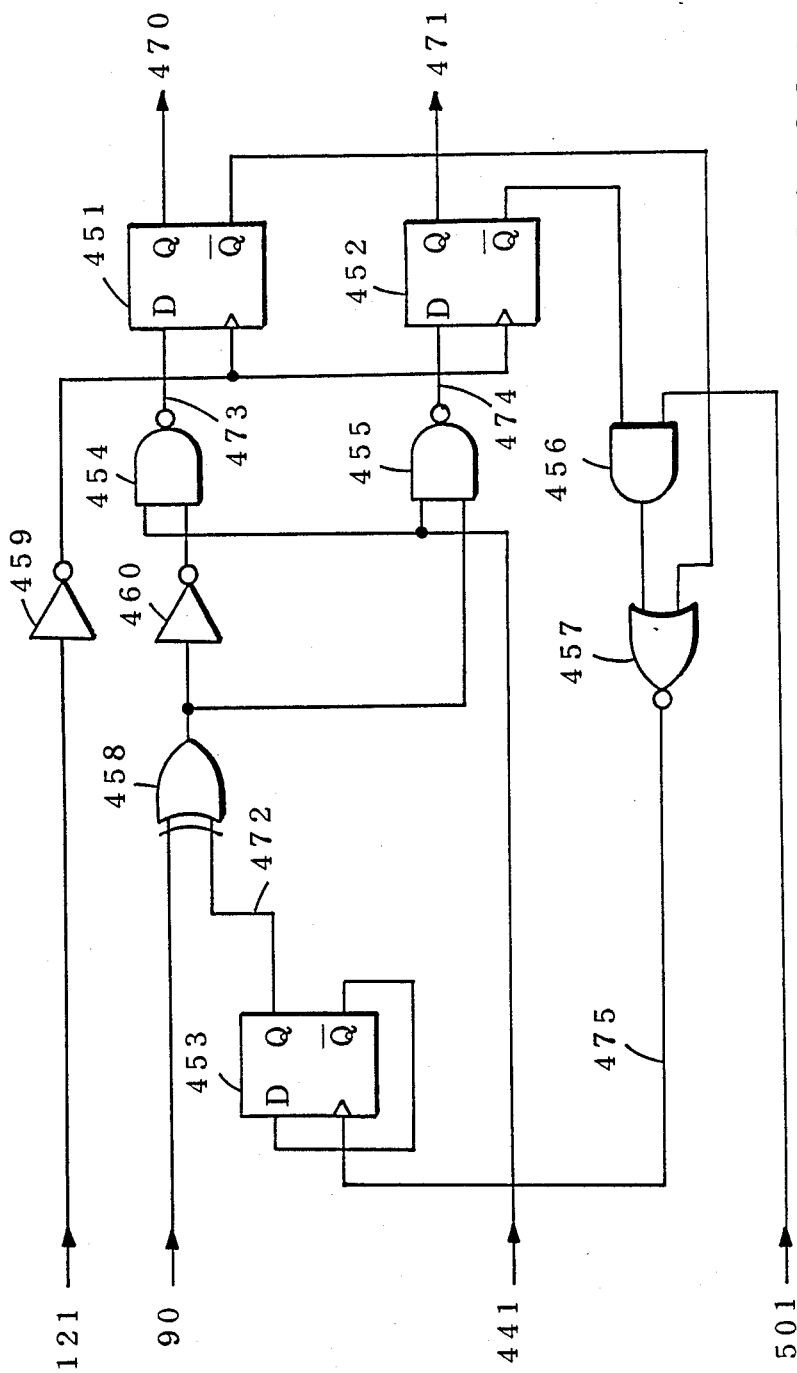
FIG. 32A is a circuit diagram illustrating an embodiment of a comparator 450 of FIG. 30A.
Figure 32B:
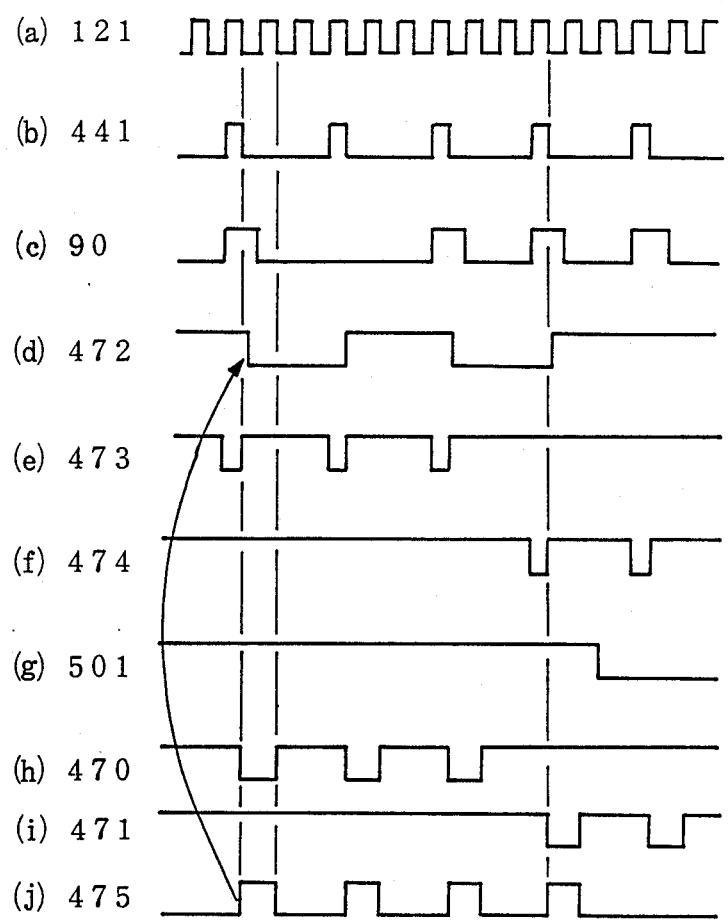
FIG. 32B is a time chart illustrating waveforms at various portions in the circuit diagram of FIG. 32A.

FIGS. 32A and 32B show a circuit diagram and a time chart of an embodiment of the comparator 450. In FIG. 32B (c), the signal to-be-demapped 90 indicates only the F-bit, and all the other data and control signals are "0s" in order to describe simply.

A data terminal D of a D flip-flop 453 is connected to its output not-Q so that a signal 472 of (d) of its output Q is turned at every reception of a signal 475 in FIG. 32B (j). The signal 472 of (d) and the signal to-be-demapped 90 of (c) are exclusively ORed by an exclusive-OR gate 458 to deliver its output to a NAND gate 454 through an inverter 460 and to a NAND gate 455 directly. Both NAND gates 454 and 455 are applied the signal 441 to deliver signals 473 of (e) and 474 of (f) to data terminals of D flip-flops 451 and 452 respectively.

The standard clock 121 in FIG. 32B (a) is supplied to both clock terminals of D flip-flops 451 and 452 through an inverter 459. D flip-flops 451 and 452 deliver outputs Qs signals 470 of (h) and 471 of (i) respectively. The signal 470 of (h) showing a "0" is sent out when the signal to-be-demapped 90 is coincident with the signal 472 of (d). The signal 471 of (i) showing a "0" is sent out when the signal 90 is non-coincident with the signal 472 of (d).

An output not-Q of the D flip-flop 452 and the signal 501 of (g) are ANDed by an AND gate 456 which delivers an output to a NOR gate 457. The NOR gate 457 executes NORing an output not-Q of the D flip-flop 451 and an output of the AND gate 456 to obtain a signal 475 of (j) which is fed into a clock terminal of the D flip-flop 453. The signal 501 shows a "1" when the frame synchronization is established. When signals 501 and 471 show "0s", the D flip-flop 453 can not be inverted. When the signal 501 is "1" and the signal 471 is "0", the D flip-flop 453 can be inverted because of the non-coincidence. When the signal 470 is "0" showing the coincidence, the D flip-flop 453 can be inverted in spite of the states of the signal 501.

Figure 33A:
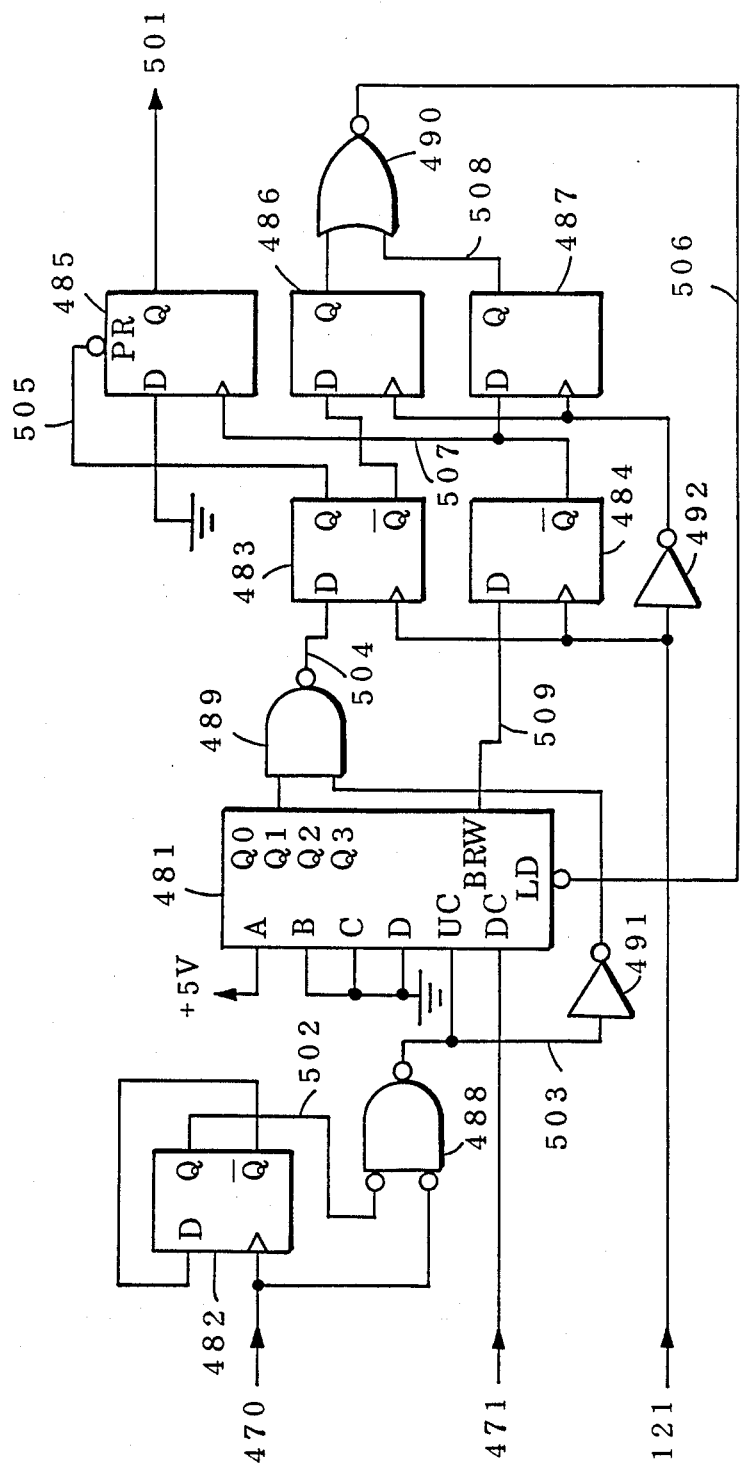
FIG. 33A is a circuit diagram illustrating an embodiment of a protection circuit 480 of FIG. 30A.

FIGS. 33A and 33B show a circuit diagram and a time chart of an embodiment of the protection circuit 480.

A data terminal of a D flip-flop 482 is connected to its output not-Q and its clock terminal is provided with the signal 470 of (a) showing the coincidence to obtain a signal 502 of (b) at its output Q.

The signals 502 in FIG. 33B (b) and 470 in (a) are applied to an OR gate 488 to be ORed. A signal 503 of (c) of the output of the OR gate 488 is applied to an up-count terminal UC of an up-down counter 481 of which a terminal A is connected to +5V ("1") and terminals B, C, D are grounded ("0s"). When a "0" is applied to its load terminal LD, the output Q0 is set to a "1", the outputs Q1, Q2 and Q3 are set to "0s". A down count terminal DC is applied a signal 471 of (d).

Receiving the signal 503 of (c) at the up-count terminal UC, outputs Q0 to Q3 of the counter 481 indicate 2 as shown in (e) by counting and the output Q1 shows 1 when the output Q0 is "1" and all outputs Q1 to Q3 are "0s". After that, when the signal 503 of (c) is turned from a "1" to a "0" to be delivered to a NAND gate 489 through an inverter 491, a signal 504 of (f) at the output of the NAND gate 489 is turned from a "1" to a "0". Receiving the signal 504 of (f) at a data terminal D and the standard clock 121 at a clock terminal, a D flip-flop 483 delivers a signal 505 of (h), whch is turned from a "1" to a "0", to a preset terminal PR of a D flip-flop 485. Then the output Q signal 501 of the D flip-flop 485 goes from a "0" to a "1" as shown in (i) of FIG. 33B.

A D flip-flop 483 delivers its output not-Q to a data terminal of a D flip-flop 486 which is applied the standard clock 121 at its clock terminal through an inverter 492. Then the D flip-flop 486 sends out an output Q indicating a signal polarity reverse to the polarity of the first occurrence of a "0" in FIG. 33B (j). The output Q of the D flip-flop 486 is delivered to a NOR gate 490 to obtain a signal 506 of (j).

The signal 506 of (j) is applied to a load terminal LD of the up-down counter 481 to load a "1" of terminals A to D so that outputs Q0 to Q3 of (e) show a value 1 again.

When a down-count terminal DC of the up-down counter 481 is applied the signal 471 of (d) showing the non-coincidence, outputs Q0 to Q3 of (e) indicate a value 0. Receiving the second occurrence of a "0" of the signal 471 of (d), the up-down counter 481 counts to negative to deliver signal 509 of (k) showing a "0" from its borrow terminal BRW.

The signal 509 is applied to a data terminal of a D flip-flop 484 which receives the standard clock 121 of (g) at its clock terminal to obtain a signal 507 of (1) at its output not-Q.

The signal 507 is applied to a clock terminal of a D flip-flop 485 of which output Q being a signal 501 of (i) goes from a "1" to a "0". The signal 507 of (1) is also applied to data terminal D of a D flip-flop 487 which delivers a signal 508 of (m) from its output Q. The signal 508 of (m) is applied to the NOR gate 490 to obtain the second occurrence of "0" of the signal 506 of (j) which is delivered to the load terminal LD of the up-down counter 481 which is loaded with a "1" being set a terminals A to D to obtain outputs Q0 to Q3 of (e) showing a value 1 again.

In this manner, the up-counting operation is executed by the signal 470 of (a) and the down-counting operation by the signal 471 of (d) continuously. When four "0s" of the signal 470 showing the coincidence are successively applied to the circuit shown in FIG. 33A, the signal 501 of (i) is turned from a "0" to a "1". When two "0s" of the signal 471 showing the non-coincidence are successively applied, the same from a "1" to a "0".

Figure 34:
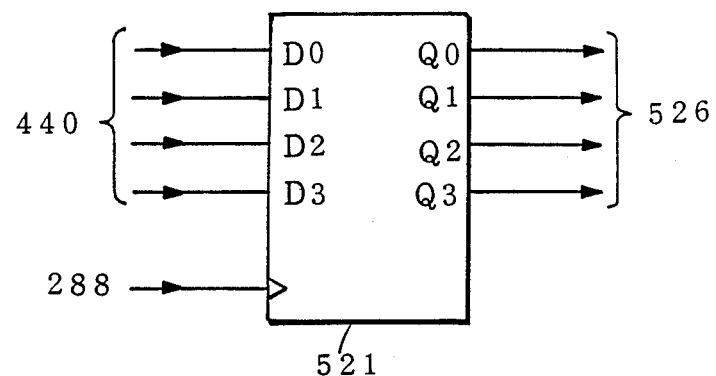
FIG. 34 is a circuit diagram illustrating an embodiment of a latch circuit 520 of FIG. 30A.

FIG. 34 shows a circuit diagram of an embodiment of the latch circuit 520 in which a latch 521 receives the bus signal 440 designating frame numbers. The latch 521 sends out outputs Q0 to Q3 as the signal 526 (refer to FIG. 15B (d)) at every reception of the signal 288 (refer to FIG. 15B (c)).

Figure 35A:
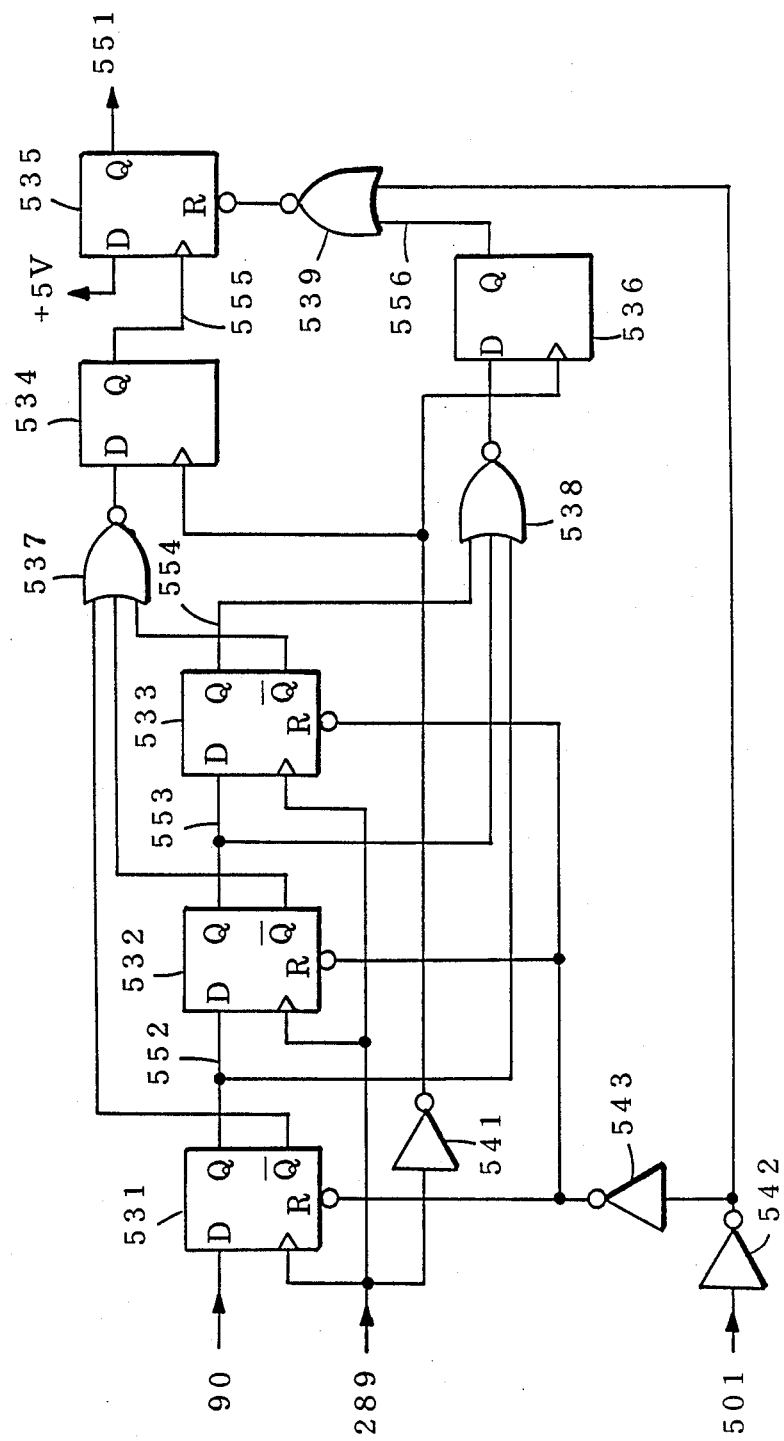
FIG. 35A is a circuit diagram illustrating an embodiment of a SY-bit receiving circuit 530 of FIG. 29A.
Figure 35B:
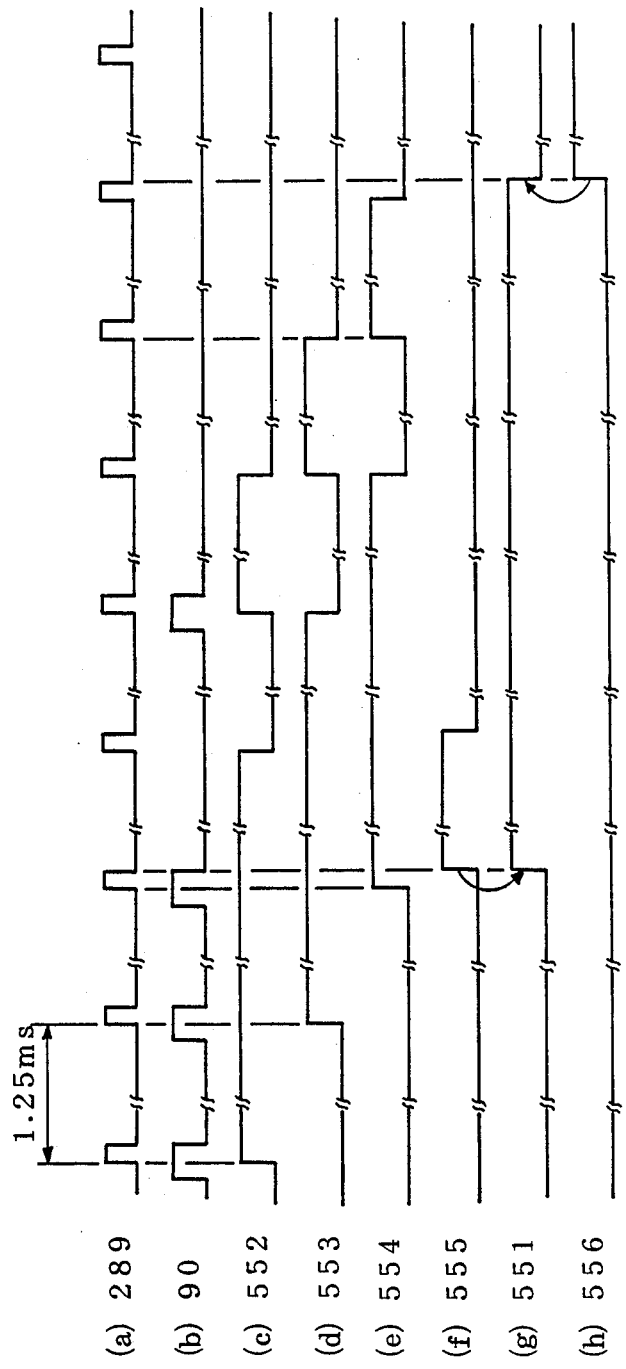
FIG. 35B is a time chart illustrating waveforms at various portions in the circuit diagram of FIG. 35A.

FIGS. 35A and 35B show a circuit diagram and its time chart of an embodiment of the SY-bit receiving circuit 530. In FIG. 35B (b), the signal to-be-demapped 90 indicates the only SY-bits and all the other data and control signals are "0s" in order to describe simply.

A signal 501 applied to reset terminals Rs of D flip-flops 531, 532 and 533 through two inverters 542 and 543.

The signal to-be-demapped 90 in FIG. 35B (b) is applied to a data terminal D of the D flip-flop 531 during a "1" of the signal 501, and a signal 289 of (a) is applied t a clock terminal of the D flip-flop 531 to obtain an output Q as a signal 552 of (c). The signal 552 is applied to a data terminal of the D flip-flop 532 to obtain a signal 553 of (d) at its output Q. The signal 553 is applied to a data terminal D of the D flip-flop 533 to obtain a signal 554 of (e) at its output Q.

Each output not-Q of D flip-flops 531, 532 and 533 is applied to a NOR gate 537 which delivers an output to a data terminal D of a D flip-flop 534. The D flip-flop 534 receives a signal 289 in FIG. 35B (a) at its clock terminal via an inverter 541 to obtain a signal 555 of (f) at its output Q.

Each output Q of D flip-flops 531, 532 and 533 is applied to a NOR gate 538 which delivers an output to a data terminal of a D flip-flop 536. The flip-flop 536 receives a signal 289 in FIG. 35B (a) through the inverter 541 to obtain a signal 556 of (h) at its output Q.

A D flip-flop 535, which is set "1" (+5V) at its data terminal D, receives a signal 556 of (h) and the signal 501, which is inverted by the inverter 542, through a NOR gate 539, and receives the signal 555 of (f) at its clock terminal. When signals 501 and 556 show a "1" and a "0" respectively, the reset terminal R of the D flip-flop 535 is set a "1" so that when the signal 555 of (f) is applied, the signal 551 of its output Q in (g) goes to a "1" as shown in FIG. 35B (g). After that, when all signals 552 of (c), 553 of (d) and 554 of (e) show "0s", the D flip-flop 536 receives a "1" at its data terminal D so that the output signal 556 of the D flip-flop 536 in (g) is turned from a "0" to a "1" by receiving the signal 289 of (a) through the inverter 541 at its clock terminal. The signal 556 is applied to the reset terminal R of the D flip-flop 535 through the NOR gate 539 to set a "0", so that the output Q of the D flip-flop 535 is changed from a "1" to a "0" as the signal 551 of (g).

When the signal 501, which indicates synchronous state, is a "0", the D flip-flop 535 is reset with a "0" of its reset terminal R to always show "0" of the signal 551.

The SY-bit receiving circuit 530 as shown in FIG. 35A samples the signal to-be demapped 90 in FIG. 35B (b), which indicates only SY-bits, by the signal 289 of (a) for sampling SY-bits. When "1s" of SY-bits of the signal 90 have been successively sampled three times, the SY-bit receiving circuit 530 detects that the data circuit-terminating equipment of the other party is in the state synchronous with the F-bits and turns the signal 551 of (g) from a "0" to a "1". Inversely, when "0s" of SY-bits of the signal 90 have been successively sampled three times by the signal 289 of (a), the SY-bit receiving circuit 530 detects that the data circuit-terminating equipment of the other party is in the state asynchronous with F-bits and turns the signal 551 of (g) from a "1" to a "0".

Figure 36A:
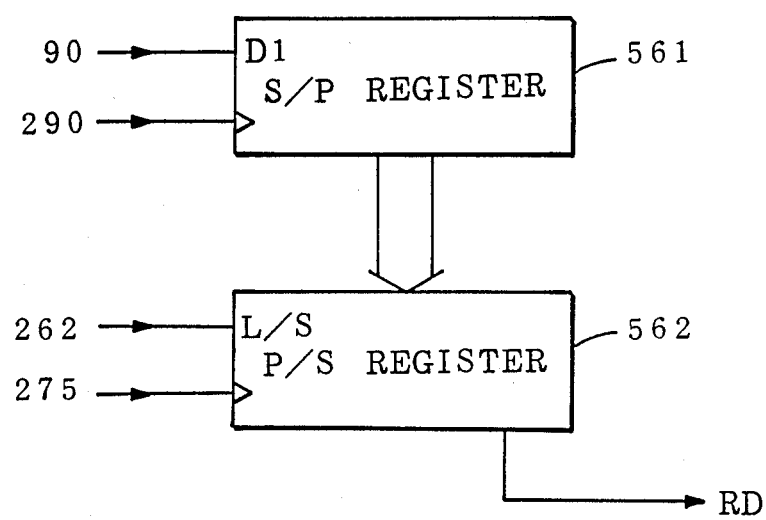
FIG. 36A is a circuit diagram illustrating an embodiment of an RD receiving circuit 560 of FIG. 29A.
Figure 36B:
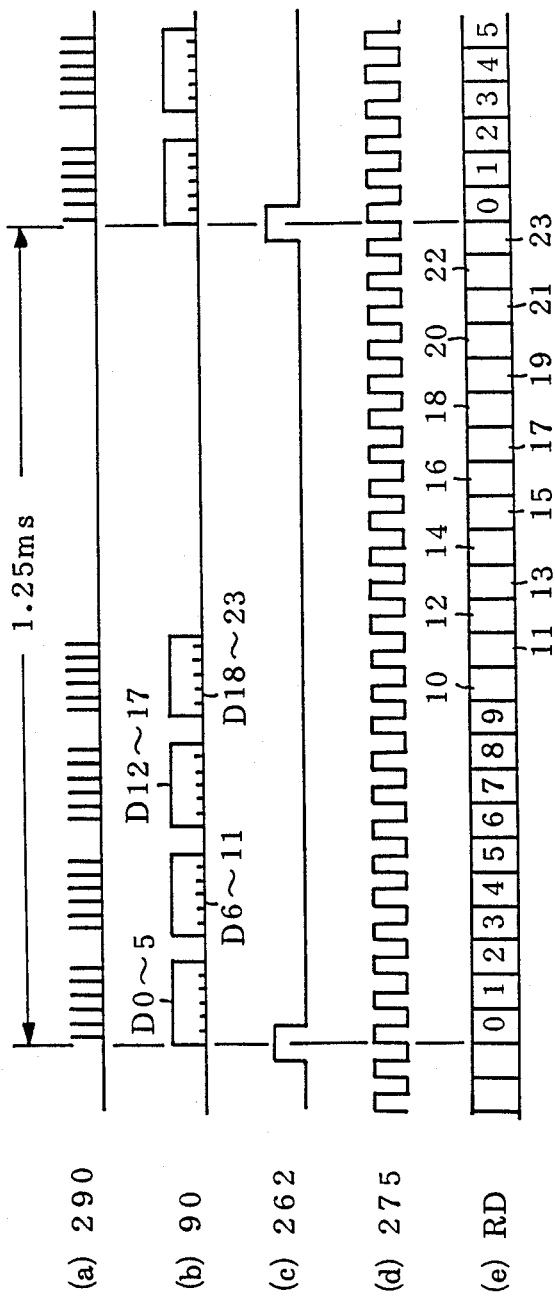
FIG. 36B is a time chart illustrating waveforms at various portions in the circuit diagram of FIG. 36A.

FIGS. 36A and 36B show a circuit diagram and a time chart of an embodiment of the RD receiving circuit 560, in which the signal to-be-demapped 90 in FIG. 36B (b) indicates the only data signal, and all the other control signals are "0s" in order to describe simply.

A S/P register 561, which converts serial input data of 24-bits to parallel data, receives the signal to-be-demapped 90 at its data input DI to sample and load the signal 90 by the signal 290 of (a) applied at its clock terminal so that the loaded parallel data of 24-bits are sent out. The parallel data of 24-bits is applied to a P/S register 562 to convert the parallel data to serial data The P/S register 562 is loaded the parallel data by a "1" of a signal 262 of (c) and delivers the receiving data RD of (e) in series by a clock 275 of (d) during a "0" of the signal 262 in FIG. 36B (c).

FIGS. 37A and 37B show a circuit diagram and a time chart of an embodiment of the CD receiving circuit 570 in which the signal to-be-demapped 90 in FIG. 37B (b) indicates only the carrier detect signal CD, and the other control and data signals are shown as "0s".

A D flip-flop 571 receives the signal to-be-demapped 90 at its data terminal D in FIG. 37B (b) and a signal 293 of (a) at its clock terminal to deliver its output to a data terminal D of a D flip-flop 572. After that, when a signal 264 of (c) is applied to a clock terminal of the D flip-flop 572, a signal 576 of (d) of its output Q turns from a "0" to a "1". When the signal 90 of (b) indicating only the signal CD shows a "0" and the next signal 264, the D flip-flop 572 delivers a "0" of the signal 576 which is the carrier detect signal CD on reception of the signal 264 of (c). An arrow of FIG. 37B indicates that the signal to-be-demapped 90 of (b) is sent out with the signal 576 arrowed in (d).

FIG. 38 shows a circuit diagram of an embodiment of the CS receiving circuit 580. A D flip-flop 581 receives the signal to-be-demapped 90 in FIG. 29B (b) at its data terminal D and a signal 294 in FIG. (1). 29B which has a repetition rate of 1.25 milliseconds at its clock terminal to obtain an output Q. The output Q is applied to an AND gate 582 which receives signals 367 (refer to FIG. 27B (d)) and 551 (refer to FIG. 35B (g)) to deliver the clear-to-send signal CS (refer to FIG. 29B (m)) to the data terminal equipment. Then the data terminal equipment can start to send out data.

FIG. 39 shows a circuit diagram of an embodiment of the DR receiving circuit 590. A D Flip-flop 591 receives the signal to-be-demapped 90 in FIG. 29B (b) at its data terminal D and the signal 296 in FIG. 29B (n) at its clock terminal and delivers the data set ready signal DR in FIG. 29B (p).

The CI receiving circuit 595 has the same circuit as that of the DR receiving circuit 590 shown in FIG. 39 in which the signal 296 is replaced by the signal 297 in FIG. 29B (q), the signal DR by the call indicator signal CI in FIG. 29B (r).

In this manner, the demapping circuit 400 delivers various signals RD, CS, CR, DR and CI in parallel to the data terminal equipment.

It is obvious from the abovementioned that as the data circuit-terminating equipment according to the present invention can be connected with a PCM transmission line which has various transmission rate, the data terminal equipment can communicate in the asynchronous state at the speed to be required by the data terminal equipment without any operation. Further the data circuit-terminating equipment of the invention can satisfy the recommendations of the V25 bis of CCITT.

While the preferred form of the present invention has been described, it is to be understood that modifications will be apparent those skilled in the art without departing from the spirit of the invention.

The scope of the invention, therefore, is to be determined solely by the claims.

What is claimed is:

1. A data circuit-terminating equipment for connecting an asynchronous data terminal equipment with a PCM transmission line which can transmit at various transmission rates by means of accommodating data and control signals in a multiframe construction by using at least a PCM synchronization signal and at least a PCM clock, wherein said data circuit-terminating equipment comprises:
   mapping means for mapping data and control signals from said asynchronous data terminal equipment in a predetermined procedure and for constructing multiframes to send out a mapped signal;
   sending register means for registering said mapped signal to send out at a transmission rate of said PCM transmission line at a timing being determined by said PCM synchronization signal and said PCM clock to said PCM transmission line;
   receiving register means for receiving data and control signals of multiframes which are transmitted from said PCM transmission line at said transmission rate to register and for delivering a signal to-be-demapped at a predetermined timing synchronizing with said PCM synchronization signal;
   demapping means for demapping said signal to-be-demapped to obtain demapped data and control signals and for delivering said demapped data and control signals to said asynchronous data terminal equipment at a predetermined timing;
   PLL means including a phase-locked loop for generating a standard clock which synchronizes with said PCM synchronization signal; and
   timing generating means for generating required timing signals from said standard clock, said PCM synchronization signal and said PCM clock to deliver to said sending register means, said receiving register means, said mapping means and said demapping means.

2. A data circuit-terminating equipment as claimed in claim 1, wherein said sending register means includes a register which receives data to send out.

3. A data circuit-terminating equipment as claimed in claim 1, wherein said receiving register means includes a register which receives data to send out.

4. A data circuit-terminating equipment as claimed in claim 1, wherein said PLL means comprises:
   clock generating means for generating a PLL clock of which repetition rate is higher than the same of said standard clock;
   dividing means for dividing said PLL clock at a dividing ratio being instructed with phase control signals to obtain said standard clock;
   phase comparing means for comparing a phase of an dividing operation of said dividing means and a phase of said PCM synchronization signal to obtain a compared result; and
   dividing ratio controlling means for obtaining said phase control signals by receiving said compared result.

5. A data circuit-terminating equipment as claimed in claim 1, wherein said mapping means comprises:
   F-bit sending means for sending out bits which show at least frames;
   SD sending means for sending out data which are transmitted from said data terminal equipment; and
   RS sending means for sending out a request-to-send signal which is transmitted from said data terminal equipment.

6. A data circuit-terminating equipment as claimed in claim 1, wherein said demapping means comprises:
   F-bit receiving means for receiving F-bits which show at least frames in which said F-bits are included in said signal to-be-demapped;
   RD receiving means for receiving data which are included in said signal to-be-demapped; and
   CD receiving means for receiving a carrier detect signal which is included in said signal to-be-demapped.

7. A data circuit-terminating equipment as claimed in claim 1, wherein said mapping means comprises:
   F-bit sending means for sending out bits which show at least frames;
   SD sending means for sending out data which are transmitted from said data terminal equipment;
   CS' sending means for sending out a clear-to-send signal which is transmitted from said data terminal equipment;
   CI' sending means for sending a call indicator signal which is transmitted from said data terminal equipment;
   SY-bit sending means for sending out SY-bits which indicates a synchronous state;
   RS sending out a request-to-send signal which is transmitted from said data terminal equipment;
   ER sending means for sending out a equipment ready signal which is transmitted from said data terminal equipment; and
   multiplexing means for multiplexing outputs of said F-bit sending means, said SD sending means, said CS' sending means, said CI' sending means, said SY-bit sending means, said RS sending means, and said ER sending means to deliver said mapped signal.

8. A data circuit-terminating equipment as claimed in claim 1, wherein said demapping means comprises:
- F-bit receiving means for receiving F-bits which show at least frames in which said F-bits are included in said signal to-be-demapped;
- RD receiving means for receiving data which are included in said signal to-be-demapped;
- CS receiving means for receiving a clear-to-send signal which is included in said signal to-be-demapped;
- CI receiving means for receiving a call indicator signal which is included in said signal to-be-demapped;
- SY-bit receiving means for receiving SY-bits which show a synchronized state in which said SY-bits are included in said signal to-be-demapped;
- CD receiving means for receiving a carrier detect signal which is included in said signal to-be-demapped; and
- DR receiving means for receiving a data set ready signal which is included in said signal to-be-demapped.

9. A data circuit-terminating equipment as claimed in claim 1, wherein said timing generating means comprises:
- register timing means for delivering timing signals to said sending register means and said receiving register means by receiving said standard clock and an frame indication signal which indicates frames;
- clock timing means for delivering a mapping clock and a timing signal indicating positions to be mapped to said mapping means, a demapping clock and a timing signal indicating positions to be demapped to said mapping means, and a mapping position signal which indicates each position of bits of frames in said mapping means by receiving said standard clock, said PCM synchronization signal and said PCM clock;
- receiving timing means for receiving said standard clock, said mapping position signal and a signal which indicates each position of frames in said signal to-be-demapped and for delivering a signal which indicates each position of bits of frames in said demapping means.

10. A data circuit-terminating equipment as claimed in claim 8, wherein said F-bit receiving means comprises:
- frame counting means for receiving said standard clock, a signal which indicates each interval between frames in said signal to-be-demapped, a signal indicating coincidence, a signal indicating noncoincidence, and a signal indicating a synchronized state to deliver each frame number and a timing signal which indicates outputs of predetermined frame numbers;
- comparing means including a flip-flop flip-flopping at every reception of said timing signal which indicates outputs of predetermined frame numbers, for receiving said signal to-be-demapped, said standard clock and said signal indicating said synchronized state, and for comparing a state of said flip-flop with said signal to-be-demapped to deliver said signal indicating coincidence when a coincidence is obtained in said comparing and to deliver said signal indicating noncoincidence when a noncoincidence is obtained in said comparing; and
- protection means for sending out said signal indicating said synchronized state on successive reception of a predetermined number of signals indicating said coincidence and for not sending out said signal indicating said synchronized state on successive receipts of a predetermined number of signals indicating said noncoincidence to protect a synchronized state.

11. A data circuit-terminating equipment for connecting an asynchronous data terminal equipment with a PCM transmission line which can transmit at various transmission rates by means of accommodating data and control signals in a multiframe construction by using at least a PCM synchronization signal and at least a PCM clock, wherein said data circuit-terminating equipment comprises:
- mapping means for mapping data and control signals, which include at least a clear-to-send signal, from said asynchronous data terminal equipment in a predetermined procedure and for constructing multiframes to send out a mapped signal;
- sending register means for registering said mapped signal to send out at a transmission rate of said PCM transmission line at a timing being determined by said PCM synchronization signal and said PCM clock to said PCM transmission line;
- receiving register means for receiving data and control signals of multiframes which are transmitted from said PCM transmission line at said transmission rate to register and for delivering a signal to-be-demapped at a predetermined timing synchronizing with said PCM synchronization signal;
- demapping means for demapping said signal to-be-demapped to obtain demapped data and control signals which include at least a carrier detect signal and for delivering said demapped data and control signals to said asynchronous data terminal equipment at a predetermined timing;
- PLL means including a phase-locked loop for generating a standard clock which synchronizes with said PCM synchronization signal;
- timing generating means for generating required timing signals from said standard clock, said PCM synchronization signal and said PCM clock to deliver to said sending register means, said receiving register means, said mapping means and said demapping means; and
- shorting means for shorting to make said carrier detect signal from said demapped means into said clear-to-send signal in said mapping means.

12. A data circuit-terminating equipment as claimed in claim 11, wherein said sending register means includes a register which receives data to send out.

13. A data circuit-terminating equipment as claimed in claim 11, wherein said receiving register means includes a register which receives data to send out.

14. A data circuit-terminating equipment as claimed in claim 11, wherein said PLL means comprises:
- clock generating means for generating a PLL clock of which repetition rate is higher than the same of said standard clock;
- dividing means for dividing said PLL clock at a dividing ratio being instructed with phase control signals to obtain said standard clock;
- phase comparing means for comparing a phase of an dividing operation of said dividing means and a phase of said PCM synchronization signal to obtain a compared result; and dividing ratio controlling means for obtaining said phase control signals by receiving said compared result.

15. A data circuit-terminating equipment as claimed in claim 11, wherein said mapping means comprises:
   CS' sending means for detecting said clear-to-send signal to send out by receiving said carrier detect signal as said clear-to-send signal through said shorting means;
   F-bit sending means for sending out bits which show at least frames;
   SD sending means for sending out data which are transmitted from said data terminal equipment; and
   RS sending means for sending out a request-to-send signal which is transmitted from said data terminal equipment.

16. A data circuit-terminating equipment as claimed in claim 11, wherein said demapping means comprises:
   F-bit receiving means for receiving F-bits which show at least frames in which said F-bits are included in said signal to-be-demapped;
   RD receiving means for receiving data which are included in said signal to-be-demapped; and
   CD receiving means for receiving a carrier detect signal which is included in said signal to-be-demapped.

17. A data circuit-terminating equipment as claimed in claim 11, wherein said mapping means comprises:
   F-bit sending means for sending out bits which show at least frames;
   SD sending means for sending out data which are transmitted from said data terminal equipment;
   CS' sending means for sending out a clear-to-send signal which is transmitted from said data terminal equipment;
   CI' sending means for sending a call indicator signal which is transmitted from said data terminal equipment;
   SY-bit sending means for sending out SY-bits which indicates a synchronous state;
   RS sending means for sending out a request-to-send signal which is transmitted from said data terminal equipment;
   ER sending means for sending out a equipment ready signal which is transmitted from said data terminal equipment; and
   multiplexing means for multiplexing outputs of said F-bit sending means, said SD sending means, said CS' sending means, said CI' sending means, said SY-bit sending means, said RS sending means, and said ER sending means to deliver said mapped signal.

18. A data circuit-terminating equipment as claimed in claim 11, wherein said demapping means comprises:
   F-bit receiving means for receiving F-bits which show at least frames in which said F-bits are included in said signal to-be-demapped;
   RD receiving means for receiving data which are included in said signal to-be-demapped;
   CS receiving means for receiving a clear-to-send signal which is included in said signal to-be demapped;
   CI receiving means for receiving a call indicator signal which is included in said signal to-be-demapped;
   SY-bit receiving means for receiving SY-bits which show a synchronized state in which said SY-bits are included in said signal to-be-demapped;
   CD receiving means for receiving a carrier detect signal which is included in said signal to-be-demapped; and
   DR receiving means for receiving a data set ready signal which is included in said signal to-be-demapped.

19. A data circuit-terminating equipment as claimed in claim 11, wherein said timing generating means comprises:
   register timing means for delivering timing signals to said sending register means and said receiving register means by receiving said standard clock and an frame indication signal which indicates frames;
   clock timing means for delivering a mapping clock and a timing signal indicating positions to be mapped to said mapping means, a demapping clock and a timing signal indicating positions to be demapped to said mapping means, and a mapping position signal which indicates each position of bits of frames in said mapping means by receiving said standard clock, said PCM synchronization signal and said PCM clock;
   receiving timing means for receiving said standard clock, said mapping position signal and a signal which indicates each position of frames in said signal to-be-demapped and for delivering a signal which indicates each position of bits of frames in said demapping means.

20. A data circuit-terminating equipment as claimed in claim 18, wherein said F-bit receiving means comprises:
   frame counting means for receiving said standard clock, a signal which indicates each interval between frames in said signal to-be-demapped, a signal indicating coincidence, a signal indicating noncoincidence, and a signal indicating a synchronized state to deliver each frame number and a timing signal which indicates outputs of predetermined frame numbers;
   comparing means including a flip-flop flip-flopping at every reception of said timing signal which indicates outputs of predetermined frame numbers for receiving said signal to-be-demapped, said standard clock and said signal indicating said synchronized state and for comparing a state of said flip-flop with said signal to-be-demapped to deliver said signal indicating coincidence when a coincidence is obtained in said comparing and to deliver said signal indicating noncoincidence when a noncoincidence is obtained in said comparing; and
   protection means for sending out said signal indicating said synchronized state on successive reception of a predetermined number of signals indicating said coincidence and for not sending out said signal indicating said synchronized state on successive receipts of a predetermined number of signals indicating said noncoincidence to protect a synchronized state.

* * * * *

UNITED STATES PATENT AND TRADEMARK OFFICE
CERTIFICATE OF CORRECTION

PATENT NO. : 4,815,099

DATED : Mar. 21, 1989

INVENTOR(S) : Toshimichi SHIMATANI, et al.

It is certified that error appears in the above-identified patent and that said Letters Patent is hereby corrected as shown below:

Title page:

In the entry for [30] Foreign Application Priority Data:

"62-19117" should be -- 62-191171 --.

Signed and Sealed this

Seventeenth Day of April, 1990

Attest:

HARRY F. MANBECK, JR.

*Attesting Officer*   *Commissioner of Patents and Trademarks*